(12) United States Patent
Wuerfel

(10) Patent No.: US 9,873,160 B2
(45) Date of Patent: Jan. 23, 2018

(54) METHOD AND APPARATUS FOR THE GEAR MANUFACTURING MACHINING OF A WORKPIECE BY A DIAGONAL GENERATING METHOD

(71) Applicant: Liebherr-Verzahntechnik GmbH, Kempten (DE)

(72) Inventor: Robert Wuerfel, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 60 days.

(21) Appl. No.: 15/005,843

(22) Filed: Jan. 25, 2016

(65) Prior Publication Data

US 2016/0214194 A1  Jul. 28, 2016

(30) Foreign Application Priority Data

Jan. 23, 2015  (DE) .................. 10 2015 000 974

(51) Int. Cl.
| | | |
|---|---|---|
| B23F 9/00 | (2006.01) | |
| B23F 9/02 | (2006.01) | |
| B23F 21/00 | (2006.01) | |
| B23F 21/02 | (2006.01) | |
| B23F 5/04 | (2006.01) | |
| B23F 19/00 | (2006.01) | |

(Continued)

(52) U.S. Cl.
CPC .................. *B23F 9/02* (2013.01); *B23F 5/04* (2013.01); *B23F 19/002* (2013.01); *B23F 21/005* (2013.01); *B23F 21/026* (2013.01); *B23F 23/1225* (2013.01); *G05B 19/186* (2013.01); *G05B 2219/36198* (2013.01)

(58) Field of Classification Search
CPC .... B23F 9/02; B23F 5/04; B23F 9/002; B23F 21/005; B23F 21/02623; B23F 21/1225; G05B 2219/36198

USPC ...................... 451/5, 47, 461, 462
See application file for complete search history.

(56) References Cited

U.S. PATENT DOCUMENTS

| | | |
|---|---|---|
| 4,850,155 A | 7/1989 | Sulzer |
| 4,961,289 A | 10/1990 | Sulzer |

(Continued)

FOREIGN PATENT DOCUMENTS

| | | |
|---|---|---|
| DE | 692127 C | 6/1940 |
| DE | 3704607 A1 | 8/1988 |

(Continued)

OTHER PUBLICATIONS

Japan Patent Office, Office Action Issued in Patent Application No. 2016-010684, Dec. 6, 2016, 14 pages. (Submitted with Partial Translation).

(Continued)

*Primary Examiner* — George Nguyen
(74) *Attorney, Agent, or Firm* — McCoy Russell LLP

(57) ABSTRACT

The present disclosure relates to a method for the gear manufacturing machining of a workpiece by a diagonal-generating method, in which the workpiece is subjected to gear tooth machining by the rolling off of a tool, wherein an axial feed of the tool takes place during the machining with a diagonal ratio given by the ratio between the axial feed of the tool and the axial feed of the workpiece. According to the present disclosure, the diagonal ratio is changed within the course of the machining of a workpiece.

20 Claims, 17 Drawing Sheets

(51) Int. Cl.
   *B23F 23/12* (2006.01)
   *G05B 19/18* (2006.01)

(56) References Cited

U.S. PATENT DOCUMENTS

| | | | | |
|---|---|---|---|---|
| 5,443,338 A | * | 8/1995 | Huber | B23F 19/007 409/37 |
| 6,217,409 B1 | * | 4/2001 | Stadtfeld | B23F 5/04 451/147 |
| 6,422,924 B1 | * | 7/2002 | Faulstich | B23F 19/007 451/147 |
| 6,575,812 B2 | * | 6/2003 | Wirz | B23F 23/00 451/147 |
| 6,752,695 B2 | | 6/2004 | Schmid | |
| 7,937,182 B2 | | 5/2011 | Faulstich | |
| 8,840,444 B2 | * | 9/2014 | Faulstich | B23F 5/20 451/47 |
| 8,950,301 B2 | | 2/2015 | Marx et al. | |
| 2008/0292420 A1 | * | 11/2008 | Faulstich | B23F 5/04 409/8 |
| 2009/0227182 A1 | * | 9/2009 | Breith | B23F 23/1225 451/5 |
| 2011/0250029 A1 | | 10/2011 | Faulstich et al. | |
| 2013/0171912 A1 | * | 7/2013 | Radev | B23F 19/002 451/5 |
| 2013/0280990 A1 | | 10/2013 | Geiser et al. | |
| 2013/0288576 A1 | | 10/2013 | Yanase et al. | |
| 2014/0256223 A1 | * | 9/2014 | Geiser | B23F 23/1218 451/5 |
| 2014/0308877 A1 | * | 10/2014 | Weppelmann | B23F 17/00 451/5 |
| 2017/0080546 A1 | * | 3/2017 | Wuerfel | B23F 23/1225 |

FOREIGN PATENT DOCUMENTS

| | | |
|---|---|---|
| DE | 279627 A1 | 6/1990 |
| DE | 19706867 A1 | 8/1998 |
| DE | 19829880 A1 | 8/1999 |
| DE | 19844388 A1 | 4/2000 |
| DE | 10208531 A1 | 9/2003 |
| DE | 102009000774 A1 | 8/2010 |
| DE | 202011050054 U1 | 9/2011 |
| DE | 102012015846 A1 | 10/2013 |
| DE | 102012019492 A1 | 4/2014 |
| EP | 1995010 A1 | 11/2008 |
| EP | 1995010 B1 | 10/2012 |
| JP | S63306819 A | 12/1988 |
| JP | H06315825 A | 11/1994 |
| JP | 2003245823 A | 9/2003 |
| JP | 2012096352 A | 5/2012 |
| JP | 2013220530 A | 10/2013 |
| JP | 2014079847 A | 5/2014 |
| WO | 2010091946 A1 | 8/2010 |

OTHER PUBLICATIONS

Wuerfel, Robert, "Method and Apparatus for the Gear Manufacturing Machining of a Workpiece by a Diagonal Generating Method," U.S. Appl. No. 15/005,680, filed Jan. 25, 2016, 92 pages.

Wuerfel, Robert, "Method for the Manufacture of a Workpiece Having a Corrected Gear Tooth Geometry and/or a Modified Surface Structure," U.S. Appl. No. 15/005,751, filed Jan. 25, 2016, 104 pages.

Wuerfel, Robert, "Method for the Gear Manufacturing Machining of a Workpiece by a Diagonal Generating Method," U.S. Appl. No. 15/005,799, filed Jan. 25, 2016, 99 pages.

* cited by examiner

METHOD AND APPARATUS FOR THE GEAR MANUFACTURING MACHINING OF A WORKPIECE BY A DIAGONAL GENERATING METHOD

CROSS REFERENCE TO RELATED APPLICATION

This application claims priority to German Patent Application No. 10 2015 000 974.5, entitled "Method and Apparatus for the Gear Manufacturing Machining of a Workpiece by a Diagonal Generating Method," filed Jan. 23, 2015, the entire contents of which is hereby incorporated by reference in its entirety for all purposes.

TECHNICAL FIELD

The present disclosure relates to a method for the gear manufacturing machining of a workpiece by a diagonal generating method. In such a diagonal generating method, the workpiece is gear tooth machined by the rolling off of a tool.

BACKGROUND AND SUMMARY

The present disclosure relates to a diagonal generating method in which an axial feed of the tool having a diagonal ratio given by the ratio between the axial feed of the tool and the axial feed of the workpiece takes place during the machining. In this respect, the term "axial feed of the tool" means a relative movement of the tool to the workpiece in the axial direction of the tool. The term "axial feed of the workpiece" means a relative movement of the tool to the workpiece in the axial direction of the workpiece. Depending on the embodiment of the gear manufacturing machining machine on which the method in accordance with the present disclosure is carried out, different machine axes can be used for the production of the axial feed of the tool and the axial feed of the workpiece. Only the tool can, for example, be moved both in the direction of its axis and in the direction of the axis of the workpiece. Since it is a generating process, the rotational movements of the tool and of the workpiece are furthermore coupled. The workpiece can in particular be a gear.

Different regions of the tool successively come into contact with the workpiece during the gear manufacturing machining in the diagonal generating method due to the axial feed of the tool, which is also called shifting. Such diagonal generating methods are typically used to achieve a wear of the tool surface which is as uniform as possible.

A diagonal generating method is known from EP 1 995 010 B1 in which a tool having a gear tooth geometry corrected for crowning is used to produce a crown-modified workpiece. For this purpose, the delivery of the tool to the workpiece is likewise changed in a crowning manner during the machining process. In this respect, the diagonal ratio, which is defined as the ratio of the paths covered during the machining in the axial direction of the tool and in the axial direction of the workpiece, is set such that a desired twist is produced.

A method is furthermore known from DE 10 2012 015 846 A1 in which, in the diagonal generating method, a tool is used which is modified in its surface geometry, wherein the surface geometry has a constant value in the generating pattern at least locally in a first direction of the tool and is given by a function f(x) in a second direction which extends perpendicular to the first direction. This modification of the tool leads to a corresponding modification of the surface geometry of the workpiece. In this respect, the diagonal ratio used for the machining is inter alia selected such that the modification of the tool produces the desired modification of the workpiece.

It is the object of the present disclosure to further develop and to improve the diagonal generating method known from the prior art. A possible objective of the present disclosure can be to improve the flexibility of the machining process, in particular with respect to the modifications which can be produced. Another objective of the present disclosure can be to be able to better use the available grinding regions of the grinding tools.

This object is achieved in accordance with the present disclosure by the independent claims of the present application. Advantageous embodiments of the present disclosure form the subject of the dependent claims.

The present disclosure shows a method for the gear manufacturing machining of a workpiece by a diagonal generating method with which the workpiece is gear tooth machined by the rolling off of a tool. During the machining of the workpiece, an axial feed of the tool with a diagonal ratio given by the ratio between the axial feed of the tool and the axial feed of the workpiece takes place. In accordance with the present disclosure, the diagonal ratio is varied as part of the machining of a workpiece. The method in accordance with the present disclosure for the gear tooth machining can be a method for hard fine machining and/or a grinding method. The workpiece may be a gear wheel. A grinding worm is optionally used as the tool.

The method in accordance with the present disclosure can in particular be used for the machining of cylindrical or conical workpieces or gear teeth. The gear teeth can be symmetrical or asymmetrical.

It was admittedly known in the diagonal generating methods known from the prior art to select a specific diagonal ratio with which the gear manufacturing machining can then take place before the carrying out of the method. However, work was carried out with a constant diagonal ratio during the machining of the workpiece itself. The inventor of the present disclosure has now recognized that a variety of new possibilities are opened up by a variation of the diagonal ratio as part of the machining of a workpiece.

The variation of the diagonal ratio in accordance with the present disclosure may take place within the framework of a method for the manufacture of a workpiece having a corrected gear tooth geometry and/or a modified surface structure in which a corresponding modification is produced on the surface of the workpiece by means of a specific modification of the surface geometry of the tool and by means of a mapping of the surface of the tool produced by the diagonal generating method and depending on the diagonal ratio onto the surface of the workpiece. The diagonal ratio can in particular be varied as part of such a process to provide additional variation possibilities in the production of the modifications.

As part of such a method for the production of a modified surface geometry of the workpiece, the specific modification of the surface geometry of the tool can be produced in that the position of the dresser to the tool during the dressing is varied in dependence on the angle of rotation of the tool and/or on the tool width position. A particularly simple possibility of producing modifications of the surface geometry of the tool hereby results.

The dressing can take place on one flank or on two flanks. The dressing can furthermore take place in one stroke or in a plurality of strokes.

The profile roller dresser can in particular be in contact with the tooth of the tool from the root region to the tip region during dressing so that the modification takes place in one stroke over the total tooth depth.

The profile roller dresser can alternatively only be in contact with the tooth of the tool in part regions between the base and the tip during the dressing so that the modification takes place in a plurality of strokes over the tooth depth.

The dressing of the tooth tip can take place via a tip dressing tool.

The present disclosure can in principle also be used with non-dressable tools. In this case, the modifications of the tool are already produced during the manufacture of the tools and cannot be changed during the machining process of a workpiece.

In case of a non-dressable grinding tool, the inventive modification of the surface geometry can be produced during the manufacturing process in exactly the same way as described in the following for dressable tools, with the only change that instead of a dressing tool, a corresponding manufacturing tool is used, for example a rolling die.

In case that the tool is a hobbing cutter, it has to be manufactured in such a way that the enveloping body of the hobbing cutter has the modification provided by the present disclosure. With respect to a hobbing cutter, the term "modification of the surface geometry of the tool" as used in the context of the present disclosure is to be understood as a modification of the surface geometry of the enveloping body of the hobbing cutter.

The present disclosure may however be used with a dressable tool. In particular, the modification of the surface geometry of the tool may be generated during a dressing step.

The modification of the surface geometry of the workpiece on the tooth flank may have a constant value in the generating pattern in at least a first region and/or locally in a first direction of the workpiece, whereas the modification is given by a function $F_{Ft2}$ in a second direction of the workpiece which extends perpendicular to the first direction.

Provision can furthermore be made that the modification of the surface geometry of the tool used for producing the modification of the surface geometry of the workpiece can furthermore have a constant value in the generating pattern at least in a first region and/or locally in a first direction of the tool and is further optionally given by a function $F_{Ft1}$ in a second direction of the tool which extends perpendicular to the first direction. The function $F_{Ft1}$ on the tool may be the same function, optionally compressed linearly by a factor, as the function $F_{Ft2}$ on the workpiece. The linear compression can relate to the argument of the function and/or to the magnitude of the function. The modification on the workpiece naturally has the opposite sign to the modification on the tool since elevated portions on the tool surface produce recesses on the workpiece surface and vice versa. In the normal section, in particular $F_{Ft1}(x)=-F_{Ft2}(cx)$ can apply in this respect, i.e. there is only compression with respect to the argument; an additional constant factor k can in contrast be present in the transverse section with respect to the magnitude of the function, i.e. $F_{Ft1}(x)=-k*F_{Ft2}(cx)$. The factors k and c can be larger than or less than 1 depending on the specific conditions.

In accordance with the present disclosure, in this respect, the macrogeometry of the tool and/or the line of action of the dressing tool and/or the diagonal ratio and/or the compression factor can be selected such that the modification of the tool along a first line on which the contact point moves on the tool in the machining of the workpiece corresponds to the desired modification of the workpiece along a second line on which the contact point moves on the workpiece. The parameters are in particular selected such that the modification desired on the workpiece is produced by the modification produced on the tool.

The variation of the diagonal ratio in accordance with the present disclosure can, however, not only be used in such processes for the manufacture of a workpiece having a corrected gear tooth geometry, but also in a diagonal generating method in which non-modified tools are used and/or in which the workpieces are not modified.

In accordance with the present disclosure, involute gear teeth may be produced. The modifications specified in accordance with the present disclosure relate to a modification with respect to a surface geometry given by involute gear teeth. In this respect, involute tools are advantageously used which are optionally correspondingly modified.

In accordance with a first variant of the present disclosure, work can be carried out with different diagonal ratios for the machining of different regions of the workpiece. The diagonal ratio can in particular be varied in such a process, while the workpiece is in contact with the tool and is gear tooth machined by the tool, i.e. during an ongoing machining step. Alternatively or additionally, the diagonal ratios used for the feed of the tool during the carrying out of a machining step differ at at least two points of the axial feed of the tool and/or workpiece covered during the machining. In this respect, the diagonal ratio can in particular be varied, while the width of the gear teeth is moved over as part of a machining step.

In a second variant, which is combined with the first variant in a possible embodiment, work can be carried out with different diagonal ratios on the use of different regions of the tool.

On the one hand, on the use of different regions of the tool which, however, belong to a contiguous machining region used during a machining step for the machining of the workpiece, work can be carried out with different diagonal ratios. Such a procedure is produced automatically due to the diagonal feed grinding process in accordance with the present disclosure in which different regions of the workpiece are machined with different regions of the tool during a machining step when, in accordance with the first variant, work is carried out with different diagonal ratios for the machining of different regions of the workpiece.

However, even when the tool has two separate regions used for different machining steps, work can also be carried out with different diagonal ratios in these different regions. In this case, the two different regions of the tool can be used to machine the same region of the workpiece.

In both variants of the present disclosure, work can be carried out with a constant diagonal ratio within the respective regions in a possible embodiment of the present disclosure. In this respect, two or more regions can in particular be provided within which work is respectively carried out using a constant diagonal ratio, with the diagonal ratios of at least two regions differing.

Alternatively to this, the diagonal ratio can be varied during the machining of the workpiece in dependence on the axial feed of the tool. In this respect, the diagonal ratio can be given as a non-constant and optionally stead function of the axial feed in at least in a region of the axial feed. The diagonal ratio can in particular be freely predefined in dependence on the axial feed.

As already presented above, the variation of the diagonal ratio in accordance with the present disclosure can be used to influence the modifications resulting in accordance with the present disclosure in the above-described method for the production of modified surfaces of a workpiece. In this respect, the change of the diagonal ratio can in particular be used to vary the orientation of the modifications resulting on the workpiece.

In this respect, in the modified diagonal generating method, the modified surface of the tool is mapped onto the surface of the workpiece, with this mapping depending on the selected diagonal ratio. The first direction of the workpiece onto which the first direction of the tool is mapped in which the modification is constant is in particular dependent on the selected diagonal ratio. A different orientation of the modification in different regions of the workpiece can thus be achieved by the variation of the diagonal ratio during the machining of these different regions of the workpiece.

If work is carried out in two or more regions in each case with a constant, but different diagonal ratio, different orientations of the modifications accordingly result, but which are constant within the regions. If, in contrast, the diagonal ratio is varied within a region, a corresponding variation in the orientation results. If the diagonal ratio is given by a steady, non-constant function, a steady variation in the orientation of the modification accordingly results.

In a possible embodiment of the present disclosure, the extent of at least one line of constant modification can be predefined and the variation of the diagonal ratio in dependence on the axial feed and in particular the non-constant function by which this is given can be determined from this. A line of constant modification which does not form a straight line in the generating diagram in particular results in a non-constant function in this respect. The extent of at least one line of constant modification may be freely predefined at least within certain conditions.

In this respect, the function which describes the diagonal ratio in dependence on the axial feed can have at least one region in which it has a steady non-constant extent. This would correspond to a steady curvature of the line of constant modification.

The variation of the diagonal ratio on the sweeping over of a modified region of the workpiece may take place such that the orientation of the modification varies in this region.

The variation of the diagonal ratio in accordance with the present disclosure can be used both on the use of a cylindrical tool and on the use of a conical tool. In this respect, the modification of the workpiece can be influenced in both cases by the variation of the diagonal ratio.

A conical cool, i.e. a tool having a conical basic shape, may be used for the carrying out of a method in accordance with the present disclosure in which a variation of the diagonal ratio takes place while the tool is guided along the workpiece in the width direction. The modifications resulting from the variation of the diagonal ratio can hereby additionally be specifically influenced by the setting of certain parameters of the tool or of the machining process. In this respect, a conical tool is may be used when the diagonal ratio is given as a steady, non-constant function.

The tool in accordance with the present disclosure having a conical basic shape may have involute gear teeth which can, however, optionally have modifications. Involute gear teeth have a geometry which is produced by the generating machining step between a cylinder and a rack. The conical basic shape is produced in that the axis of rotation of the cylinder is tilted toward the main plane of the rack in the course of this generating machining step.

In accordance with a preferred embodiment, the cone angle of the tool is greater than 1', further optionally greater than 30', and further optionally greater than 1°. The cone angle of the tool is, however, optionally less than 50°, optionally less than 20°, and further optionally less than 10°.

The modifications which can be achieved by the variation of the diagonal ratio can in particular be specifically influenced on the use of a conical tool by a suitable choice of at least one, and optionally a plurality of parameters of the machining process and/or of the macrogeometry of the tool, in particular of the axial cross angle and/or of the axial spacing and/or of the cone angle and/or of the profile angle of the tool.

On the one hand, a desired orientation of the modification on the left and right tooth flanks can hereby be achieved. The present method in particular comprises a step of predefining a desired alignment of the modification on the left and right tooth flanks and of determining a parameter suitable herefor and/or of a combination of parameters of the machining process and/or of the macrogeometry of the tool suitable herefor.

The modification on a tooth flank as such can furthermore also be influenced by the suitable choice of at least one, and optionally of a plurality of parameters of the machining process and/or of the macrogeometry of the tool. In this respect, the orientation and/or pitch of the modification can in particular be influenced in different regions of the tooth flank.

The same possibilities also result when the workpiece has conical gear teeth, and indeed on the use of both a conical and of a cylindrical tool.

The tool in accordance with the present disclosure can have at least one modified region and one non-modified region in a first variant. In this respect, the tool optionally has two modified regions between which a non-modified region lies. If two modified regions are provided, the orientation of the modifications and in particular the first direction of the modifications can be identical in these regions. A particularly simple dressing behavior hereby results. Work is then optionally carried out with different diagonal ratios in the two modified regions in order hereby to achieve a different orientation of the modification on the workpiece.

In a second variant, the tool can have two regions having different modifications. The modifications can in particular have different orientations, in particular different first directions. Even greater degrees of freedom hereby result in the production of differently oriented modifications on the workpiece.

The second variant can furthermore also be combined with the first variant in that, in addition to the two regions having different modifications, a non-modified region is provided which can in particular be arranged between the two modified regions.

If a plurality of modified regions are provided, the modifications in the two regions can differ with respect to the form $F_{Ft}$ of the modification in the second direction.

Tools modified in accordance with the present disclosure can in particular be used to carry out different modifications on different regions of the workpiece, for example to produce different reliefs, and in particular differently oriented reliefs, at the upper edge and lower edge.

In an alternative embodiment of the present disclosure, the tool can have at least two regions which are used successively for the machining of the same region of the workpiece. The two regions can in particular be a rough machining region and a fine machining region. The rough machining region is used to achieve a greater material removal with a smaller precision. The fine machining region is, in contrast, used after the rough machining to improve the quality of the surface geometry.

In this respect, the machining steps with the different regions are advantageously carried out with different diagonal ratios. Work can in particular be carried out with a different diagonal ratio in the rough machining step than in the fine machining step. The diagonal ratios during the respective machining steps can in contrast be kept constant.

The use of different diagonal ratios in the two tool regions allows the given tool width to be used better. In this respect, in particular one of the two regions can be shorter than the other region although they are used for machining the same workpiece. Accordingly, only the diagonal ratio has to be adapted to the respective width of the machining region of the tool.

The regions used for machining the workpiece may use the total tool width.

Such a procedure is of advantage independent of whether work is carried out with a modified tool or not.

In a preferred embodiment of the present disclosure, however, the fine machining region is in particular modified. Depending on the size of the modification, the rough machining region, in contrast, does not necessarily have to be modified. It can, however, likewise be modified.

If both regions, and in particular both the rough machining region and the fine machining region are modified in this respect, the modifications each have a different orientation in a possible embodiment. In this respect, the modification which is to be produced on the workpiece by the two regions is naturally the same in each case. However identical modifications in the two regions would be mapped differently onto the workpiece due to the respective different diagonal ratios. The modifications are therefore optionally differently oriented in the two regions so that they are each mapped on the same direction on the workpiece while taking account of the different diagonal ratio. In this respect, a non-dressable tool can in particular be used since there is greater freedom in the manufacture of the modifications on such a tool. With dressable tools, in contrast, there may be a restriction due to the contact line of the dresser.

In an alternative embodiment, both regions, and in particular both the rough machining region and the fine machining regions can be modified and have an identical orientation of the modifications. Such tools can be manufactured more easily by the above-described dressing process since the line of action of the dresser into the tool and thus the direction of the modification on the tool can hardly be changed. This admittedly results in a different orientation of the modification on the tool due to the different diagonal ratios in the two regions. Since, however, the rough machining region is anyway only used for a coarse machining and the final surface shape is only produced by the fine machining step, this can be accepted in some cases.

In this case, the modification of the rough machining region only approximately produces the desired modification on the gear teeth, with the actual modification, however, being in the permitted tolerance range. The diagonal ratio for the fine machining step is selected such that the desired orientation of the diagonal ratio results. The diagonal ratio for the rough machining step is, in contrast, may be selected such that the actual modification is in the permitted tolerance range. In this respect, the shape of the modifications, in particular the function $F_{Ft1}$, can be changed in the rough machining region over the fine machining region.

In accordance with the present disclosure, the modification can also generally only approximately produce the desired modification on the gear teeth in at least one region of the tool, in particular in the rough machining region, with the diagonal ratio used. The form of the modification and the diagonal ratio are advantageously selected such that the actual modification is in the permitted tolerance range.

In a further embodiment of the present disclosure, the tool can have at least two regions which are used successively for the machining of different regions of the workpiece. In accordance with the present disclosure, in this respect, the machining in the one region can take place with a different diagonal ratio than in the other region.

Such a procedure is also of advantage with unmodified tools, for example, if a specific region of the tool is subjected to greater load during the machining than another region. In this respect, work may be carried out with a larger diagonal ratio and thus a faster axial feed of the tool when the tool is loaded more and with a smaller diagonal ratio in regions in which the workpiece is loaded less. The greater load can in particular result in that more material has to be removed than in other regions. A more uniform wear of the tool over the tool width results by such a procedure so that dressing has to be carried out less. Alternatively or additionally, in regions in which smaller tolerances are permitted with respect to the geometry of the workpiece surface, work can be carried out with a larger diagonal ratio so that the tool wears less in this region.

In a further variant, the tool can, however, also have one modified region and one unmodified region, in which regions work is carried out with different diagonal ratios.

In this respect, the diagonal ratio in the unmodified region can be selected as smaller than in the modified region to reduce the width of the tool since the unmodified region can thus be used for machining a larger region of the workpiece and can be shorter than with a constant diagonal ratio. The larger diagonal ratio in the modified region can, in contrast, be determined by the desired orientation of the modification on the tooth flank or the desired resolution in the second direction. In another variant, the diagonal ratio in the unmodified region can be larger than in the modified region to reduce the load on the tool in this region. Such a procedure in particular makes sense when the unmodified region has to remove more material than the modified region.

In accordance with the present disclosure, it is possible to work in a region which is used for machining an upper or lower end region of the workpiece with a smaller diagonal ratio than in a region used for machining a middle region of the workpiece. For in the machining of the upper or lower end region of the workpiece, the total tool does not yet dip into the workpiece so that the loads are lower here.

In a further variant of the present disclosure, the tool can have two modified regions between which an unmodified region lies, with the regions being used consecutively for machining different regions of the workpiece. In this respect, work is may be carried out with different diagonal ratios in the two modified regions. Different modifications, and in particular modifications with different orientations and in particular with different first directions can in particular hereby be produced in the respective regions of the workpiece. The two modified regions of the tool can have the same orientation of the modification. Alternatively, however, different orientations of the modification can also be selected here. The two modified regions can in particular be regions for machining the lower or upper edges of the workpiece.

The modified region and the unmodified region may be arranged such that the extent of the contact point between the tool and the workpiece is completely in the unmodified region during the machining in at least one grinding position. It is hereby ensured that a position is available at which the diagonal ratio can be varied without hereby influencing the geometry of the gear teeth on the workpiece. This is achieved in that the diagonal ratio is varied in a grinding position in which the contact point between the tool and the workpiece only sweeps over the unmodified region of the tool so that there is no modification here which would be influenced by the diagonal ratio. In this respect, work can in each case be carried out with a constant diagonal ratio in both modified regions. In this case, the diagonal ratio may be kept constant for as long as the contact point between the tool and the workpiece extends through one of the modified regions.

It is, however, conceivable in addition to such a procedure to vary the diagonal ratio steadily, for example in a transition region between a modified region and an unmodified region. The first directions in which the modification is constant, however, hereby no longer extend in parallel with one another in this transition region.

In addition to the method in accordance with the present disclosure, the present disclosure furthermore comprises a tool for the carrying out of a method such as was described above. The tool can in particular have at least two regions which can be used successively for the machining of the same region of the workpiece, with the two regions having a different width. In this respect, the width of the two regions is adapted to the respective diagonal ratio. The two regions can in particular be a rough machining region and a fine machining region.

The at least two regions may take up the total width of the tool.

Alternatively or additionally, the tool can have at least one modified region and one unmodified region which can be used successively for the machining of different regions of the workpiece. Alternatively or additionally, the tool can have two modified regions between which an unmodified region lies and which can be used successively for the machining of different regions of the workpiece. In a possible embodiment of the present disclosure, the two modified regions of the tool can be modified differently and can in particular have modifications with different orientations. The tool in accordance with the present disclosure is may be configured as was already shown in more detail above.

The tool can have a conical basic shape in a possible embodiment. In accordance with a preferred embodiment, the cone angle of the tool is greater than 1', further optionally greater than 30', and further optionally greater than 1°. The cone angle of the tool is, however, optionally less than 50°, optionally less than 20°, and further optionally less than 10°.

The present disclosure furthermore comprises a method for the dressing of a tool for the provision of a tool such as was described above or such as can be used in a method in accordance with the present disclosure for the machining of a workpiece. In this respect, in accordance with the present disclosure, the desired modification of the tool is produced by a variation of the machine kinematics during the dressing process. In this respect, the position of the dresser relative to the tool can in particular be varied in dependence on the angle of rotation of the tool and/or on the tool width position.

In this respect, the tool can have a modification with the same orientation over its total active surface. At least one modified region and at least one unmodified region and/or at least two regions having different modifications are, however, optionally produced. A modified tool such as was already described above is further optionally produced in this respect.

The present disclosure furthermore comprises a gear manufacturing machine for carrying out a machining method in accordance with the present disclosure and/or for carrying out a dressing method in accordance with the present disclosure such as was described in more detail above. The gear manufacturing machine advantageously has an input and/or calculation function via which different diagonal ratios and/or one variable diagonal ratio can be predefined and/or determined. The input function can in particular allow different diagonal ratios to be predefined in different regions and/or to predefine a diagonal ratio variable over the tool width. Alternatively or additionally, the input function can allow an input of a desired modification and determines the diagonal ratios required for producing such a modification. The gear manufacturing machine furthermore may have a control function which varies the diagonal ratio as part of the machining of a workpiece. The control function may vary the diagonal ratio in an automated manner.

The control function in accordance with the present disclosure can carry out at least two machining steps which take place successively and in which a respective other region of the tool is used for the machining of the same region of the workpiece. These steps can in particular be at least one rough machining step and at least one fine machining step.

In a possible embodiment of the present disclosure, the control takes place by the control function such that the machining steps take place using different diagonal ratios. The rough machining step and the fine machining step can in particular be carried out using different diagonal ratios. A non-dressable tool can in particular be used in this respect.

Alternatively or additionally, the control function can vary the diagonal ratio at least once in the course of a machining step. In this respect, the control function can in particular vary the diagonal ratio while the tools moves over the width of the gearing of the workpiece in a machining step. The control function may work with different diagonal ratios for the machining of different regions of the workpiece. In this respect, a functional variant can be provided which works with a constant diagonal ratio within the respective regions. In this case, an input function is may be provided which allows a definition of the regions and a predefinition of the respective diagonal ratios provided there. The control function can alternatively vary the diagonal ratio during the machining of the workpiece in dependence on the axial feed of the workpiece. The variation can in particular take place such that the diagonal ratio is given as a non-constant, optionally steady, function of the axial feed at least in a region of the axial feed. The gear manufacturing machine may have an input function which allows the predefinition of the non-constant function.

The gear manufacturing machine further may have a selection option by which two or more of the different input and/or control functions shown in more detail above can be selected.

The gear manufacturing machine in accordance with the present disclosure is further optionally a gear grinding machine. The gear grinding machine may have a tool spindle, a workpiece spindle and/or a spindle for the reception of a dresser, in particular of a dressing wheel, and machine axes for carrying out the relative movements required in accordance with the methods of the present disclosure between the workpiece and the tool and/or between the tool and the dresser in accordance with the present disclosure.

The present disclosure will now be explained in more detail with reference to embodiments and Figures.

The Figures only show w-z diagrams of cylindrical gear teeth by way of example. The w-z diagrams of conical gear teeth are generally not rectangular, are typically trapezoidal, since the evaluation region of the generating path varies over the gear tooth width.

DETAILED DESCRIPTION

Figure 1:
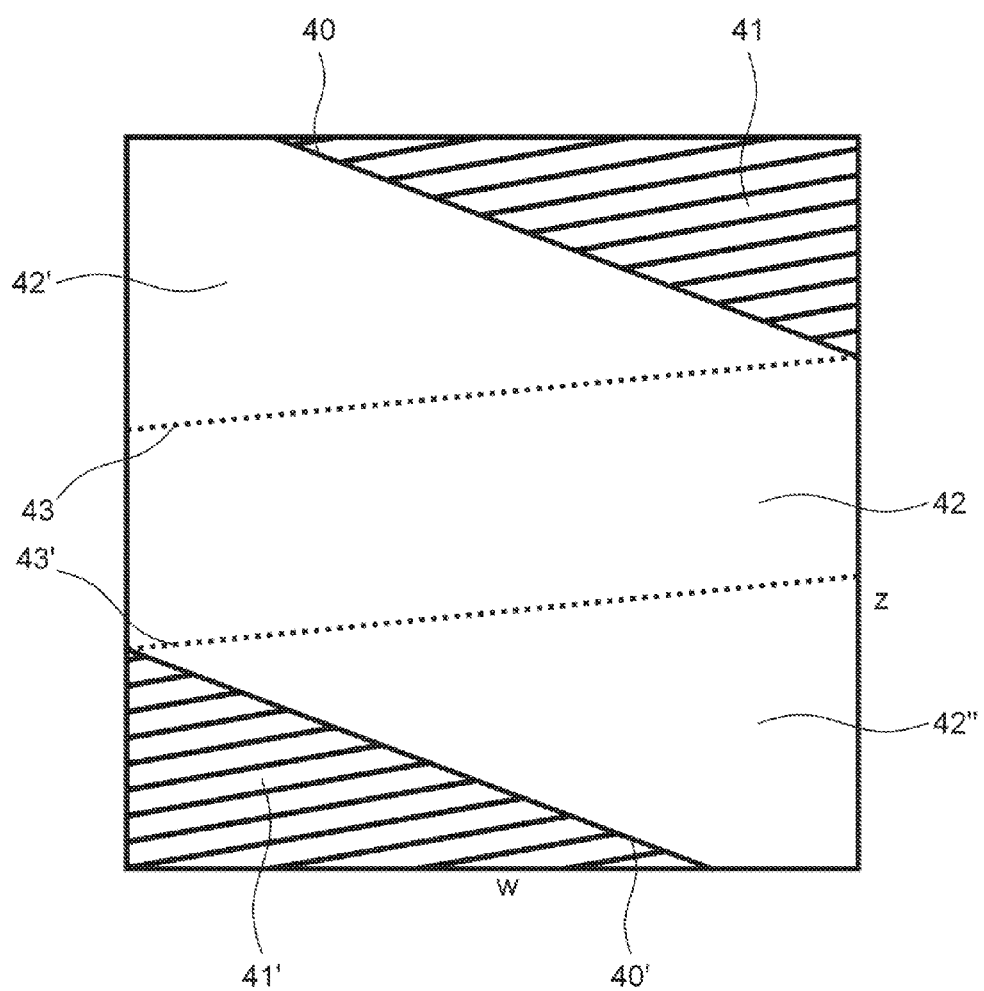
FIG. 1 shows a w-z diagram of a modification comprising regions 41 and 41' modified in accordance with equation (1) and non-modified regions 42, 42' and 42". The straight lines 40 and 40' extend in the direction given by $\rho_{F2}$. The straight lines 43 and 43' correspond to the extent of the contact point.

The present disclosure describes a method of producing a specific class of topological surface modifications on tooth flanks of both cylindrical and conical (beveloid) involute gear teeth. The gear teeth can be both symmetrical and asymmetrical, i.e. the profile angles of the left and right flanks can, but do not have to, be different. The method can inter alia be used in the following production processes:
  hobbing
  skiving hobbing
  shaving
  generating grinding
  honing.

If the method is used in generating grinding, both dressable and non-dressable tools can be used. The dressing can take place using a profile roller dresser on one or two flanks, but equally in contour dressing on one or two flanks.

The machining process takes place using a tool which is modified over the tool length and which is displaced in the axial direction during the process (diagonal generating method).

Parameters which differ or which may differ for left and right flanks are provided with the index F. F can be l (left) or r (right). Equations in which the index F occurs always apply to left and right flanks. The involute gear teeth looked at here are divided into the following four types in dependence on the base circle radii ($r_{br}, r_{bl}$) and on the base helix angles $\beta_{br}, \beta_{bl}$.

1. Cylindrically symmetrical $r_b := r_{br} = r_{bl}$ and $\beta_b := \beta_{br} = \beta_{bl}$
2. Cylindrically asymmetrical $r_{br} \neq r_{bl}$ and $\dfrac{\tan\beta_{br}}{r_{br}} = \dfrac{\tan\beta_{bl}}{r_{bl}}$
3. Conically symmetrical $\beta_{br} \neq \beta_{bl}$ and $r_{br}\cos\beta_{br} = r_{bl}\cos\beta_{bl}$
4. Conically asymmetrical $\beta_{br} \neq \beta_{bl}$ and $r_{br}\cos\beta_{br} \neq r_{bl}\cos\beta_{bl}$ and $\dfrac{\tan\beta_{br}}{r_{br}} \neq \dfrac{\tan\beta_{bl}}{r_{bl}}$ The class of the topological surface modifications which can be produced using the method first described here will be defined in the following. First, the customary description of topological surface modifications will be looked at for this purpose. They are described via a function $f_{Ft}(w_F, z_F)$, where $w_F$ is the generating path and $z_F$ is the position of the width line direction. A topological surface modification belongs to the class of surface modifications looked at here when there is a function $F_{Ft}$, where:

$$f_{Ft}(w_F, z_F) = F_{Ft}(w_F \tan \rho_F + z_F). \quad (1)$$

In illustrative terms, this means that the surface modification has the same value for all $w_F$ and $z_F$ on the tooth flank, where:

$$w_F \tan \rho_F + z_F = X_F, \quad (2)$$

where $X_F$ is any desired real number. Each $X_F$ thus unambiguously defines a straight line on the flank in the coordinates $w_F$ and $z_F$. For the special case of $\rho_F = 0$, the surface modification is a pure surface line modification, i.e. the surface modification is constant over the total profile in any given transverse section. The following list names known examples of the surface modifications looked at here of which some are described in detail in FVA No. 609:
  tooth trace end relief
  tooth trace crowning
  generated end relief, also called triangular end relief (tip, root or both sides)
  free tooth trace shape.

No method has yet become known with which the surface modification looked at here can be produced free of deviations using one of the production methods looked at here, with the exception of pure tooth trace modification with straight teeth cylindrical wheels. Surface modifications are meant by surface modifications which can be produced free of deviations here which can theoretically be produced without any deviation from the desired modification, apart from feed markings and possibly generating cuts.

A previously common method of producing pure tooth trace modifications comprises varying the axial spacing between the tool and the workpiece while the workpiece is being axially displaced. However, this method only provides the desired tooth trace modification with straight teeth cylindrical wheels since the extent of the contact point, in the following also called a contact path, between the tool and the workpiece only extends in these on both flanks in a transverse section plane and the surface modification caused by the axial spacing variation thus only has an effect in one transverse section plane. In all other gear teeth, a distortion of the modification arises on at least one flank; this will be looked at in detail in the further course of the description of this present disclosure.

For the special case of the tooth trace crowning, this unwanted distortion known as a twist has long been known and there are methods to compensate for it to a certain degree.

It is proposed for generating grinding in DE 3704607 (Sulzer) to use diagonal feed generating grinding in conjunction with a worm which has an angle of engagement varied over the worm width, wherein the change of the angle of engagement is selected such that the twist is compensated.

It is likewise proposed for the generating grinding in EP 1 995 010 (Faulstich) to use the diagonal-feed generating grinding with a diagonal ratio which is freely selectable within wide limits with a (hollow) crowning worm adapted thereto.

In these two methods, only the profile angle errors $f_{H\alpha}$ in an upper and a lower transverse section plane are looked at and the twist is determined from this or the twist is set in this manner such that it corresponds to the desired predefined value. However, this observation, which is only restricted to two transverse section planes, results in shape deviations on the flank which are not detected in a typical twist measurement, but become visible in topological measurements. The method according to Sulzer additionally has the disadvantage that it causes profile crowning. The latter can admittedly be compensated by a corresponding allowance in the dresser, but this allowance then only matches for a specific tooth trace crowning. Both methods furthermore do not consider either the machining of asymmetrical and/or conical gear teeth or the production of asymmetrical crownings in a two-flank machining.

The underlying idea of the present disclosure will be looked at in more detail in the following. This will be described for the example of generating grinding; however, it can equally be used for all the production methods looked at here due to their similarity. A worm which likewise has involute gear teeth, as a rule with a large helix angle, is used for the generating grinding of involute teeth. There is a theoretical point contact between the worm and the end geometry of the gear teeth to be produced during the machining process. The surfaces of the tooth flanks, both of the workpiece and of the tool, are typically parameterized over the generating path ($w_F$) and the position in the width line direction ($z_F$).

$$E_F(w_F, z_F) = \begin{pmatrix} r_{bF} \cdot \sin\left(s_F \cdot \left(\frac{w}{r_{bF}} + \eta_{bF}\right) - \frac{z \cdot \tan(\beta_{bF})}{r_{bF}}\right) - \\ s_F \cdot w \cdot \cos\left(s_F \cdot \left(\frac{w}{r_{bF}} + \eta_{bF}\right) - \frac{z \cdot \tan(\beta_{bF})}{r_{bF}}\right) \\ r_{bF} \cdot \cos\left(s_F \cdot \left(\frac{w}{r_{bF}} + \eta_{bF}\right) - \frac{z \cdot \tan(\beta_{bF})}{r_{bF}}\right) + \\ s_F \cdot w \cdot \sin\left(s_F \cdot \left(\frac{w}{r_{bF}} + \eta_{bF}\right) - \frac{z \cdot \tan(\beta_{bF})}{r_{bF}}\right) \\ z \end{pmatrix} \quad (3)$$

$\eta_{bF}$: see also the application DE 10 2012 015 846 A1
$s_F$ serves to write equations for left and right flanks in a compact form and is defined by:

$$s_F := \begin{cases} +1, & \text{for left flanks} \\ -1, & \text{for right flanks} \end{cases}$$

This parameterization allows simple relationships to be calculated for the extent of the contact point on the tool and on the workpiece. This extent is continuously displaced both on the workpiece and on the tool by the axial feed of the workpiece and the shift movement of the tool. The knowledge of these extents makes it possible to associate a point on the workpiece unambiguously with a point on the tool, and vice versa. The ratio between the axial feed of the workpiece and the shift movement of the tool, called the diagonal ratio in the following, and the surface modification on the tool can be matched by this association such that the desired modification is produced on the workpiece.

The following definitions are made to formulate the relationships mathematically.

The following terms are used for transformations:

$R_x(\varphi)$ rotation by the angle $\varphi$ about the x axis. Analogously for y and z $T_x(v)$ translation by the path v in the x direction. Analogously for y and z $H(A_1, \ldots, A_N)$ general transformation describable by a homogenous matrix with a total of N coordinates $A_1$ to $A_N$.

The term "coordinates" is used here for generalized, not necessarily independent coordinates.

The axis of rotation of – the gearing in its system of rest always coincides with the z axis. The gear tooth center is at z=0.

It is furthermore important for the formulation of the relationships to define the kinematic chains which describe the relative positions between the workpiece and the tool. This depends on whether the tool or the workpiece is cylindrical or conical. All four possible combinations will be looked at here. In the following, values which relate to the tool are provided with the index 1 and those which relate to the workpiece are provided with the index 2.

Kinematic Chain for a Cylindrical Tool and a Cylindrical Workpiece.

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_z(\varphi_2) \quad (4)$$

$\varphi_1$: Tool angle of rotation.
$\varphi_2$: Workpiece angle of rotation.
$z_{V1}$: Axial feed of the tool (also called the shift position).
$z_{V2}$: Axial feed of the workpiece.
d: Axial spacing (tool/workpiece)
$\gamma$: Axial cross angle (tool/workpiece).

Kinematic Chain for a Conical Tool and a Cylindrical Workpiece.

The relative position between the tool and the workpiece is described by the following kinematic chain $K_R$:

$$K_R = R_z(-\varphi_1) \cdot T_y(r_{w1}) \cdot R_x(\theta_1) \cdot T_z(-z_{V1}) \cdot T_y(d) \cdot R_y(\gamma) \cdot T_z(z_{V2}) \cdot R_z(\varphi_2) \quad (5)$$

$\varphi_1$: Tool angle of rotation.
$\varphi_2$: Workpiece angle of rotation.
$z_{V1}$: Feed of the tool (also called the shift position).
$z_{V2}$: Axial feed of the workpiece.
d: Dimension for the axial spacing (tool/workpiece)
$\gamma$: Axial cross angle (tool/workpiece)
$\theta_1$: Tool conical angle
$r_{w1}$: Pitch circle radius of the tool.

Kinematic Chain for a Cylindrical Tool and a Conical Workpiece.

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_x(-\theta_2) \cdot T_y(-r_{w2}) \cdot R_z(\varphi_2) \quad (6)$$

$\varphi_1$: Tool angle of rotation.
$\varphi_2$: Workpiece angle of rotation.
$z_{V1}$: Axial feed of the tool (also called the shift position).
$z_{V2}$: Feed of the workpiece
d: Dimension for the axial spacing (tool/workpiece)
$\gamma$: Axial cross angle (tool/workpiece)
$\theta_2$: Workpiece conical angle
$r_{w2}$: Pitch circle radius of the workpiece.

Kinematic Chain for a Conical Tool and a Conical Workpiece.

The relative position between the tool and the workpiece is described by the following kinematic chain $K_R$:

$$K_R = R_z(-\varphi_1) \cdot T_y(r_{w1}) \cdot R_x(\theta_1) \cdot T_z(-z_{V1}) \cdot T_y(d) \cdot R_y(\gamma) \cdot T_z(z_{V2}) \cdot R_x(-\theta_2) \cdot T_y(-r_{w2}) \cdot R_z(\varphi_2) \quad (7)$$

$\varphi_1$: Tool angle of rotation.
$\varphi_2$: Workpiece angle of rotation.
$z_{V1}$: Feed of the tool (also called the shift position).
$z_{V2}$: Feed of the workpiece
d: Dimension for the axial spacing (tool/workpiece)
$\gamma$: Axial cross angle (tool/workpiece)
$\theta_1$: Tool conical angle
$\theta_2$: Workpiece conical angle
$r_{w1}$: Pitch circle radius of the tool
$r_{w2}$: Pitch circle radius of the workpiece.

These kinematic chains initially first only serve the mathematical description of the present disclosure described here. They do not have to match the physical axes of the machine on which the present disclosure is used. If the machine has a movement apparatus, which makes possible relative positions between the tool and the workpiece in accordance with a transformation:

$$H(A_1, \ldots, A_{N_s}) \text{ where } N_s \geq 1 \quad (8)$$

the present disclosure can be used on this machine when there are coordinates $A_1, \ldots, A_{N_s}$ for each set of coordinates from the kinematic chains just described which set is calculated in this present disclosure, where:

$$H(A_1, \ldots, A_{N_s}) = K_R \quad (9)$$

The calculation of the coordinates $A_1, \ldots, A_{N_s}$ can be carried out by means of a coordinate transformation.

Typical movement apparatus which make possible all the required relative positions are, for example, described by the following kinematic chains:

$$H_{Bsp1}=R_z(\varphi_{B1})\cdot T_z(-v_{V1})\cdot R_x(90°-\varphi_{A1})\cdot T_z(-v_{Z1})\cdot T_x(-v_{X1})\cdot R_z(\varphi_{C2}) \quad (10)$$

$$H_{Bsp2}=R_z(\varphi_{B1})\cdot R_x(90°-\varphi_{A1})\cdot T_z(-v_{V1})\cdot T_z(-v_{Z1})\cdot T_x(-v_{X1})\cdot R_z(\varphi_{C2}) \quad (11)$$

Figure 16:
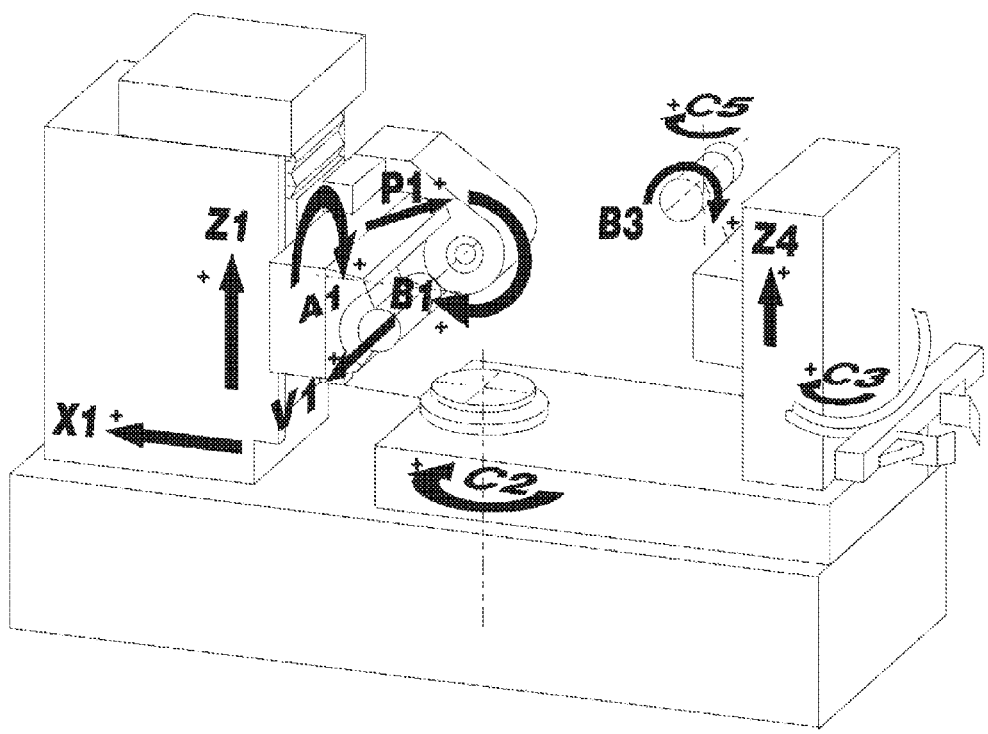
FIG. 16 schematically shows a gear manufacturing machine having the movement apparatus listed as examples here. The machine may further include a user interface for displaying and receiving input, including a screen as one example, and may further includes sensors and actuators for operating the various elements described herein. The actuators may include linear and/or rotary motors, in one example. The sensors may include position, angle, speed, etc., sensors. The sensors and actuators may be coupled with a processor having instructions stored therein. The processor in combination with the sensors and actuators may operate to carry out the various methods described herein.

FIG. 16 schematically shows a gear manufacturing machine having a movement apparatus described by $H_{Bsp1}$.

The $z_{V2}$ coordinate is moved during the machining process and the feed of the workpiece is thus implemented. With cylindrical wheels, this is the axial feed; with conical wheels, this feed is not axial, but is tilted by the conical angle $\theta_2$ with respect to the axis of the gear teeth.

If work is carried out in the diagonal generating method, the $z_{V1}$ coordinates are additionally moved, which implements the feed of the tool. With cylindrical tools, this is the axial feed; with conical wheels, this feed is not axial, but is tilted by the conical angle $\theta_1$ with respect to the axis of the tool.

In the further course, however, the term feed is also used for $z_{V1}$ and $z_{V2}$ respectively for cylindrical tools or workpieces.

If grinding is performed with a constant diagonal ratio, $z_{V1}$ is a function of $z_{V2}$ and the following relationship applies:

$$z_{V1}(z_{V2})=K_{Z_{V1}}\cdot z_{V2}+z_{V01} \quad (12)$$

$K_{Z_{V1}}$ is here the diagonal ratio and $z_{V01}$ is a fixed offset which makes it possible to position the modifications described here on different points on the tool or to select the region on the worm which should be used. If $K_{Z_{V1}}\neq 0$, we speak of a diagonal generating method.

How the speed of the workpiece and/or of the tool and/or the feed of the tool and/or of the workpiece behave in time and/or relative to one another during the machining does not play any role in this method since only the coupling between $z_{V1}$ and $z_{V2}$ is looked at. The speeds and feeds can be changed during the machining as long as the required couplings are observed.

The four possible combinations of cylindrical and/or conical tools and workpieces will be looked at separately. The starting point in each case is the mathematical description of the extent of the contact point on the tool and on the workpiece in generating grinding as the relationship between the generating path (w) and the position in the width line direction (z) in dependence on the feed positions $z_{V1}$ and $z_{V2}$.

In preparation for this, the modifications on the worms required for this purpose and their production by means of dressing will first be discussed.

The tools, cylindrical and conical worms, symmetrical or asymmetrical, which will be looked at here likewise have a modification in accordance with equation (1). This type of modification is in particular very advantageous with dressable grinding worms since it can be produced easily on the worm when dressing with a dressing wheel. When dressing with a dressing wheel, there is a line contact between the dressing wheel and the flanks of the worm. If this contact line is described as a relationship between $w_{F1}$ and $z_{F1}$ for both flanks, a straight line is obtained in a very good approximation, given by:

$$w_{F1}\tan\rho_{F1}+z_{F1}=X_{F1} \quad (13)$$

$\rho_{F1}$ defines the direction of this straight line. It can be slightly influenced by the number of threads, the diameter of the worm, the diameter of the dressing wheel, the profile angle of the worm and the relative position of the worm to the dresser.

$X_{F1}$ defines the position of the straight line on the worm. $X_{F1}$ changes accordingly while the worm is dressed along its length. If corrections to the relative position between the worm and the dressing wheel are carried out during the dressing process, modifications can be applied to the worm. These corrections always have an effect along the current contact line.

The relative position between the worm and the dresser is described by the following kinematic chain $K_{BR}$:

$$K_{BR}=R_z(-\varphi_S)\cdot T_z(-z_S)\cdot R_x(-\gamma_B)\cdot T_x(-d)\cdot T_y(y_A)\cdot R_z(\varphi_A) \quad (14)$$

$\varphi_S$: Worm angle of rotation
$\varphi_A$: Dresser angle of rotation
$y_A$: y Position of the dresser
$z_S$: Axial position of the worm
d: Axial spacing
$\gamma_B$: Axial cross angle.

This kinematic chain initially first only serves the mathematical description of the present disclosure described here. It does not have to match the physical axes of the machine on which the present disclosure is used. If the machine has a movement apparatus, which makes possible relative positions between the worm and the dresser in accordance with a transformation:

$$H(B_1, \ldots, B_{N_A}) \text{ where } N_A\geq 1 \quad (15)$$

the present disclosure can be used on this machine when there are coordinates $B_1, \ldots, B_{N_A}$ for each set of coordinates from the kinematic chain just described which set is calculated in this present disclosure, where:

$$H(B_1, \ldots, B_{N_A})=K_{BR} \quad (16)$$

The calculation of the coordinates $B_1, \ldots, B_{N_A}$ can be carried out by means of a coordinate transformation.

Typical movement apparatus which make possible all the required relative positions are, for example, described by the following kinematic chains:

$$H_{BBsp1}=R_z(-\varphi_{B1})\cdot T_z(-v_{V1})\cdot R_x(-\varphi_{A1})\cdot T_x(-v_{X1})\cdot T_y(v_{Z1})\cdot R_y(\varphi_{CS})\cdot R_z(\varphi_{B3}) \quad (17)$$

$$H_{BBsp2}=R_z(-\varphi_{B1})\cdot T_z(-v_{V1})\cdot R_x(-\varphi_{A1})\cdot T_x(-v_{X1})\cdot T_y(v_{Z1})\cdot R_z(\varphi_{B3}) \quad (18)$$

FIG. 16 schematically shows a gear manufacturing machine having a movement apparatus described by $H_{BBsp1}$ and $H_{BBsp2}$:

axial spacing and/or
axial position of the worm and/or
y Position of the dresser and/or
angle of rotation of the worm and/or
axial cross angle between the worm axis and the dresser axis can be corrected such that a constant modification is produced along the current contact line.

If a worm is dressed in a non-modified state, only the axial position of the worm and, coupled via the pitch height of the worm, the angle of rotation of the worm are changed during the dressing process. The contact line thereby migrates along the worm length in accordance with a helical line and sweeps over a certain region of the flank and dresses it. $X_{F1}$ is thus a function of the axial position of the worm:

$$X_{F1}=X_{F1}(z_S) \quad (19)$$

This relationship applies both to the single-flank dressing and to the two-flank dressing.

If dressing is carried out on two flanks, the corrections of the relative position can be selected such that any desired constant modifications $f_{t/1}$ and $f_{tr1}$ can be applied to the left and to the right along the current contact lines on both flanks of the worm independently of one another within certain limits. This choice, which is free within certain limits, of the modifications on the left and right flanks is due to the fact that the above-described corrections of the relative position do not all act equally on the left and right flanks. A change of the axial spacing, for example, results in a modification on the left and right flanks with the same sign; in the case of a symmetrical cylindrical worm also with the same amount. A change of the angle of rotation of the worm, in contrast, results in a modification on the left and right flanks with different signs; in the case of a symmetrical cylindrical worm with the same amount. The axial spacing and the angle of rotation of the worm can thus be set, for example, such that the desired modifications $f_{tl1}$ and $f_{tr1}$ are achieved along the current contact line. This can generally be described as follows: If the machine has a movement apparatus which is usable during the dressing process, which has the coordinates $B_1, \ldots, B_{N_A}$ and which can change the relative position between the worm and the dressing wheel such that such corrections of the relative position are possible which allow a free choice of the modifications on the left and right flanks, corrections $\Delta B_1, \ldots, \Delta B_{N_A}$ of these coordinates are dependent on $f_{tl1}$ and $f_{tr1}$ in comparison with a dressing of a non-modified worm:

$$\Delta B_i = \Delta B_i(f_{tl1}, f_{tr1}) \text{ where } 1 \leq i \leq N_A. \quad (20)$$

If a worm is dressed in a non-modified state, only the axial position of the worm $z_S$ is changed, as described above. This position is set by the coordinates $B_1, \ldots, B_{N_A}$ which are thus a function of $z_S$ for the case:

$$B_i = B_i(z_S) \text{ where } 1 \leq i \leq N_A. \quad (21)$$

It follows from the last two relationships for the coordinates $B_1, \ldots, B_{N_A}$ on the dressing of a worm having the modifications described here:

$$B_i = B_i(z_S) + \Delta B_i(f_{tl1}, f_{tr1}) \text{ where } 1 \leq i \leq N_A. \quad (22)$$

The corrections of the coordinates $\Delta B_1, \ldots, \Delta B_{N_A}$ generally also cause, in addition to the modification on the worm, a slight displacement of the position of the current contact line with respect to the dressing of a non-modified worm. Equation (19) thus has to be expanded by a dependency of $\Delta B_1, \ldots, \Delta B_{N_A}$ for the dressing of modified worms:

$$X_{F1} = X_{F1}(z_S, \Delta B_1, \ldots, \Delta B_{N_A}) \quad (23)$$

Worms are required for the method described here which have a modification as described in equation (1), where the direction $\rho_F$ is predefined by the direction of the contact line during dressing $\rho_{F1}$. The function $F_{Ft1}$ is, however, a freely predefinable continuous function within certain limits. The above-defined modifications $f_{tl1}$ and $f_{tr1}$ describe a constant modification along the direction defined by $\rho_{F1}$ with a specific position of the contact line $X_{F1}$ and thus exactly correspond to the functions $F_{tl1}(X_{l1})$ and $F_{tr1}(X_{r1})$ for the left and right flanks.

If the modifications $F_{tl1}(X_{l1})$ and $F_{tr1}(X_{r1})$ are known, they can be used together with equation (20) in equation (23):

$$X_{F1} = X_{F1}(z_S, \Delta B_1(F_{tl1}(X_{l1}), F_{tr1}(X_{r1})), \ldots, \Delta B_{N_A}(F_{tl1}(X_{l1}), F_{tr1}(X_{r1}))) \quad (24)$$

The positions of the contact line $X_{F1}$ can be calculated, generally numerically, at a given axial position of the worm z using this equation system. The required corrections of the coordinates $\Delta B_1, \ldots, \Delta B_{N_A}$ can then be determined using equation (20) This calculation is carried out for all $z_S$ which are necessary to sweep over the part of the worm to be dressed with the contact lines on the left and right flanks.

The method presented here for the two-flank dressing can be directly transferred to the single-flank dressing. In this case, the equations for the left and right flanks decouple completely and the calculation can be carried out separately for each flank.

A modification $f_{nF1}$ at a point on the worm, defined in the normal direction on the worm thread surface, results in a modification $f_{nF2} = -f_{nF1}$ on the workpiece, defined in the normal direction on the tooth flank surface, at the corresponding point on the workpiece. Modifications on gears are typically defined in the transverse section ($f_{Ft}$), not in the normal direction ($f_{Fn}$). However, it is easy to convert between these two definitions of the modifications.

$$f_{Fn} = f_{Ft} \cdot \cos \beta_{bF} \quad (25)$$

Cylindrical Tool and Cylindrical Workpiece.

It is shown in the following for the case of a cylindrical tool and of a cylindrical workpiece how, with the aid of a worm which has a modification in accordance with equation (1), a modification in accordance with the same equation, but with an angle $\rho_{F2}$ freely predefinable within certain limits, can be produced in diagonal-feed generating grinding. For this purpose, the extent of the contact point (contact path) between the workpiece and the worm will first be described in dependence on the axial feeds $z_{V1}$ and $z_{V2}$. This extent depends on the base circle radii and on the base helix angles of the workpiece and of the worm and on the axial spacing d and on the axial cross angle $\gamma$. The relative position of the workpiece to the worm is described by equation (4) in this observation. This extent can be described mathematically as a relationship (R6) between the position in the width line direction ($z_F$) and the generating path ($w_F$) for the worm (index 1) and for the workpiece (index 2), as follows:

$$z_{F1} = C_{Fw1} \cdot w_{F1} - z_{V1} + C_{Fc1} \quad (26)$$

$$z_{F2} = C_{Fw2} \cdot w_{F2} - z_{V2} + C_{Fc2} \quad (27)$$

The coefficients $C_{Fw1}$, $C_{Fc1}$, $C_{Fw2}$ and $C_{Fc2}$ introduced here have the following dependencies:

$$C_{Fw1} = C_{Fw1}(\beta_{bF1}) \quad (28)$$

$$C_{Fc1} = C_{Fc1}(\beta_{bF1}, \beta_{bF2}, r_{bF1}, d, \gamma) \quad (29)$$

$$C_{Fw2} = C_{Fw2}(\beta_{bF2}) \quad (30)$$

$$C_{Fc2} = C_{Fc2}(\beta_{bF1}, \beta_{bF2}, r_{bF2}, d, \gamma) \quad (31)$$

This relationship shows that there is a linear relationship between $z_F$, $w_F$ and $z_V$ both for the worm and for the workpiece.

If all the points on the workpiece having a fixed generating path $w_{F2}$ are looked at in the production process, all these points on the worm only contact points having a generating path $w_{F1}$ resulting from this. The relationship (R7) between the generating paths of contacting points on the worm and on the workpiece is given by:

$$\hat{C}_{Fw1} \cdot w_{F1} + \hat{C}_{Fw2} \cdot w_{F2} + \hat{C}_{Fc} = 0 \quad (32)$$

The coefficients $\hat{C}_{Fw1}$, $\hat{C}_{Fw2}$ and $\hat{C}_{Fc}$ introduced here have the following dependencies:

$$\hat{C}_{Fw1} = \hat{C}_{Fw1}(\beta_{bF1}) \quad (33)$$

$$\hat{C}_{Fw2} = \hat{C}_{Fw2}(\beta_{bF2}) \quad (34)$$

$$\hat{C}_{Fc} = \hat{C}_{Fc}(\beta_{bF1}, r_{bF1}, \beta_{bF2}, r_{bF2}, d, \gamma) \quad (35)$$

The relationships just presented follow directly from an analytical calculation of the contact points of two involute gear tooth arrangements which are oriented with respect to one another in accordance with the kinematic chain from equation (4).

It is now the basic idea of the present disclosure to utilize the above relationships, together with the constant diagonal ratio from equation (12), to associate a point on the worm with every point on the workpiece. The fact is utilized that the worm can have a modification in accordance with equation (1) which can be any desired within certain limits and a modification is to be produced on the workpiece in accordance with the same equation with a given function $F_{F1}$ and a given angle $\rho_{F1}$. It is the aim to map the points on the worm which lie on a straight line given by $X_{F1}$ and $\rho_F$, onto a straight line on the workpiece given by $X_{F2}$ and $\rho_{F2}$. For this purpose, the equations (26) and (27) are resolved for $z_{V1}$ and $z_{V2}$ and are used in equation (12); subsequently equation (2) is used for the worm and the workpiece to eliminate $z_{F1}$ and $z_{F2}$ and is replaced with equation (32) $w_{F1}$. This results in a relationship of the form:

$$\overline{C}_{Fc} + \overline{C}_{Fw2} \cdot w_{F2} = 0, \tag{36}$$

which has to apply to all $w_{F2}$. $\overline{C}_{Fw2}$ inter alia has a dependency on $K_{Z_{V1}}$. $\overline{C}_{Fc}$, in contrast, additionally has a dependency on $X_{F1}$ and $X_{F2}$. With the aid of a coefficient comparison, it is thus possible to calculated $K_{Z_{V1}}$ from this relationship both for the left and for the right flank and $X_{F2}$ as a function of $X_{F1}$, likewise for the left and right flanks. $K_{Z_{V1}}$, as defined in equation (12), determines the diagonal ratio with which the machining process has to be carried out so that the mapping of the points on the worm onto the points on the workpiece takes place along the direction defined by $\rho_{F2}$.

For $\rho_{l2} = \rho_{r2}$, this calculation produces the same diagonal ratios $K_{Z_{V1}}$ for the left and right flanks with symmetrical gear teeth. A two-flank, deviation-free generating grinding is thus possible.

If however, $\rho_{l2} \neq \rho_{r2}$ and/or the gear teeth are asymmetrical, the calculation generally results in different diagonal ratios $K_{Z_{V1}}$ for the left and right flanks. A two-flank, deviation-free generating grinding is thus generally no longer possible in the case with a cylindrical tool.

A single-flank, deviation free generating grinding is, however, possible, wherein different diagonal ratios $K_{Z_{V1}}$ have to be set for the machining of the left and right flanks. If there is a diagonal ratio $K_{Z_{V1}}$, so that the produced modification on the left and right flanks is still within the respective tolerance when generating grinding with it, a two-flank generating grinding is also still possible, but no longer a deviation-free one. The diagonal ratio to be selected for this as a rule lies between the diagonal ratios determined for the left and right flanks. The direction $\rho_{F2}$ of the modification produced on the workpiece deviates from the desired predefined value on at least one of the two flanks. If, however, this desired predefined value is within tolerance, it is possible in specific cases to select the diagonal ratio such that both directions $\rho_{F2}$ lie within the tolerance.

A method with which modifications can be generation ground on two flanks and deviation-free with different directions $\rho_{F1}$ on the left and right flanks and/or asymmetrical gear teeth will be presented in the following. The cylindrical tool is replaced with a conical one for this purpose.

Conical Tool and Cylindrical Workpiece.

Generating grinding is to date only known with cylindrical worms. It is, however, also possible to use conical worms as the tool. The kinematics of this process can be described by a continuous generating gear train having a conical and a cylindrical wheel. These kinematics are described by the kinematic chain given in equation (5). As in the continuous generating gear train comprising two cylindrical wheels, there is also a theoretical point contact between both wheels. This allows the same approach to be used as for cylindrical tools, i.e. a worm having a modification in accordance with equation (1) is used in the diagonal generating method in order likewise to product a modification in accordance with equation (1) on the workpiece. The extent of the contact point between the workpiece and the worm can be described mathematically as follows:

$$z_{F1} = C_{Fw1} \cdot w_{F1} + C_{Fz_{V1}} \cdot z_{V1} + C_{Fc1} \tag{37}$$

$$z_{F2} = C_{Fw2} \cdot w_{F2} + C_{Fz_{V1}2} \cdot z_{V1} - z_{V2} + C_{Fc2} \tag{38}$$

The coefficients $C_{Fw1}$, $C_{Fc1}$, $C_{Fw2}$, $C_{Fz_{V1}1}$, $C_{Fz_{V1}2}$ and $C_{Fc2}$ introduced here have the following dependencies:

$$C_{Fw1} = C_{Fw1}(\beta_{bF1}) \tag{39}$$

$$C_{Fc1} = C_{Fc1}(\beta_{bF1}, \beta_{bF2}, r_{bF1}, d, \gamma, \theta_1) \tag{40}$$

$$C_{Fw2} = C_{Fw2}(\beta_{bF2}) \tag{41}$$

$$C_{Fc2} = C_{Fc2}(\beta_{bF1}, \beta_{bF2}, r_{bF2}, d, \gamma, \theta_1) \tag{42}$$

$$C_{Fz_{V1}1} = C_{Fz_{V1}1}(\beta_{bF1}, \beta_{bF2}, r_{bF1}, d, \gamma, \theta_1) \tag{43}$$

$$C_{Fz_{V1}2} = C_{Fz_{V1}2}(\beta_{bF1}, \beta_{bF2}, r_{bF1}, d, \gamma, \theta_1) \tag{44}$$

Equation (32) is replaced with:

$$\hat{C}_{Fw1} \cdot w_{F1} + \hat{C}_{Fw2} \cdot w_{F2} + \hat{C}_{Fz_{V1}} \cdot z_{V1} + \hat{C}_{Fc} = 0 \tag{45}$$

The coefficients $\hat{C}_{Fw1}$, and $\hat{C}_{Fw2}$, $\hat{C}_{Fz_{V1}}$ and $\hat{C}_{Fc}$ introduced here have the following dependencies:

$$\hat{C}_{Fw1} = \hat{C}_{Fw1}(\beta_{bF1}) \tag{46}$$

$$\hat{C}_{Fw2} = \hat{C}_{Fw2}(\beta_{bF2}) \tag{47}$$

$$\hat{C}_{Fz_{V1}} = \hat{C}_{Fz_{V1}}(\beta_{bF1}, r_{bF1}, \beta_{bF2}, r_{bF2}, \gamma, \theta_1) \tag{48}$$

$$\hat{C}_{Fc} = \hat{C}_{Fc}(\beta_{bF1}, r_{bF1}, \beta_{bF2}, r_{bF2}, d, \gamma, \theta_1) \tag{49}$$

With knowledge of these relationships, a mapping of points on the worm to points on the workpiece can be calculated in an analog manner to the case of cylindrical tools and workpieces. If a modification on the worm in accordance with equation (1) is again assumed here, this results in a relationship analog to equation (36), but with other coefficients $\overline{C}_{Fw2}$ and $\overline{C}_{Fc}$. These coefficients now additionally depend on $\theta_1$. A coefficient comparison also here again allows the calculation of $K_{Z_{V1}}$ and the calculation of $X_{F2}$ as a function of $X_{F1}$, respectively for the left and right flanks, but now $K_{Z_{V1}}$ additionally has a dependency on $\theta_1$. It must be noted here that a change of $\theta_1$ generally requires a change of the base circle radii and of the base helix angles of the worm so that the worm and the workpiece can continue to mesh with one another and can thus form a continuous generating gear train. This means the worm has to be able to be generated using a rack tilted by $\theta_1$ and the worm and the workpiece have to mesh with one another. If $\theta_1$ and thus also the base circle radii and the base helix angles are changed, this change has a different influence on $K_{Z_{V1}}$ on the left and right flanks. This different influencing allows a $\theta_1$ to be determined so that $K_{Z_{V1}}$ are the same for the left and right flanks. In addition to the conical angle $\theta_1$, the profile angles of the rack generating the worm and the axial cross angle $\gamma$ also influence the value $K_{Z_{V1}}$ with conical worms. These values can thus be varied in addition to the conical angle to obtain the same $K_{Z_{V1}}$ for the left and right flanks. This change of the profile angles likewise results in a change of the base circle radii and of the base helix angles of the worm. These variation possibilities allow a two-flank, deviation-free generating grinding, also for gear teeth and desired modifications, in which a two-flank, deviation-free generating grinding with a cylindrical worm would not be possible. It is also possible with conical worms to grind on one flank and/or to select a worm and a diagonal ratio which do not produce the modification free of deviation; that is in which $\rho_{F2}$ deviates from the desired predefined value on at least one flank. Such a choice of the worm and of the diagonal ratio can be necessary, for example, when both are not freely selectable due to other predefined values.

Cylindrical Tool and Conical Workpiece.

The method described here can be transferred directly onto the generating grinding of conical workpieces in the diagonal generating method. The case of a cylindrical worm is first looked at here which has a modification in accordance with equation (1). The worm and the workpiece again form a continuous generating gear train whose kinematics are given by equation (6). There is again also a theoretical point contact between the worm and the workpiece. The extent of the contact point between the workpiece and the worm can be described mathematically as follows:

$$z_{F1} = C_{Fw1} \cdot w_{F1} - z_{V1} + C_{Fz_{V2}1} \cdot z_{V2} + C_{Fc1} \tag{50}$$

$$z_{F2} = C_{Fw2} \cdot w_{F2} + C_{Fz_{V2}2} \cdot z_{V2} + C_{Fc2} \tag{51}$$

The coefficients $C_{Fw1}$, $C_{Fc1}$, $C_{Fw2}$, $C_{Fz_{V2}2}$, $C_{Fz_{V2}1}$ and $C_{Fc2}$ introduced here have the following dependencies:

$$C_{Fw1} = C_{Fw1}(\beta_{bF1}) \tag{52}$$

$$C_{Fc1} = C_{Fc1}(\beta_{bF1}, \beta_{bF2}, r_{bF1}, d, \gamma, \theta_2) \tag{53}$$

$$C_{Fw2} = C_{Fw2}(\beta_{bF2}) \tag{54}$$

$$C_{Fc2} = C_{Fc2}(\beta_{bF1}, \beta_{bF2}, r_{bF2}, d, \gamma, \theta_2) \tag{55}$$

$$C_{Fz_{V2}2} = C_{Fz_{V2}2}(\beta_{bF1}, \beta_{bF2}, r_{bF2}, d, \gamma, \theta_2) \tag{56}$$

$$C_{Fz_{V2}1} = C_{Fz_{V2}1}(\beta_{bF1}, \beta_{bF2}, r_{bF1}, d, \gamma, \theta_2) \tag{57}$$

Equation (32) is replaced with:

$$\hat{C}_{Fw1} \cdot w_{F1} + \hat{C}_{Fw2} \cdot w_{F2} + \hat{C}_{Fz_{V2}} \cdot z_{V2} + \hat{C}_{Fc} = 0 \tag{58}$$

The coefficients $\hat{C}_{Fw1}$, $\hat{C}_{Fw2}$, $\hat{C}_{Fz_{V2}}$ and $\hat{C}_{Fc}$ introduced here have the following dependencies:

$$\hat{C}_{Fw1} = \hat{C}_{Fw1}(\beta_{bF1}) \tag{59}$$

$$\hat{C}_{Fw2} = \hat{C}_{Fw2}(\beta_{bF2}) \tag{60}$$

$$\hat{C}_{Fz_{V2}} = \hat{C}_{Fz_{V2}}(\beta_{bF1}, r_{bF1}, \beta_{bF2}, r_{bF2}, \gamma, \theta_2) \tag{61}$$

$$\hat{C}_{Fc} = \hat{C}_{Fc}(\beta_{bF1}, r_{bF1}, \beta_{bF2}, r_{bF2}, d, \gamma, \theta_2) \tag{62}$$

The known mathematical approach also gain here results in a relationship analog to equation (36), but with other coefficients $\overline{C}_{Fw2}$ and $\overline{C}_{Fc}$. These coefficients now additionally depend on $\theta_2$. A coefficient comparison also here again allows the calculation of $K_{Z_{V1}}$ and the calculation of $X_{F2}$ as a function of $X_{F1}$, respectively for the left and right flanks, but now $K_{Z_{V1}}$ additionally has a dependency on $\theta_2$. On a predefinition of the same direction of the modification given by $\rho_{F2}$ on the left and right flanks, the calculation of $K_{Z_{V1}}$ generally produces different values for the left and right flanks. This is also generally the case with symmetrical workpieces. In other words, this means that on a two-flank grinding, the direction $\rho_{F2}$ of the modification is generally different on the left and right flanks. If there is a diagonal ratio $K_{Z_{V1}}$, so that $\rho_{F2}$ can be reached on both sides or is within the tolerance, a two-flank grinding with a cylindrical tool is possible. Otherwise only a single-flank grinding is possible with a cylindrical tool. As with cylindrical workpieces, a deviation-free, two-flank grinding can be made possible by using a conical tool with an independent predefinition of the angles $\rho_{F2}$ on the left and right flanks.

Conical Tool and Conical Workpiece.

The calculation for a conical tool and a conical workpiece takes place analog to the previously discussed combinations. The worm and the workpiece again form a continuous generating gear train whose kinematics are given by equation (7). There is again also a theoretical point contact between the worm and the workpiece. The extent of the contact point between the workpiece and the worm can be described mathematically as follows:

$$z_{F1} = C_{Fw1} \cdot w_{F1} + C_{Fz_{V1}1} \cdot z_{V1} + C_{Fz_{V2}1} \cdot z_{V2} + C_{Fc1} \tag{63}$$

$$z_{F2} = C_{Fw2} \cdot w_{F2} + C_{Fz_{V1}2} \cdot z_{V1} + C_{Fz_{V2}2} \cdot z_{V2} + C_{Fc2} \tag{64}$$

The coefficients $C_{Fw1}$, $C_{Fc1}$, $C_{Fw2}$, $C_{Fz_{V2}2}$, $C_{Fz_{V2}1}$, $C_{Fz_{V1}2}$, $C_{Fz_{V1}1}$ and $C_{Fc2}$ introduced here have the following dependencies:

$$C_{Fw1} = C_{Fw1}(\beta_{bF1}) \tag{65}$$

$$C_{Fc1} = C_{Fc1}(\beta_{bF1}, \beta_{bF2}, r_{bF1}, d, \gamma, \theta_1, \theta_2) \tag{66}$$

$$C_{Fw2} = C_{Fw2}(\beta_{bF2}) \tag{67}$$

$$C_{Fc2} = C_{Fc2}(\beta_{bF1}, \beta_{bF2}, r_{bF2}, d, \gamma, \theta_1, \theta_2) \tag{68}$$

$$C_{Fz_{V2}2} = C_{Fz_{V2}2}(\beta_{bF1}, \beta_{bF2}, r_{bF2}, d, \gamma, \theta_1, \theta_2) \tag{69}$$

$$C_{Fz_{V2}1} = C_{Fz_{V2}1}(\beta_{bF1}, \beta_{bF2}, r_{bF1}, d, \gamma, \theta_1, \theta_2) \tag{70}$$

$$C_{Fz_{V1}2} = C_{Fz_{V1}2}(\beta_{bF1}, \beta_{bF2}, r_{bF2}, d, \gamma, \theta_1, \theta_2) \tag{71}$$

$$C_{Fz_{V1}1} = C_{Fz_{V1}1}(\beta_{bF1}, \beta_{bF2}, r_{bF1}, d, \gamma, \theta_1, \theta_2) \tag{72}$$

Equation (32) is replaced with:

$$\hat{C}_{Fw1} \cdot w_{F1} + \hat{C}_{Fw2} \cdot w_{F2} + \hat{C}_{Fz_{V1}} \cdot z_{V1} + \hat{C}_{Fz_{V2}} \cdot z_{V2} + \hat{C}_{Fc} = 0 \tag{73}$$

The coefficients $\hat{C}_{Fw1}$, $\hat{C}_{Fw2}$, $\hat{C}_{Fz_{V1}}$, $\hat{C}_{Fz_{V2}}$ and $\hat{C}_{Fc}$ introduced here have the following dependencies:

$$\hat{C}_{Fw1} = \hat{C}_{Fw1}(\beta_{bF1}) \tag{74}$$

$$\hat{C}_{Fw2} = \hat{C}_{Fw2}(\beta_{bF2}) \tag{75}$$

$$\hat{C}_{Fz_{V1}} = \hat{C}_{Fz_{V1}}(\beta_{bF1}, r_{bF1}, \beta_{bF2}, r_{bF2}, \gamma, \theta_1, \theta_2) \tag{76}$$

$$\hat{C}_{Fz_{V2}} = \hat{C}_{Fz_{V2}}(\beta_{bF1}, r_{bF1}, \beta_{bF2}, r_{bF2}, \gamma, \theta_1, \theta_2) \tag{77}$$

$$\hat{C}_{Fc} = \hat{C}_{Fc}(\beta_{bF1}, r_{bF1}, \beta_{bF2}, r_{bF2}, d, \gamma, \theta_1, \theta_2) \tag{78}$$

The known mathematical approach also again here results in a relationship analog to equation (36), but with other coefficients $\overline{C}_{Fw2}$ and $\overline{C}_{Fc}$. These coefficients now additionally depend on $\theta_1$ and $\theta_2$. A coefficient comparison also here again allows the calculation of $K_{Z_{V1}}$ and the calculation of $X_{F2}$ as a function of $X_{F1}$, respectively for the left and right flanks, but now $K_{Z_{V1}}$ additionally has a dependency on $\theta_1$ and $\theta_2$. Analog to the grinding of a cylindrical workpiece with a conical worm, a change of $\theta_1$, the profile angle of the rack of the worm and the axial cross angle, and thus also the base circle radii and the base helix angle influence the diagonal ratio $K_{Z_{V1}}$ differently on the left and right flanks. This makes it possible, for given directions $\rho_{F2}$ of the desired modification, to determine a $\theta_1$, the profile angle of the rack of the worm and an axial cross angle so that $K_{z_{V1}}$ is the same for the left and right flanks and thus a two-flank, deviation-free grinding becomes possible.

In all combinations described here, the modification $F_{t1}$ ($X_{F1}$) required on the worm is given by:

$$F_{Ft1}(X_{F1}) = -\frac{\cos\beta_{bF2}}{\cos\beta_{bF1}} \cdot F_{Ft2}(X_{F2}(X_{F1})) \quad (79)$$

$F_{Ft2}(X_{F2})$ describes the modification on the workpiece in accordance with equation (1).

Calculation Approach for Calculating the Contact Paths on the Tool and on the Workpiece.

In the following, a calculation approach will be shown with which the above-used contact paths can be calculated in dependence on the feeds. This calculation of the contact between the workpiece and the tool is carried out with the aid of two theoretical racks (also called basic racks), one each for the workpiece and the tool, each having trapezoidal, generally asymmetrical profiles which can generate the gear teeth. Since both the tool and the workpiece are involute gear teeth, this observation is symmetrical with respect to a swapping over of the tool and workpiece.

Figure 13:
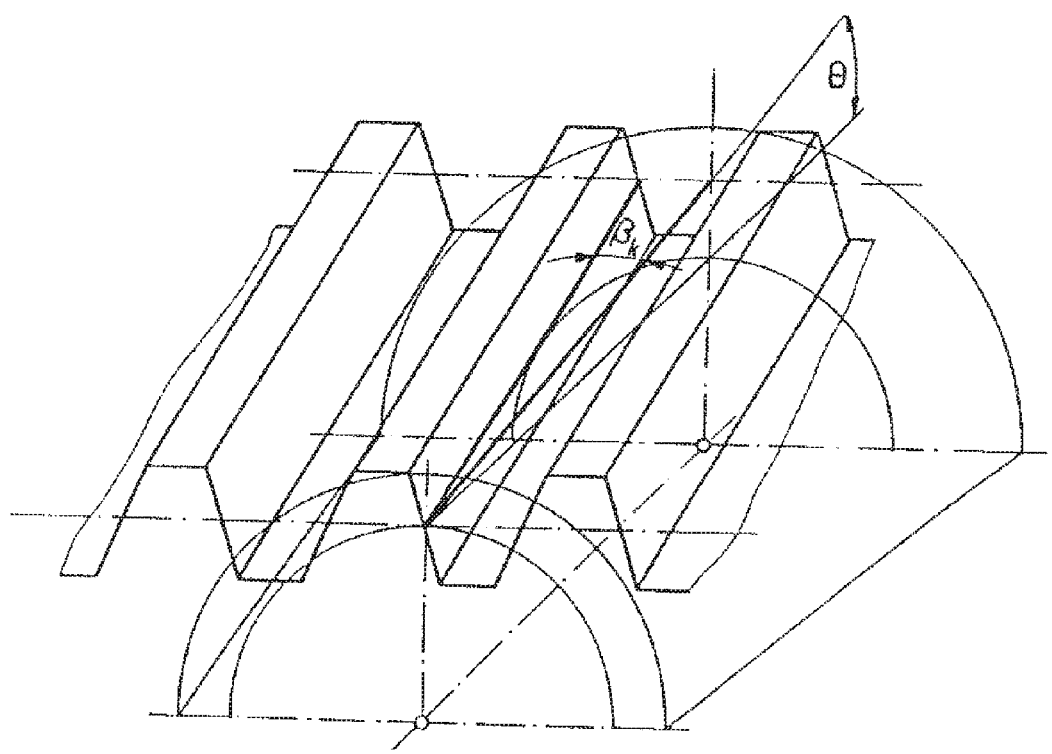
FIG. 13 shows a representation of conical gear teeth having a rack generating them. The rack is pivoted by the helix angle $\beta_k = \beta_w$ and is tilted by the conical angle $\theta = \theta$. (From Zierau, S: Die geometrische Auslegung konischer Zahnräder und Paarungen mit parallelen Achsen [The Geometrical Design of Conical Gears and Pairs Having Parallel Axes], Report No. 32, Institute For Construction Science, Braunschweig Technical University).
Figure 14:
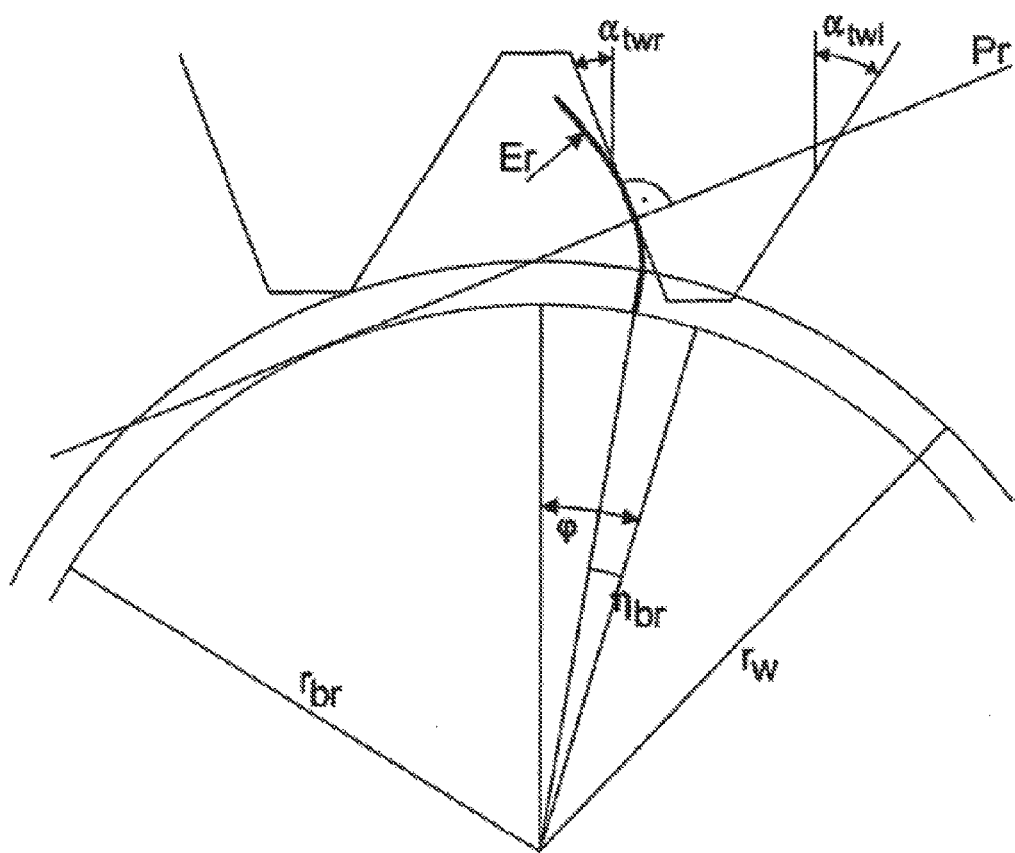
FIG. 14 shows the engagement of a right flank with a generating asymmetrical rack in the transverse section. The profile angle in the transverse section $\alpha_{twr}$ defines the inclination of the engagement planes $P_r$. The gear teeth are rotated by the angle of rotation $\varphi$.

FIG. 14 shows by way of example the contact of a right involute flank with a generating rack with a profile angle $\alpha_{twr}$ in the transverse section. The gear teeth are rotated by the angle of rotation $\varphi$. The contact between the flank and the rack takes place in the engagement plane $P_r$ which is inclined by $\alpha_{twr}$. The contact point between the flank and the rack results for all angles of rotation $\varphi$ as the point of intersection between the flank and the engagement plane. While the gear teeth rotate, the rack is horizontally displaced so that it rolls off the pitch circle with a radius $r_w$ without slippage. The flank and the rack thereby remain in contact. To describe the gear teeth in their whole width, the relative position of the rack to the gear teeth has to be observed in 3D. It is pivoted by the helix angle $\beta_w$ for cylindrical gear teeth. For the case of conical gear teeth, the position of the rack to the gear teeth is described exhaustively in (Zierau) ([The Geometrical Design of Conical Gears and Pairs Having Parallel Axes], Report No. 32, Institute For Construction Science, Braunschweig Technical University). In addition to the pivoting by the helix angle $\beta_w$, a tilt takes place by the conical angle $\theta$ (see FIG. 13). In both cases, the rack has the profile angle $\alpha_{nwF}$ in the normal section. Which combinations of angles $\alpha_{twF}$, $\alpha_{nwF}$ and $\beta_w$ as well as of the normal module $m_n$ and the transverse module $m_t$ are possible to produce given gear teeth results for cylindrical gear teeth from the set of formulas of DIN 3960 and for conical gear teeth additionally from the set of formulas from (Zierau). The formulas required for this can be transferred directly to asymmetrical gear teeth by introducing different profile angles at the left and right sides.

If the geometry and the relative position of the rack to the gear teeth are known, the transverse sections can be determined for any desired width positions and within them the contact point between the rack and the flank. All these contact points in the individual transverse sections form a straight line (straight contact line) in the engagement plane for an angle of rotation $\varphi$. If these contact points are described via w and z from the parameterization in equation (3), a linear relationship (R1) between w, z and $\varphi$ is obtained. If the rack is held fast in space, it is possible for cylindrical gear teeth to displace them in the axial direction. This axial feed $z_V$ is typically set for the workpiece to machine it over the total toothed width and is set for the tool to set the diagonal ratio. So that the gear teeth continue to contact the rack, at two flanks as a rule, the gear teeth have to be rotated about their axis in addition to the displacement. The amount of the rotation results from the lead of the gear teeth and from the amount of the displacement, the rotational sense from the hand of thread. With conical gear teeth, the feed $z_V$ does not take place in the axial direction, but rather tilted by the conical angle $\theta$ with respect to it. The lead required for the calculation of the correction of the angle of rotation is calculated using the same formula as for cylindrical gear teeth from $\beta_w$ and $m_t$. The transverse sections are to be observed in dependence on the axial feed or the feed with the correspondingly corrected angles of rotation for calculating the contact points in the individual transverse sections. A linear relationship (R2) between w, z, $z_V$ and $\varphi$ results from (R1) for the description of the contact points.

Figure 12:
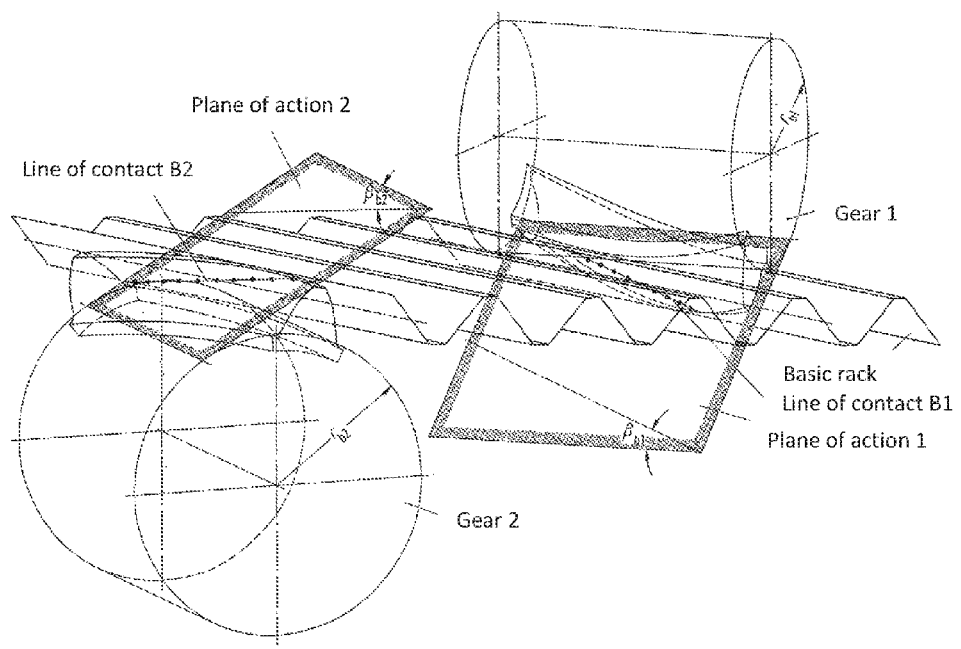
FIG. 12 shows a representation of two gear tooth arrangements in a continuous generating gear train including the common rack and the engagement planes of both gear tooth arrangements. For a better illustration, the relative position of the two gear tooth arrangements does not correspond to that in the continuous generating gear train. This Figure also shows the relative position of cylindrical gear teeth to the generating rack. (From Niemann, G; Winter, H: Maschinenelemente [Machine Elements] Vol. 3 2nd Edition, Springer Verlag, Berlin, 1983).

If two sets of gear teeth are paired in a continuous generating gear train, their two racks have to be congruent at all times, as shown in FIG. 12. This implies that the profile angles $\alpha_{nwF}$ have to be equal for both sets of gear teeth. (R3) furthermore results from this: $\gamma+\beta_{w1}+\beta_{w2}=0$. This condition allows the profile angles to be determined in the normal section or in the transverse section of the two racks from a given axial cross angle for two given sets of gear teeth which can mesh with one another. A change of the base circle radii and of the base helix angles of the worm is thus equivalent to a change of the profile angle and/or of the conical angle and/or of the axial cross angle.

So that the racks are congruent at all times, a linear constraint (R4) results between the two angles of rotation and the two feeds.

If the two angles of rotation and the two feeds are known, the contact point of the two sets of gear teeth can be determined directly by calculating the point of intersection of the two straight contact lines. The parameters $z_{F1}$ and $w_{F1}$ or $z_{F2}$ and $w_{F2}$, which describe the contact point on gear teeth 1 or gear teeth 2, depend linearly on $\varphi_1$, $\varphi_2$, $z_{V1}$ and $z_{V2}$ (R5). If the angles of rotation are eliminated in three relationships, the sought contact paths (R6) follow.

A linear relationship (R7) results between $w_{F1}$, $w_{F2}$, $z_{V1}$ and $z_{V2}$ from (R4) and (R2) for both sets of gear teeth by eliminating $\varphi_1$ and $\varphi_2$ and describes, in dependence on the feed, which generating path on gear set 1 contacts which generating path on gear set 2.

The following has to apply so that the tool and the workpiece mesh with one another:

$$m_{bF1} \cdot \cos\beta_{bF1} = m_{bF2} \cdot \cos\beta_{bF2} \quad (80)$$

Alternatively to the just described approach, it is also possible to carry out the contact paths (R6) and the relationship between the pitch angles (R7) with the aid of a simulation calculation. It is possible with such simulations to calculate the exact geometry of the workpiece from a given tool, in particular from a worm and from a given kinematics, in particular from a given relative position between the tool and the workpiece. Such simulations can be extended such that it is also possible to determine with them which point on the tool produces which point on the workpiece, in dependence on the feed of the tool and of the workpiece. An algorithm suitable for this will be described in the following.

For this purpose, a workpiece is first looked at which is not modified as a rule. Vectors in the normal direction having a previously fixed length are placed on individual points having the coordinates ($w_{F2}$, $z_{F2}$) on the teeth of this workpiece. The length of the vectors corresponds to the allowance of the workpiece prior to grinding, with respect to the non-modified workpiece. The allowance is typically selected to be so large that each vector is shortened at least once during the simulation described in the following. The number of points on the teeth determines the accuracy of the result. These points may be selected as equidistant. The relative position of the workpiece to the worm is predefined at every time, for example by the kinematic chain $K_r$. The section of all vectors is calculated with the worm at each of the discrete times. If a vector does not intersect the worm, it remains unchanged. If it, however, intersects the worm, the point of intersection is calculated and the vector is shortened so much that it ends just at the point of intersection. The spacing of the point of intersection from the worm axis, that is the radius on the worm $r_{F1}$ of the point of intersection, is furthermore calculated and is stored as additional information to the just shortened vector. Since the corrections of the coordinates are not changed during the grinding here, all the vectors on a given radius of the workpiece $r_{F2}$ or on a given generating path $w_{F2}$ have approximately the same length after the simulation was carried out over the total width of the worm.

Figure 15:
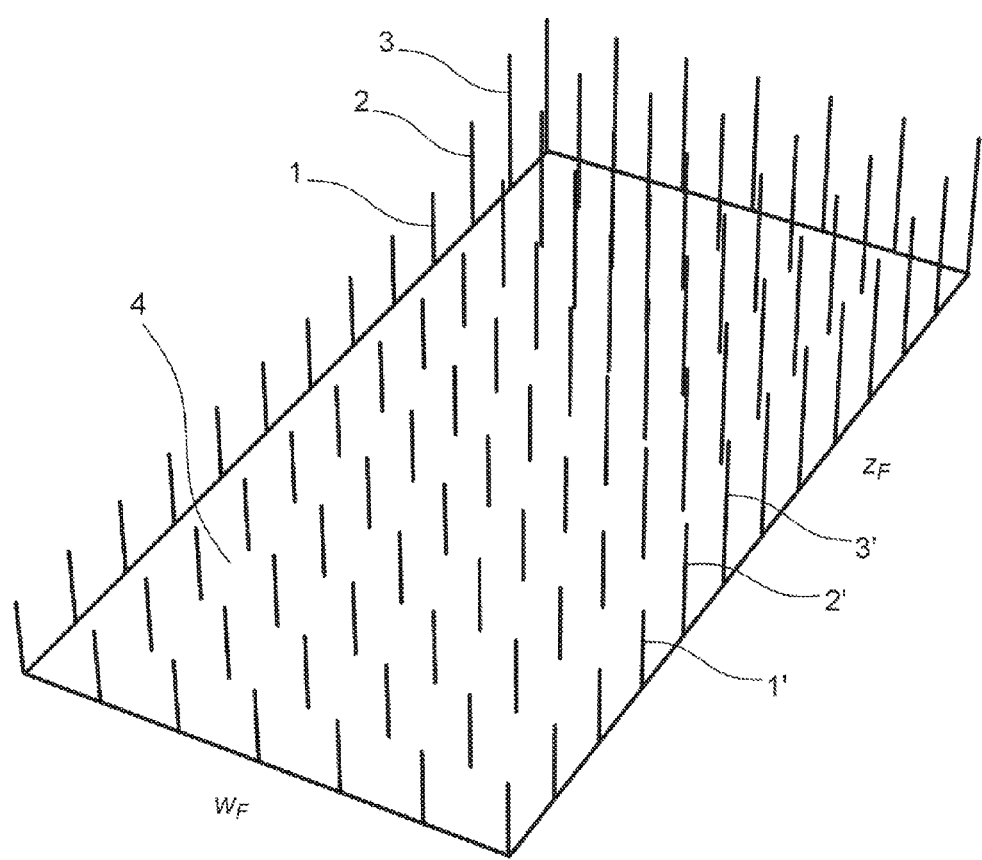
FIG. 15 schematically shows a section of the flank of a workpiece tooth with vectors in the normal direction for a workpiece not ground over the whole width. The number of vectors was considerably reduced here in comparison with a simulation calculation. The plane 4 shown schematically here corresponds to the generally curved flank of the non-modified workpiece onto which the vectors are placed. The vectors 1 and 1' were already swept over by the contact path and are thus completely shortened. The vectors 2 and 2' have already been shortened at least once, but have not yet been swept over by the contact path. The vectors 3 and 3' have not yet been shortened and thus still have the length corresponding to the selected allowance.

The slight differences in the lengths are due to the fact that the algorithm described here causes markings, similar to the generating cuts during hobbing, due to the discretization of the time. These markings, and thus also the differences in the lengths of the vectors on a given radius of the workpiece, can be reduced by a finer discretization of the time, equivalent to a shortening of the time steps. If the simulation is not carried out over the total width of the workpiece, but is rather aborted at a given axial shift position $z_{V2}$ of the workpiece, only the vectors which were already swept over by the contact path have approximately the same length for a given radius on the worm. The remaining vectors either have the originally selected length or were already shortened at least once, but do not yet have the final length since they will be shortened again at a later time (see FIG. 15). This fact can be utilized to determine the contact path for the current feeds of the workpiece and of the worm with great accuracy. All the vectors on a given radius on the workpiece $r_{F2}$ or on the generating path $w_V$ are observed for this purpose and it is determined at which width line positions the transition is from vectors having approximately the same length to those having a length differing therefrom. Since the continuous generating gear train is symmetrical with respect to the swapping over of the workpiece and the worm, the contact path on the worm can be determined in the same manner. If the workpiece and the worm are both cylindrical, the coefficients from equation (26) or (27) can be determined, for example by means of curve fitting from the points on the contact path calculated in this manner. If the vectors are determined along which the contact path extends, the radii on the worm $r_{F1}$ previously stored for them can be read out and it can thus be determined for each radius on the workpiece $r_{F2}$ by which radius on the worm $r_{F1}$ it was ground. These radii can be converted into generating paths. The coefficients from equation (32) can be determined, for example by means of curve fitting, from these value pairs for cylindrical workpieces and cylindrical worms.

If the worm is conical and the workpiece is cylindrical, the contact path for at least two different feeds $z_{V1}$ has to be determined in order additionally to determine the coefficients before $z_{V1}$ in the equations (37), (38) and (45). In an analog manner, at least two different feeds $z_{V2}$ have to be looked at when the workpiece is conical and the worm is cylindrical. If the workpiece and the worm are conical, the contact paths for at least two feeds $z_{V1}$ and at least two feeds $z_{V2}$ have to be looked at to determine all the coefficients from the equations (63), (64) and (73).

Selection of the Macrogeometry of the Worm.

The diagonal ratio calculated here also inter alia depends on the macrogeometry of the worm, in particular on the number of threads, the base helix angle, the base circle radii, the outer diameter (at a defined z position in the case of a conical tool) and, optionally, on the conical angle. These values can therefore be utilized to influence the diagonal ratio to be set with given directions $\rho_F$. This thus also makes it possible to extend or shorten the working region, which can be of advantage for the tool division. An influencing of the diagonal ratio can also be sensible for technological reasons.

Non-Constant Diagonal Ratio.

The method previously described here requires that the machining process has to be carried out with a constant, predefined diagonal ratio. The diagonal ratio and the width of the workpiece, including the overrun, determine the feed of the workpiece required for the machining. Together with the extension of the contact path on the tool, the feed determines the length of the part of the tool involved in the machining, also called the working region. The length of the working region, on the one hand, determines the minimum length of the tool or, with short working regions and long tools, the number of modified regions which can be placed on the worm. It can be advantageous in both cases to extend or to shorten the length of the working region. A possibility of changing the length of the working region depends on changing the geometry of the tool, in particular the base circle radii and the base helix angles. The influence of this variant on the length of the working region is generally very small, however. A further possibility of changing the length of the working region comprises changing the diagonal ratio during the machining. If this is done while the extent of the contact point sweeps over a modified region, this results in deviations of the modification. If the deviation is then still within the tolerance, a change of the diagonal ratio can sensibly be used.

If the modification is designed such that the extent of the contact point sweeps over regions which are not modified, the parts of the worm engaged at this point in time are also not modified. This allows the diagonal ratio to be freely selected while this region is swept over. In order, for example, to minimize the length of the working region, the diagonal ratio can be set to 0. A reduction of the diagonal ratio, however, results in a greater load on the tool, which makes a technological observation necessary. If the stock removal is particularly large while the non-modified region is being produced, it may also be sensible to increase the diagonal ratio in these regions.

Typical examples for modifications which comprise a non-modified region are end reliefs or also generated end reliefs, also called triangular end reliefs.

FIG. 1 shows for the example of two generated end reliefs a division into modified (41 and 41') and non-modified (42, 42', 42") regions. While the extent of the contact point (43 or 43') sweeps over the region 42, only non-modified regions of the worm come into engagement. The diagonal ratio can be freely selected in this region. If a region above 43 or beneath 43' is swept over, the contact point extends at least partly over a modified region. The calculated diagonal ratio has to be observed here to produce free of deviations. It is, however, also possible not to observe the diagonal ratio and to accept deviations. If grinding is carried out on two flanks, both flanks have to be taken into account in this observation. If a deviation-free modification is to be produced, the diagonal ratio can only be freely selected while the contact path sweeps over a non-modified region on both flanks.

Modifications are also possible which are composed of non-modified regions and of regions with modifications extending in different directions. If the modification is designed such that the extent of the contact point between the modified regions sweeps over regions which are not modified, the diagonal ratio can again be selected as desired in these regions. If modified regions are swept over, the diagonal ratio has to be set in accordance with the direction of the just swept over modification. The non-modified regions can be utilized to adapt the diagonal ratio from one modified region to the next.

Figure 2:
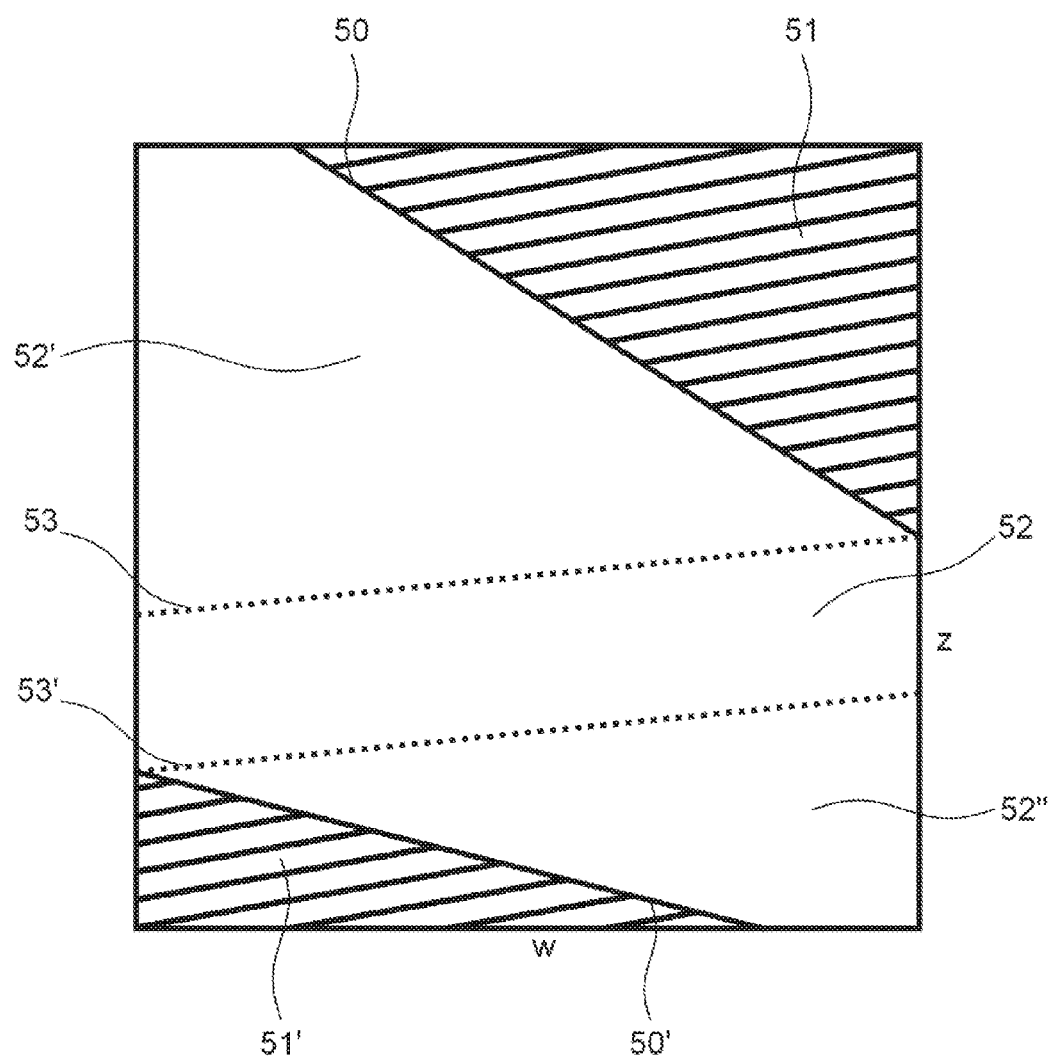
FIG. 2 shows a w-z diagram of a modification comprising regions 51 and 51' modified in accordance with equation (1) and non-modified regions 52, 52' and 52". The regions 51 and 51' have modifications with different directions $\rho_{F2}$. The straight lines 50 and 50' extend in the direction given by the respective $\rho_{F2}$. The straight lines 53 and 53' correspond to the extent of the contact point.

FIG. 2 shows for the example of two generated end reliefs which extend in different directions a division into modified (51 and 51') and non-modified (52, 52', 52'') regions. The directions $\rho_{F2}$ (50 and 50') of the modifications in accordance with equation (1) are different in the modified regions. Different diagonal ratios thus have to be set for the machining of the two regions. While the extent of the contact point (53 and 53') sweeps over the region 52, the diagonal ratio can be freely selected. To be able to produce the modification free of deviations the straight lines 53 and 53' have to lie at the same height or 53 above 53'. If, however, 53' is above 53, the contact point extends both over the region 51 and over the region 51' for which different diagonal ratios are to be set. This produces a deviation on at least one of the two regions. If grinding takes place on two flanks, an observation of both flanks is also necessary here. If grinding should be free of deviations, care should be taken that the regions ground simultaneously on both sides require the same diagonal ratio. If this is not the case, the modification is produced with deviations.

It is, however, also possible to change the diagonal ratio specifically while the contact path on the workpiece sweeps over modified regions. To describe this mathematically, equation (12) is replaced by a variant, generally non-linear:

$$z_{V1}(z_{V2}) = F_{Z_{V1}}(z_{V2}) \quad (81)$$

In this respect, $F_{Z_{V1}}$ is any desired continuous function which describes a relationship between $z_{V1}$ and $z_{V2}$. The diagonal ratio is given by the derivation from $F_{Z_{V1}}(z_{V2})$ to $z_{V2}$ and is thus generally not constant. If $F_{Z_{V1}}$ is not linear, straight lines on the worm in the w-z diagram are no longer mapped onto straight lines on the workpiece in the w-z diagram. The curve which describes the extent of the points in the w-z diagram on the workpiece which are mapped onto a straight line on the worm defined by $X_{F1}$ can be described by a function $z_{F2}(w_{F2}, X_{F1})$. For the most general case of a conical workpiece and a conical worm, a relationship (R20) is obtained between $F_{Z_{V1}}(z_{V2})$, $z_{F2}(w_{F2}, X_{F1})$, $w_{F2}$ and $X_{F1}$ in that the equation system from equation (63) and (64) is resolved for $z_{V1}$ and $z_{V2}$, in that the two feeds are inserted into equation (81) and in that subsequently $z_{F1}$ and $w_{F1}$ are replaced with the aid of equations (13) and (73). The extent described by $z_{F2}(w_{F2}, X_{F1})$ of the points on the workpiece flank which are mapped onto the straight line on the worm defined by $X_{F1}$ can be determined for a given function $F_{Z_{V1}}$ for every $X_{F1}$ using this relationship. Conversely, the function $F_{Z_{V1}}(z_{V2})$ can also be determined from an extent $z_{F2}(w_{F2}, X_{F1})$ given for a $X_{F1}$. Furthermore, a function $F_{X_{F1}}(w_{F2}, z_{F2})$ can be determined from the relationship (R20) with which function, for given $z_{F2}$ and $w_{F2}$, $X_{F1}$ and thus the straight line on the worm are determined onto which straight line the point on the gear teeth is mapped. An analog procedure can be followed for the cases in which the workpiece and/or the worm are cylindrical.

Figure 3A:
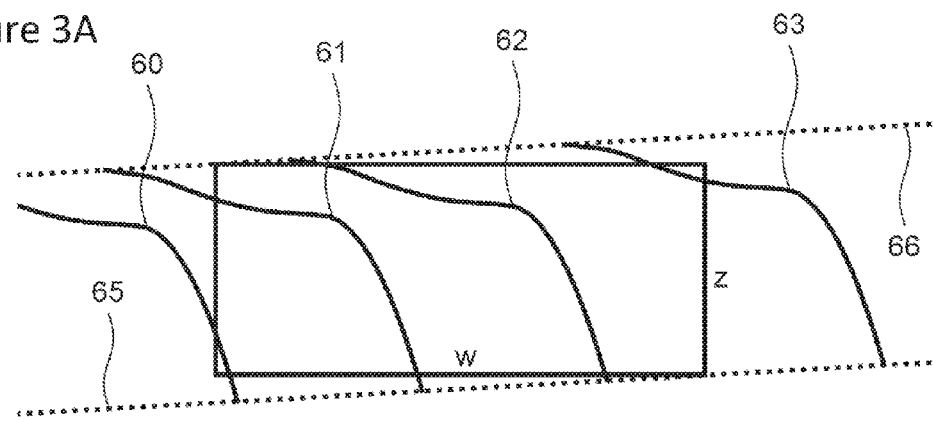
FIG. 3A shows for the example of a right flank of a cylindrical workpiece slanted to the right four curves 60-63 which each describe the extent of the points in the w-z diagram on the workpiece which are mapped onto a straight line on the worm. The four curves correspond to four different values $X_{F1}$ and thus to four different straight lines on the worm. The curves are displaced with respect to one another along the parallel straight lines 65 and 66.

If only the part of the extent is looked for a $X_{F1}$ which lies on the flank, .e. within the w-z diagram, this generally does not define the function $F_{Z_{V1}}(z_{V2})$ for all the values of $z_{V2}$ since, for other feed positions of the workpiece, parts of the then current extent sweep over the flank which were still outside the diagram for $X_{F1}$. FIG. 3A shows this by way of example for a cylindrical workpiece. This can be utilized to compose $F_{Z_{V1}}(z_{V2})$ section-wise from the extents for different $X_{F1}$ or to expand the definition range. It is alternatively also possible to determine $F_{Z_{V1}}(z_{V2})$ from an extent for a $X_{F1}$ which was continued beyond the limits of the w-z diagram. This extent is advantageously continued so much that every part of the w-z diagram is swept over by the extent. FIG. 3A shows how such an extent can be selected. In this example, the function $F_{Z_{V1}}(z_{V2})$ can then be determined from one of the four extents 60-63.

In particular when $F_{Z_{V1}}(z_{V2})$ is to be determined from the continuation of an extent for an $X_{F1}$, it is of particular significance to know how the extent changes from one $X_{F1}$ to another $X_{F1}$. This is calculated for the general case by the steps:

Calculation of $F_{Z_{V1}}(z_{V2})$ from the extent for an $X_{F1}$

Calculation of the extent for another $X_{F1}$ from the previously determined $F_{Z_{V1}}(z_{V2})$.

Figure 3B:
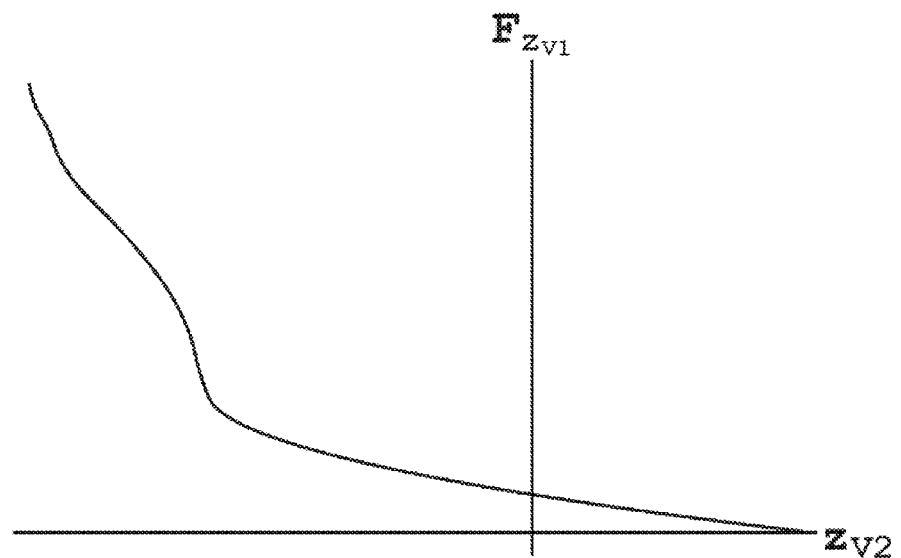
FIG. 3B shows matching FIG. 3A, the function $F_{Z_{V1}}(z_{V2})$ which describes the dependence of $z_{V1}$ on $z_{V2}$.

If the gear teeth are cylindrical, it results from this calculation that an extent $X_{F1}$ results from the extent for another $X_{F1}$ by displacement along a marked direction. This direction is shown by the two parallel straight lines 65 and 66 in FIG. 3. If the worm is cylindrical, the direction of this straight line is independent of the geometry of the worm and thus only depends on the geometry of the workpiece. Conical worms can be used to influence the direction of this straight line and thus to design the produced modifications with even more variability. This direction can be influenced via the geometry of the conical worm ($r_{bF1}$ or $\beta_{bF1}$) and the axial cross angle and the axial spacing, in particular of the cone angle.

If the gear teeth are conical, the change of the extent from one $X_{F1}$ to another can be influenced, both for conical and cylindrical worms, via the geometry of the worm ($r_{bF1}$ or $\beta_{bF1}$, $\theta_1$) and the axial cross angle. The relationship can, however, no longer be clearly described easily and has to be determined by the above-described steps.

If generating grinding takes place on one flank, $F_{Z_{V1}}(z_{V2})$ and thus the extent can be predefined separately for each flank.

If generating grinding takes place on both flanks, one $F_{Z_{V1}}(z_{V2})$ influences the extents on both flanks. If the extent is predefined on one flank 1, the extent resulting from this on the other flank 2 can be determined by the steps:

Calculation of $F_{Z_{V1}}(z_{V2})$ from the extent of flank 1

Calculation of the extent of flank 2 from $F_{Z_{V1}}(z_{V2})$.

If the extent on a flank 1 is predefined, the extent on flank 2 resulting from this is influenced by the geometry of the worm ($r_{bF1}$ or $\beta_{bF1}$, $\theta_1$) and the axial cross angle and the axial spacing. This influence can be utilized to coordinate $F_{Z_{V1}}(z_{V2})$, the geometry of the worm and the axial cross angle and the axial spacing such that the extents on both flanks correspond to the desired extents as well as possible.

If the worm has a modification in accordance with equation (1), the value of the modification on the workpiece along an extent $z_{F2}(w_{F2}, X_{F1})$ equals:

$$-\frac{\cos\beta_{bF1}}{\cos\beta_{bF2}} \cdot F_{Ft1}(X_{F1}) \quad (82)$$

If the values of the modification are known for all extents on the workpiece, the function $F_{Ft1}(X_{F1})$ results from this which defines the modification on the worm. Parameterized over $w_{F2}$ and $z_{F2}$, the modification $f_{Ft2}(w_{F2},z_{F2})$ on the workpiece can be written as:

$$f_{Ft2}(w_{F2}, z_{F2}) = -\frac{\cos\beta_{bF1}}{\cos\beta_{bF2}} \cdot F_{Ft1}(F_{X_{F1}}(w_{F2}, z_{F2})) \quad (83)$$

Figure 4:
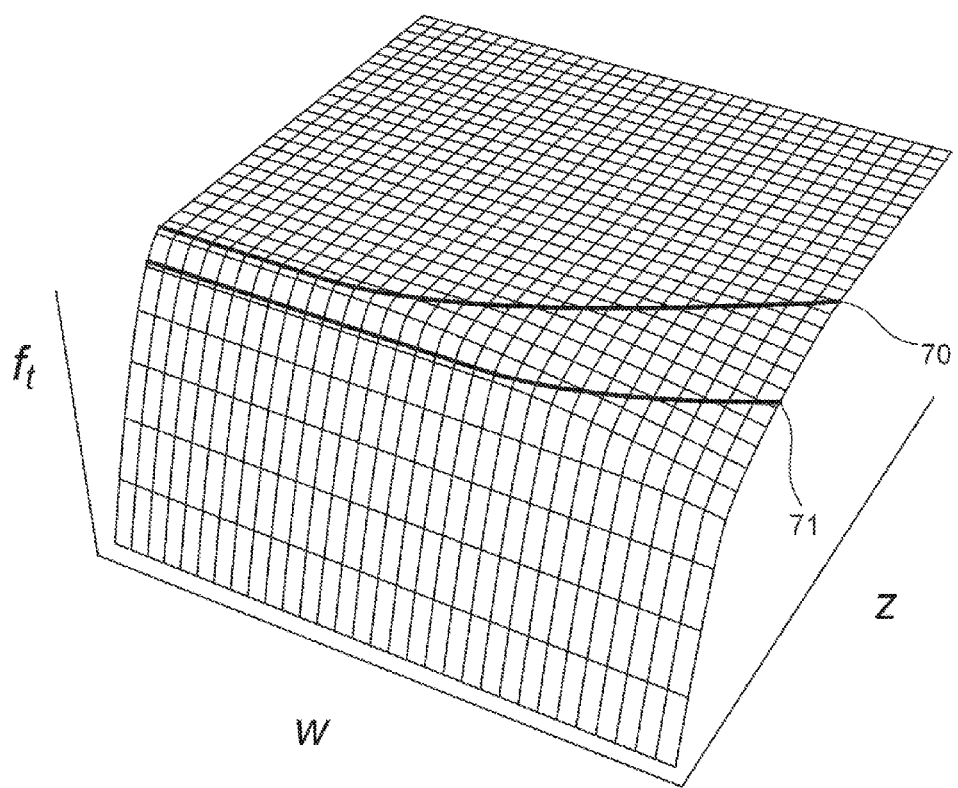
FIG. 4 shows a w-z diagram of a right flank of a left handed cylindrical workpiece slanted to the left onto which a modification has been applied by means of variable diagonal ratios. Line 70 marks the extent of the points which are mapped onto the straight line defined by $X_{F1}=0$ on the worm. Line 71 marks the extent of the points which are mapped onto the straight line defined by a $X_{F1}>0$ on the worm. The value of the modification is constant along the respective extents.
Figure 5A:
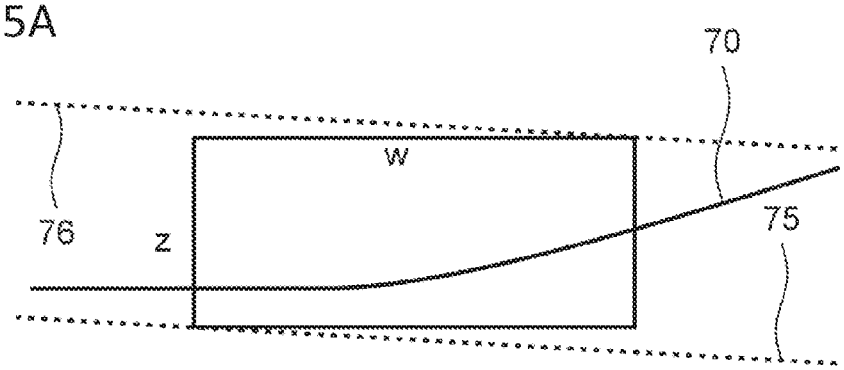
FIG. 5A shows in a scheme as in FIG. 3A, the extent 70 of the points on the workpiece which, in the example from FIG. 4, are mapped onto the straight line defined by $X_{F1}=0$ on the worm. The straight lines 75 and 76 define the direction along which the extents for different $X_{F1}$ are displaced with respect to one another.
Figure 5B:
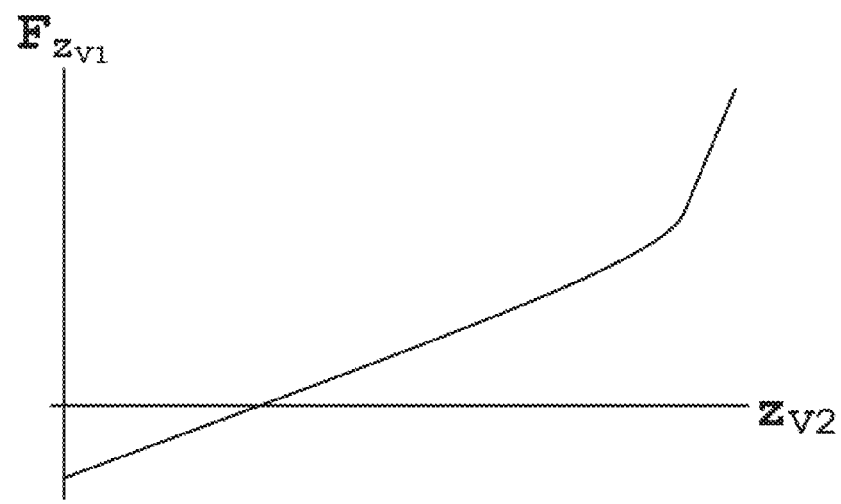
FIG. 5B shows the function $F_{Z_{V1}}(z_{V2})$ which is used in the example in FIG. 4 and which describes the dependence of $z_{V1}$ on $z_{V2}$.
Figure 5C:
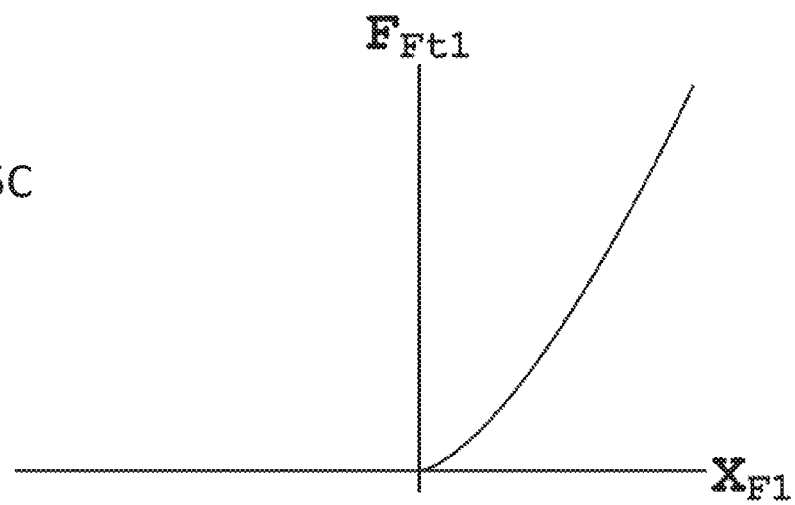
FIG. 5C shows the function $F_{Ft1}(X_{F1})$ used in FIG. 4 which defines the modification on the worm in accordance with equation (1).

A specific application example is shown in FIG. 4. The modification is selected such that it approximates the combination of a generated end relief and of an end relief in the tooth trace direction. The transition between the start of the two reliefs is selected as tangential by way of example here, whereby the extent 70 is given by a curve which can be differentiated. The value of the modification along 70 is selected as equal to 0 here. The value of the modification falls in the direction of the extent 71. Since the spacing between 70 and 71 is smaller in the region of the end relief in the tooth trace direction than the spacing between 70 and 71 in the region of the generated end relief, the pitch of the modification in the region of the end relief is larger in the tooth trace direction than in the region of the generated end relief. The ratio of these two pitches is decisively influenced by the direction of the displacement of the extents (75 and 76). This direction can be adapted by the use of conical worms and by selection of a suitable geometry of the worm. The ratio between the pitches can thus also be set as desired.

Superposition with Other Modifications.

Modifications which are known from the prior art can be additively superposed without interference on the modifications which can be produced using the method described here. They are pure profile modifications, on the one hand. Such modifications $f_{PFt}$, which can be separately predefined for the left and right flanks, only depend on the generating path and not on the z position for cylindrical gearings. They can be mathematically described by the following equation:

$$f_{PFt}=f_{PFt}(w_F) \quad (84.1)$$

Pure profile modifications can be implemented by a tool modified in the profile line direction. Such modifications in the profile line direction can be additively superposed without interference with the modifications from equation (1). This modification is placed in the dresser as a rule on generating grinding using dressable worms. The dressing process can then be carried out unchanged and the profile modifications form as desired on the worm and later, during grinding, on the workpiece.

For conical workpieces, profile modifications depend on the z-position. In a w-z-diagram, points having the same value of modification will lie on a straight line having a slope mF. This slope can be calculated from the mapping of points on the tool to points on the workpiece described herein, both for the case that a cylindrical tool is used and for the case that a conical tool is used. For conical gearings $f_{PFt}$ can be written as:

$$f_{PFt}=f_{PFt}(w_F+m_F z_F) \quad (84.2)$$

A further method known from the prior art [DE10208531] of producing modifications on gear teeth comprises correcting the kinematics during the grinding process. Such modifications can be implemented, for example, by changing the axial spacing and/or by correcting the angle of rotation and/or by correcting the feeds. Such corrections always have an effect along the contact path and have the same value along it. The modifications which can be produced by this method can thus also be described by equation (1). The direction given by $\rho_{KF}$ can, however, not be influenced in this method since it only depends on the base helix angle of the workpiece. This modification $f_{KFt}$ can be mathematically described as follows:

$$f_{KFt}(w_F,z_F)=F_{KFt}(w_F \tan \rho_{KF}+z_F) \quad (85)$$

In this respect, the functions $F_{KFt}$ can be any desired continuous functions. The required corrections of the grinding kinematics can be calculated from the functions $F_{KFt}$ for the left and right flanks. Naturally twisted crownings or also distorted end reliefs can, for example, be manufactured using this method.

Since no correction of the grinding kinematics is necessary, apart from diagonal shifting, in the present disclosure underlying this application, a correction of the grinding kinematics and thus a modification in accordance with equation (85) can be additively superposed without interference.

In summary, the modifications $f_{GFt}$ which can be produced can be described as follows:

$$f_{GFt}(w_F,z_F)=F_{Ft}(w_F \tan \rho_F+z_F)+f_{PFt}(w_F)+F_{KFt}(w_F \tan \rho_{KF}+z_F) \quad (86)$$

where $F_{Ft}$, $f_{PFt}$ and $F_{KFt}$ are continuous functions freely predefinable for both flanks and the angles $\rho_F$ define directions freely definable for both flanks. The special cases are also in particular possible in which at least one of the functions $F_{Ft}$, $f_{PFt}$ and $F_{KFt}$ is constant, is in particular 0.

If a modification $f_F$ is given, it can generally be resolved approximately, in individual cases also exactly, into the three terms from equation (86), for example, with the aid of curve fitting. For this purpose, the functions $F_{Ft}$, $f_{PFt}$ and $F_{KFt}$ and the directions $\rho_F$ are determined such that the deviations between $f_{GFT}$ and $f_F$ are optimum, in particular minimal. This deviation can, for example, be calculated at discrete points $(w_{Fi}, z_{Fi})$ or continuously over the whole w-z diagram. The continuous calculation of the deviation can, for example, be carried out with the help of an integral of a distance function over all values of w and z. It is also possible to calculate the deviations weighted in dependence on the position of the points in a w-z diagram. This is in particular of advantage when the tolerance to be observed is not the same everywhere. To take these predefinitions into account, it is also possible as an extension not to select the distance function used for the curve fitting as the same for all values of $w_F$ and $z_F$. A typical variant of the curve fitting is the method of least squares which uses the 2-norm as the distance function.

The desired modification can be given, for example, by a continuous function $f_F$, by a scatter plot $(w_{Fj},z_{Fj},f_{Fj})$ or by a combination of the two. The functions $F_{Ft}$, $f_{PFt}$ and $F_{KFt}$ can be calculated as continuous functions with the aid of curve fitting. It is alternatively also possible to calculate functional values only at discrete points $(w_{Fk},z_{Fk})$. Continuous functions can be calculated from these discrete points by interpolation.

Technological aspects can optionally also additionally be taken into account in the curve fitting. For example, it may be of advantage to restrict the diagonal ratios and thus the directions $\rho_F$ for technological reasons. The distance function used in the curve fitting and to be minimized can generally also depend on technological parameters in addition to the deviation between $f_{GFT}$ and $f_F$.

If the method is used with a non-constant diagonal ratio, equation (86) has to be modified such that $F_{Ft}$ is to be replaced with a modification in accordance with equation (83). If a given modification should be approximated or exactly resolved by curve fitting by such a composed modification into such a one, the functions $F_{Ft1}$, $F_{Zv_1}$, $f_{PFt}$ and $F_{KFt}$ and the macrogeometry of the worm, in particular the conical angle and the profile angle can be determined such that the spacing from the desired modification becomes minimal. If the option of grinding with a conical worm is considered, the geometry of the worm, in particular the conical angle and the profile angle of the generating rack, as well as the axial cross angle, can also additionally be optimized in the curve fitting. This is in particular helpful when grinding should take place on two flanks. In this case, the function $F_{Zv_1}$ is the same for the left and right flanks. The functions $F_{Ft1}$, $f_{PFt}$ and $F_{KFt}$ are generally different for the left and right flanks, both with grinding on one flank and with grinding on two flanks.

Splitting Up of the Tool.

The machining of the gear teeth frequently takes place in rough machining steps and finishing or fine machining steps. These different machining steps can be carried out both with the same regions on the tool and with different regions or with different tools. The rough machining steps can be carried out in total or in part using the method described here. It is, however, also possible to carry out other methods for the rough machining steps, in particular axial grinding with a diagonal ratio of zero or with a very small technologically induced diagonal ratio. Such a rough machining allows the rough machining region or regions on the worm to be utilized better, but does not produce the desired modification on the gear teeth. If the method described here is already used during rough machining, the allowance at the start of the finish or fine machining is distributed more evenly and the fine machining region is loaded more evenly. It is also possible to use the method described here in rough machining, but to select the modification to be smaller in amount in comparison with fine machining in order not to overload the worm at the regions of the rough machining region which have to remove a lot of material. If a plurality of rough machining steps are carried out, the amount of the modification can be increased from step to step. It is also possible only to approximate the modification produced on the gear teeth during rough machining, in particular to approximate the direction given by $\rho_F$ in order thereby to extend or shorten the working region in order thus to divide the worm in an optimized manner from technological aspects. Rough and fine machining regions can be positioned as desired over the worm width both with cylindrical worms and with conical worms.

Transferability to Other Production Methods.

The method underlying the present disclosure has previously been described for the example of generating grinding using dressable tools and dressing by means of a profile roller dresser. However, non-dressable tools can equally be used as long as they have a modification in accordance with equation (1). Depending on the manufacturing method with which these non-dressable tools are produced, it is possible to select the direction of constant modification given by $\rho_F$ freely or at least freely within certain limits, so that in turn the diagonal ratio during generating grinding and thus also the working region can be influenced. This free selection of $\rho_F$ is also possible with a contour dressing of the tool.

The method can also be used in other production methods which use a toothed tool and the kinematics of a continuous generating gear train and allow a feed of the tool. These further production methods are, for example, hobbing, skiving hobbing, shaving and honing. The tools likewise have to have a modification in accordance with equation (1). A free selection of $\rho_F$ on the tool is also possible here depending on the production method of the tool.

Application Examples

Some application examples will be described in the following for which the advantage of the present disclosure described here is shown with respect to the prior art.

Figure 6:
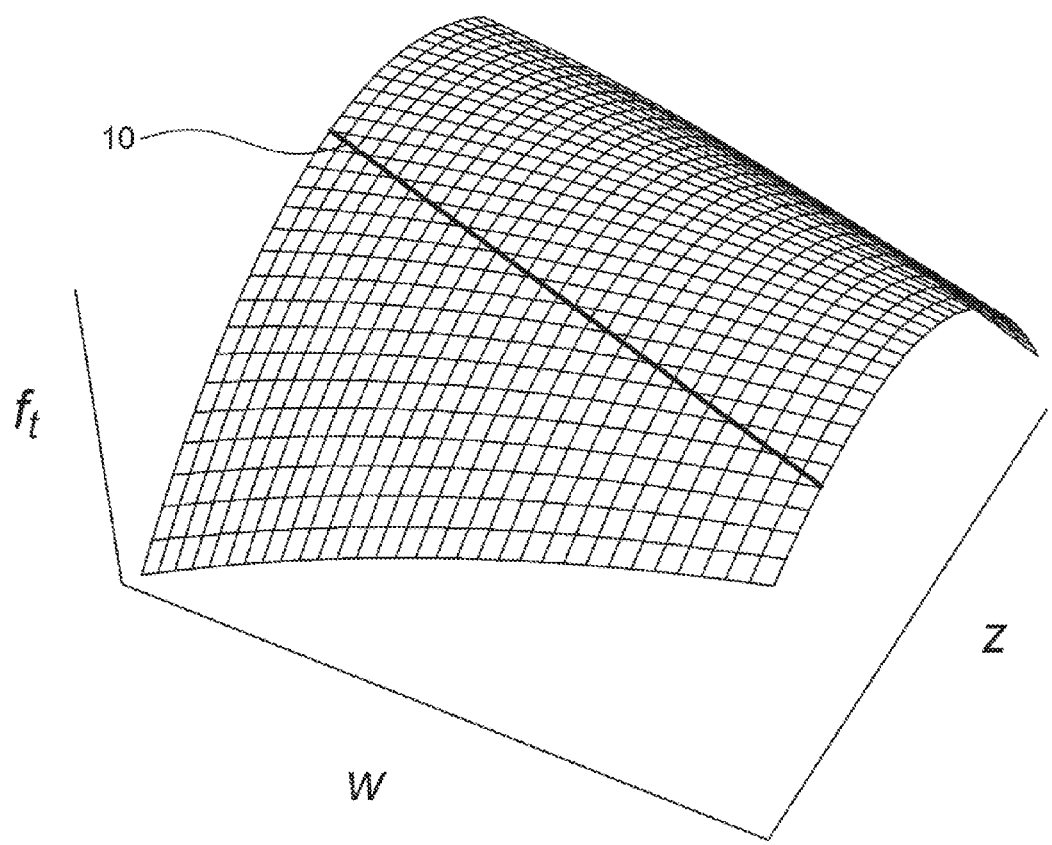
FIG. 6 shows a w-z diagram of a natural twisted tooth trace crowning. Line 10 marks a contact path. This corresponds here to a line having a constant value of the modification.
Figure 7:
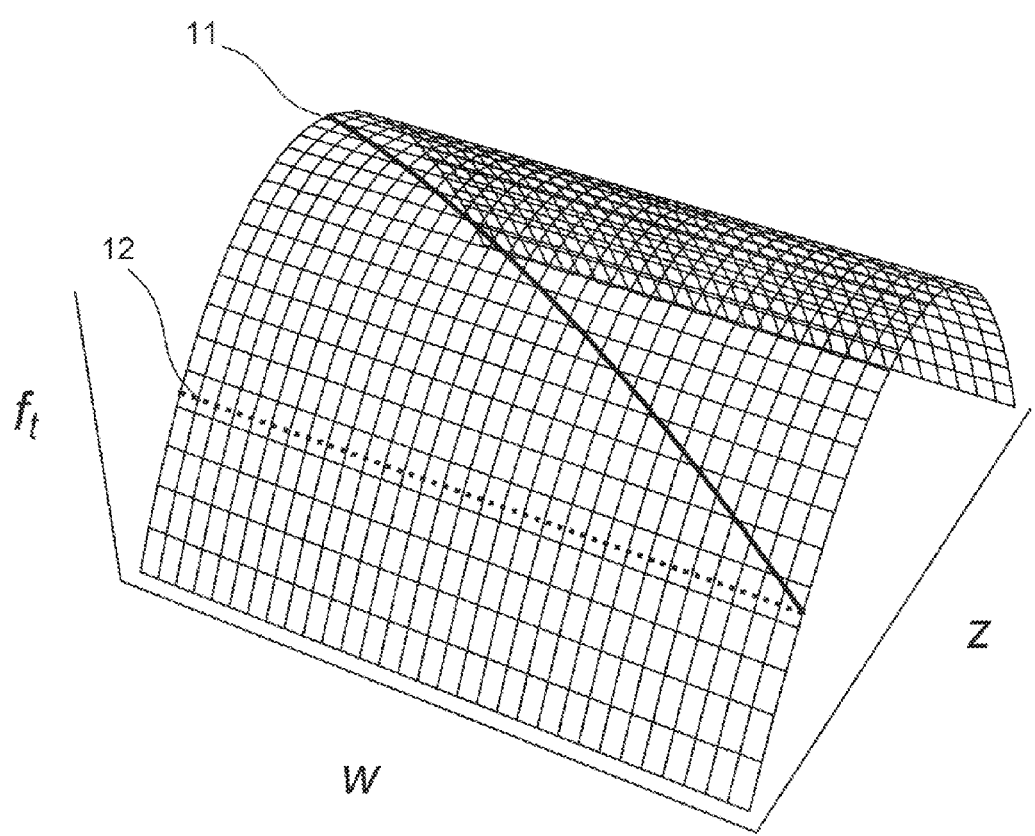
FIG. 7 shows a w-z diagram of a pure tooth trace crowning. Line 11 marks a contact path. Line 12 marks a straight line having a constant value of the modification.
Figure 8:
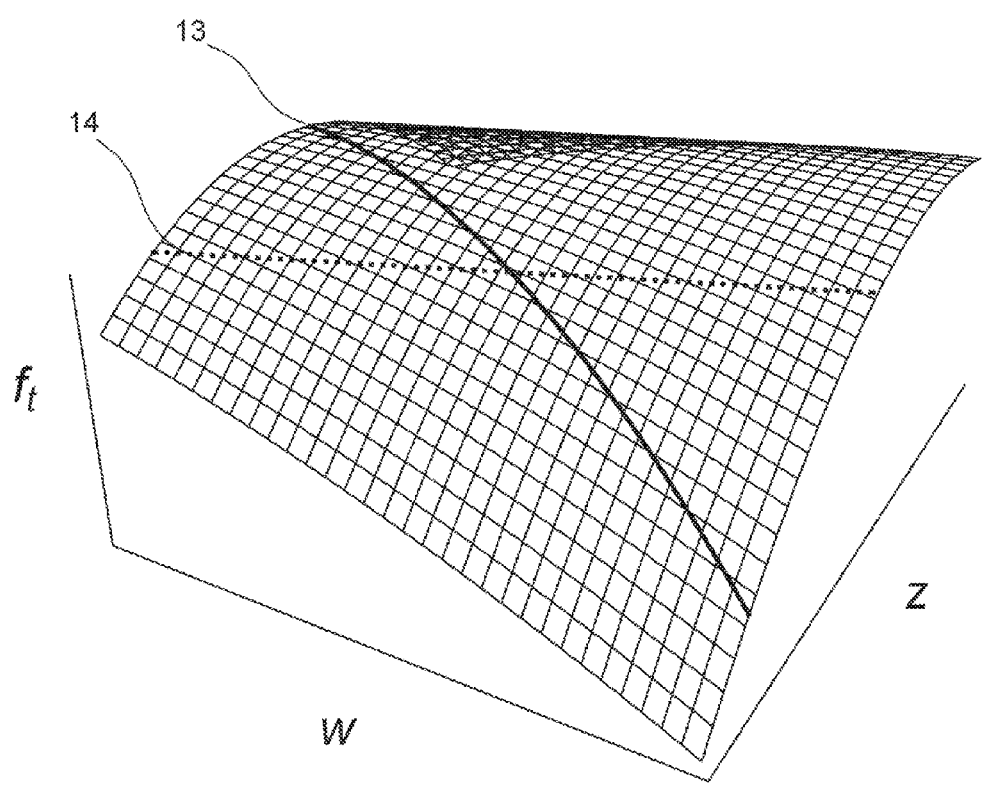
FIG. 8 shows a w-z diagram of a crowning extending in a specific direction. Line 13 marks a contact path. Line 14 marks a straight line having a constant value of the modification.

FIG. 6 shows a naturally twisted tooth trace crowning such as can be produced by only a correction of the grinding kinematics. The direction along which the produced modification is constant is given by the contact path 10. This direction can, however, be freely selected using the method described here. To produce a pure tooth trace crowning which is not distorted, the direction is selected, as shown in FIG. 7 such that the line having a constant modification 12 extends in parallel with the w axis. The modification produced along the contact path 11 has a constant value. The direction of constant modification can, however, also be selected as desired so that a crowning can be produced which runs, as shown in FIG. 8, in a specific direction. Such crowns produce a specific twist and are, like non-twisted tooth trace crownings, free of shape deviations.

Figure 9:
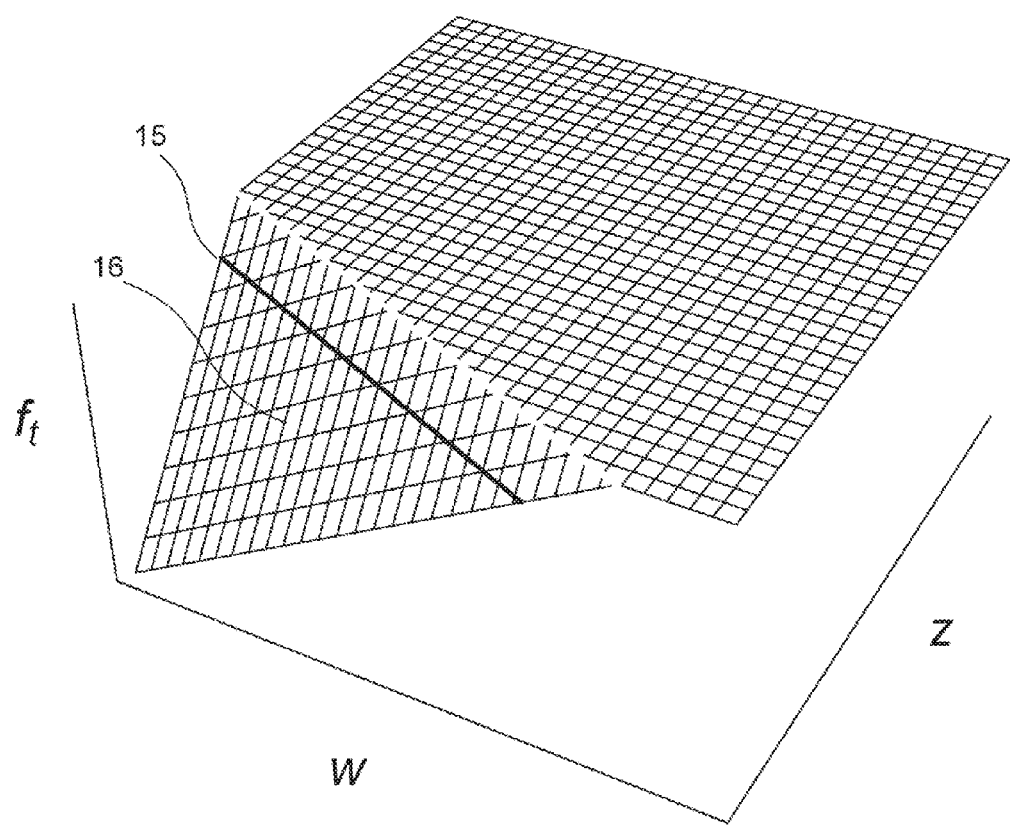
FIG. 9 shows a linear end relief 16 without a transition region such as is produced in accordance with the prior art by corrected grinding kinematics. Line 15 marks a contact path which simultaneously corresponds to a straight line having a constant value of the modification.
Figure 10:
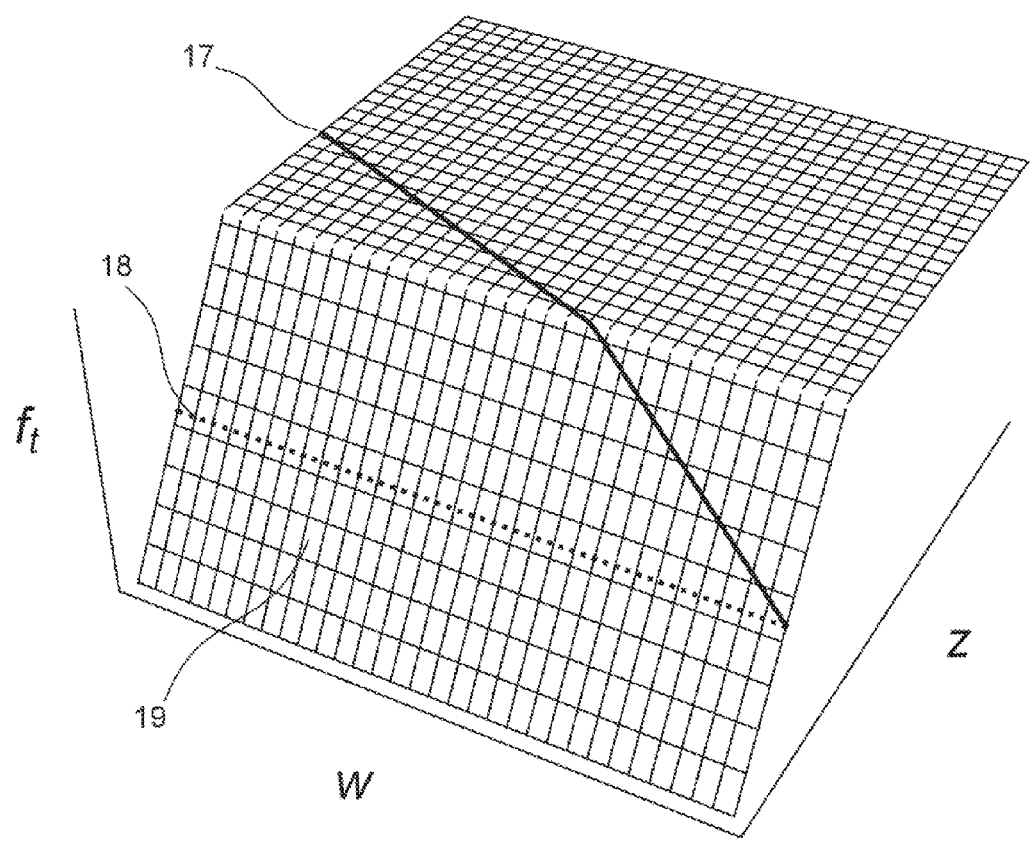
FIG. 10 shows a linear end relief 19 without a transition region such as can be produced with the method described here. Line 17 marks a contact path. Line 18 marks a straight line having a constant value of the modification.
Figure 11:
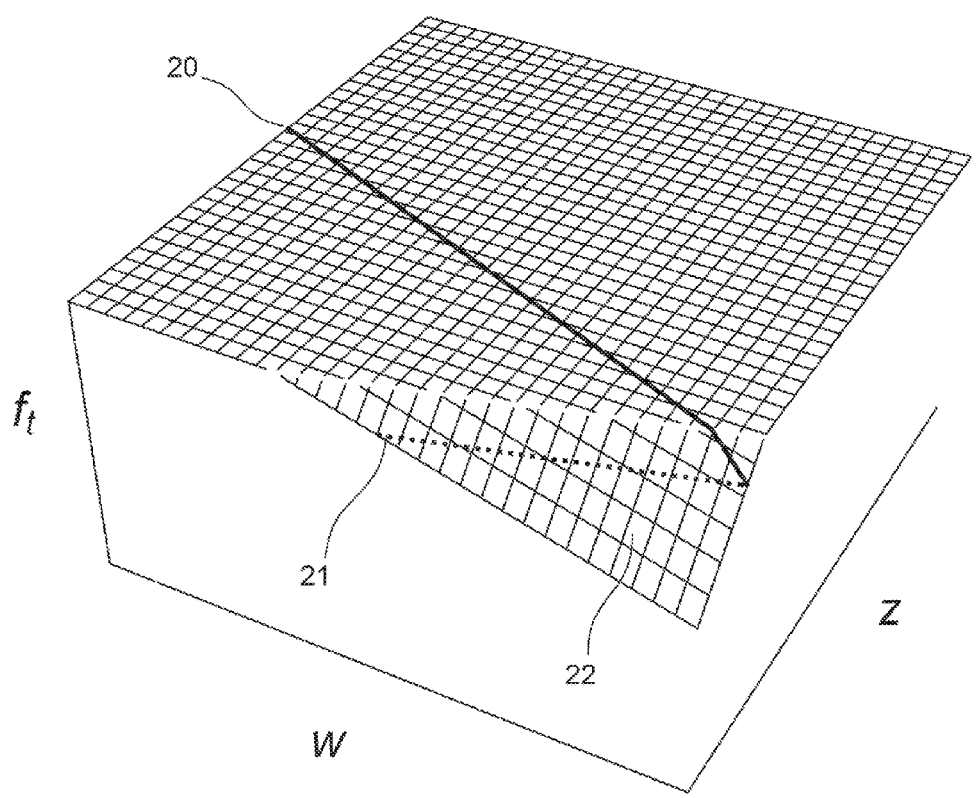
FIG. 11 shows a linear generated end relief 22 without a transition region such as can be produced with the method described here. Line 20 marks a contact path. Line 21 marks a straight line having a constant value of the modification.

A further application example is represented by end reliefs. In accordance with the prior art, they can only be produced in distorted form 16, as shown in FIG. 9, by corrected grinding kinematics. The line of constant modification extends along the contact path 15. However, an extent of this line is desired in parallel with the w axis, as 18 in FIG. 10 shows, which is made possible by the method described here. This produces a non-distorted end relief 19. A variation of the end reliefs is represented by generated end reliefs 22, as shown in FIG. 11. The line of constant modification 21 here extends in a specifically predefined direction, typically in parallel with the line of action of the gear teeth. The end reliefs and generated end reliefs shown here have linear extents without transition regions. However, circular, logarithmic, parabolic and exponential extents are, for example, also possible here, with and without transition regions, or also any other form of the extent.

List of Aspects Worthy of Protection Per Se.

Important aspects of the present disclosure will be presented in the following which are the subject matter of the present application both per se and in combination with one another and in combination with the aspects presented in the previous description.

Basic Procedure in a Diagonal Generating Method Using a Modified Tool

1. A method for the production of a workpiece having a corrected gear tooth geometry and/or a modified surface structure by a diagonal generating method by means of a modified tool, wherein a specific modification of the surface geometry of the tool is produced, wherein the specific modification in the generating pattern has a constant value at least locally in a first direction of the tool and is given by a function $F_{Ft1}$ in a second direction of the tool, which extends perpendicular to the first direction, and/or wherein the specific modification is produced in that the position of the dresser to the tool is varied during dressing in dependence on the angle of rotation of the tool and/or on the tool width position, and wherein the specific modification of the tool by the diagonal generating method produces a corresponding modification on the surface of the workpiece.

2. A method in accordance with aspect 1, wherein a desired modification of the surface geometry of the workpiece is predefined and the modification of the surface geometry of the tool required for the production of this desired modification is determined.

3. A method in accordance with aspect 2, wherein the modification of the surface geometry of the tool is determined from the desired modification of the surface geometry of the workpiece by means of the inversion of an association function which describes the mapping of the surface of the tool onto the surface of the workpiece in diagonal-feed generating grinding, wherein the determination may take place using a function which analytically describes the mapping of the surface of the tool onto the surface of the workpiece in diagonal-feed generating grinding.

4. A method in accordance with aspect 2 or aspect 3, wherein the desired modification of the surface geometry of the workpiece is predefined as a continuous function and/or on a scatter plot, wherein the continuous function may be predefined on a surface on the tooth flank and/or the scatter plot optionally spans a surface on the tooth flank.

5. A method in accordance with one of the aspects 2 to 4, wherein the modification of the surface geometry of the tool is determined as a continuous function and/or on a scatter plot, wherein the continuous function may be determined on a surface on the tooth flank and/or the scatter plot optionally spans a surface on the tooth flank.

6. A method in accordance with one of the aspects 2 to 5, wherein the desired modification of the surface geometry of the workpiece is predefinable as a function which is given by a function $F_{Ft2}$ in the generating pattern at least locally in a second direction of the workpiece, wherein the function $F_{Ft2}$ and/or the second direction is/are optionally freely predefinable at least within specific conditions.

7. A method in accordance with one of the aspects 2 to 5, wherein the desired modification of the surface geometry of the workpiece is predefinable as a modification which has a constant value in the generating pattern at least locally in a first direction of the workpiece and is given by a function $F_{Ft2}$ in a second direction of the workpiece which extends perpendicular to the first direction, wherein the function $F_{Ft2}$ and/or the first direction is/are optionally freely predefinable at least within specific conditions.

8. A method in accordance with one of the preceding aspects, wherein a desired modification of the surface geometry of the workpiece is predefined, wherein a suitable first direction of the modification of the surface geometry of the tool and/or of the line of action of the dresser to the tool during dressing is determined in dependence on the desired modification of the surface geometry of the workpiece.

9. A method in accordance with one of the preceding aspects, wherein a desired modification of the surface geometry of the workpiece is predefined, wherein a suitable function $F_{Ft2}$ of the surface geometry of the tool is determined in dependence on the desired modification of the surface geometry of the workpiece, and/or wherein a suitable variation of the position of the dresser to the tool on dressing in dependence on the angle of rotation of the tool and/or on the tool width position is determined in dependence on the desired modification of the surface geometry of the workpiece.

10. A method in accordance with aspect 8 or aspect 9, wherein a suitable diagonal ratio for the machining process is additionally determined in dependence on the desired modification of the surface geometry of the workpiece.

11. A method in particular in accordance with one of the preceding aspects, in particular by a hard fine machining process, in particular by generating grinding or honing, wherein a modification is produced by means of a specific modification of the surface geometry of the tool on the active surface of the workpiece machined therewith, wherein the desired modification of the surface geometry of the workpiece on the tooth flank has a constant value at least locally in the generating pattern in a first direction of the workpiece and is given by a function $F_{Ft2}$ in a second direction of the workpiece which extends perpendicular to the first direction, and the modification of the surface geometry of the tool used for producing this modification of the surface geometry of the workpiece has a constant value at least locally in the generating pattern in a first direction of the tool and further optionally is given in a second direction of the tool which extends perpendicular to the first direction by the same function $F_{Ft2}$, optionally compressed linearly by a factor.

12. A method in accordance with one of the preceding aspects, wherein the tool is dressed in a modified manner for producing the specific modification while dressing, and/or wherein it is achieved by means of the direct modification of the surface of the tool that a comparable defined modification is produced in the diagonal generating method on the active surface of the workpiece machined by it, wherein the tool may be dressed in modified form by means of a form roller dresser, wherein further the form roller dresser may in particular be in contact with the tooth of the tool during the dressing from the root region to the tip region so that the modification takes place over the total tooth depth in one stroke or alternatively the form roller dresser is in contact with the tooth of the tool only in part regions between the root and the tip during dressing so that the specific modification takes place over the total tooth depth in a plurality of strokes and at a respective different relative positioning of the dresser.

13. A method in accordance with one of the preceding aspects, wherein the producing of the specific modification takes place on the tool in that one or more of the following corrections of the axial movements are carried out with respect to conventional dressing kinematics:

a) varying the axial spacing of the dresser from the tool in dependence on the angle of rotation of the tool or on the tool width (feed), b) varying the axial feed of the tool or of the dresser in dependence on the angle of rotation of the tool or on the tool width (shift);

c) varying the axial cross angle of the tool and of the dresser in dependence on the angle of rotation of the tool or on the tool width (pivot);

d) varying the speed of the tool in dependence on the angle of rotation of the tool or on the tool width and/or wherein the modified dressing of the tool takes place in that the dresser is delivered more or less far in dependence on the angular position of the tool or in that the tool is supplied more or less far onto the dresser in dependence on its angular position, or vice versa.

14. A method in accordance with one of the preceding aspects, wherein the desired modification of the surface geometry of the workpiece on the gear flank is defined at least locally on the gear flank in the generating pattern at the rolling path position $L_2$ and at the tooth width position $b_2$ by the formula:

$$F_{Ft2}(2*pi/lambda_2*cos(psi_2)*L_2 - 2*pi/lambda_2*sin(psi_2)*b_2)$$

where the angle $psi_2$ is the first direction on the gear flank on which the modification has a constant value, while the modification has the form of $F_{Ft2}$ in every other direction, wherein the modification of the surface geometry of the tool used here may be defined at least locally in the generating pattern at the rolling path position $L_1$ and at the tooth width position $b_1$ by the formula:

$$F_{Ft1}(2*pi/\text{lambda}_1*\cos(\text{psi}_1)*L_1 - 2*pi/\text{lambda}_1*\sin(\text{psi}_1)*b_1)$$

where the angle $\text{psi}_1$ is the first direction on the tool flank on which the modification has a constant value, while the modification has the form of $F_{Ft1}$ in every other direction, and/or wherein the first direction of the tool in which the modification has a constant value may correspond to the line of action of the dressing tool, in particular of a form roller dresser, with the tool during dressing, wherein this direction may be approximated at least locally by a straight line.

15. A method in accordance with one of the preceding aspects, wherein the modification is a waviness, wherein the function $F_{Ft1/2}$ may be periodic, wherein $\text{lambda}_2$ at a periodicity of $F_{Ft21/}$ over $2*pi$ may define the wavelength of the modification in a direction perpendicular to the first direction and wherein further optionally $\text{lambda}_1$ at a periodicity of $F_{Ft1/2}$ over $2*pi$ defines the wavelength of the modification in a direction perpendicular to the first direction.

16. A method in accordance with one of the preceding aspects, wherein the macrogeometry of the tool and/or the line of action of the dressing tool and/or the axial feed of the workpiece and/or the shift movement of the tool and/or the compression factor can be selected such that the modification of the tool along a first line on which the contact point on the tool moves on the machining of the workpiece corresponds to the desired modification of the workpiece along a second line on which the contact point moves on the workpiece, wherein optionally, with a predefined macrogeometry of the tool and line of action of the dressing tool, the axial feed of the workpiece and/or the shift movement of the tool and/or the compression factor are selected accordingly, wherein further optionally, with a predefined axial feed of the workpiece, the shift movement of the tool and/or the compression factor is/are selected accordingly, wherein optionally, the macrogeometry of the tool and/or the line of action of the dressing tool and/or the axial feed of the workpiece and/or the shift movement of the tool and/or the compression factor are selected such that the modifications of the tool and of the workpiece also correspond to one another along third and fourth lines on which the contact points move in the machining of the same tooth of the workpiece with the same thread of the tool at a later point in time of the machining process, with these lines being displaced with respect to the first and second lines by the axial feed of the workpiece and, optionally, by the shifting of the tool, wherein further optionally with a predefined macrogeometry of the tool and line of action of the dressing tool, the axial feed of the workpiece and/or the shift movement of the tool and/or the compression factor are selected accordingly, wherein further optionally, with a predefined axial feed of the workpiece, the shift movement of the tool and/or the compression factor is/are selected accordingly.

17. A method in accordance with one of the preceding aspects, wherein $F_{Ft1}(x) = -F_{Ft2}(cx)$ applies in the normal section, wherein c is a constant parameter and/or wherein $F_{Ft1}(x) = -k*F_{Ft2}(cx)$ applies in the transverse section, wherein c and k are constant parameters.

18. A method in accordance with one of the preceding aspects, characterized in that the modifications produced by the method are used to compensate unwanted deviations and/or waviness of the surface of the workpiece, in particular to eliminate deviations and/or waviness of the surface of the workpiece which are caused by inaccuracies of the machine mechanism and/or by the machine dynamics and/or by insufficient balance quality.

19. A method for the hard fine machining of a workpiece having a corrected gear tooth geometry and/or a modified surface structure in accordance with one of the preceding aspects, comprising the steps: predefining a desired modification; and specific production of a tool modification while dressing the tool for producing a workpiece having the desired flank modification and/or comprising the steps: predefining a desired orientation of the modification; and traveling the tool continuously in the axial direction of the workpiece and/or shifting of the tool tangentially to the workpiece to obtain the desired orientation of the modification.

20. A tool for carrying out a method in accordance with one of the preceding aspects, characterized in that the tool is dressed in a modified manner in at least one part region, wherein the tool advantageously has at least two different machining regions, in particular at least one rough machining region and at least one fine machining region dressed in a modified manner.

21. A gear manufacturing machine for carrying out the method in accordance with one of the aspects 1 to 19, wherein the gear manufacturing machine advantageously comprises an input function via which a desired modification is predefinable and a control function which determines the tool modification required for providing the modification and which produces it during the dressing on the tool, and/or having a function for producing a desired modification of the workpiece by means of a tool dressed in a modified manner.

22. A gear manufacturing machine for dressing a grinding worm having a dressing tool, in particular a gear manufacturing machine in accordance with one of the preceding aspects, characterized in that the gear manufacturing machine has a function for the modified dressing of the grinding worm which advantageously varies the position of the dresser to the tool during dressing in dependence on the angle of rotation of the tool and/or on the tool width position, wherein the function may at least set the engagement depth of the dressing tool into the grinding worm in dependence on the angle of rotation of the grinding worm.

23. A gear manufacturing machine in accordance with aspect 21 or aspect 22, wherein the input function allows the predefinition of the desired modification of the surface geometry of the workpiece as a continuous function and/or on a scatter plot, wherein the continuous function may be predefined on a surface on the tooth flank and/or the scatter plot optionally spans a surface on the tooth flank.

24. A gear manufacturing machine in accordance with one of the aspects 21 to 23, wherein the gear manufacturing machine determines the modifications of the surface geometry of the tool as a continuous function and/or on a scatter plot, and/or wherein the gear manufacturing machine allows the predefinition of the modifications of the surface geometry of the tool as a continuous function and/or on a scatter plot, wherein the continuous function is optionally determined and/or predefinable on a surface on the tooth flank and/or the scatter plot optionally spans a surface on the tooth flank.

25. A gear manufacturing machine in accordance with one of the aspects 21 to 24, wherein the gear manufacturing machine allows the predefinition of a desired modification of the surface geometry of the workpiece as a function which is given by a function $F_{Ft2}$ in the generating pattern at least locally in a second direction of the workpiece, wherein the function $F_{Ft2}$ and/or the second direction is/are freely predefinable at least within specific conditions.

26. A gear manufacturing machine in accordance with one of the aspects 21 to 24, wherein the gear manufacturing machine allows the predefinition of a desired modification of the surface geometry of the workpiece as a function which has a constant value in the generating pattern at least locally in a first direction of the workpiece and is given by a function $F_{Ft2}$ in a second direction of the workpiece which extends perpendicular to the first direction, wherein the function $F_{Ft2}$ and/or the first direction is/are optionally freely predefinable at least within specific conditions.

27. A gear manufacturing machine in accordance with one of the aspects 21 to 24, wherein the gear manufacturing machine allows the predefinition and/or determination of a modification of the surface geometry of the tool by the dressing process as a function which has a constant value in the generating pattern at least locally in a first direction of the workpiece and is given by a function $F_{Ft1}$ in a second direction of the workpiece which extends perpendicular to the first direction, wherein the function $F_{Ft2}$ and/or the first direction is/are optionally freely predefinable at least within specific conditions.

28. A computer program, in particular for installation on a gear manufacturing machine and/or having an output function for data for use on a gear manufacturing machine, having an input function for inputting data on a desired modification of the workpiece and having a function for determining the macrogeometry of the tool and/or of the line of action of the dressing tool and/or of the axial feed of the workpiece and/or of the shift movement of the tool and/or of the compression factor in a manner such that the modification of the tool along a first line on which the contact point moves on the tool on the machining of the workpiece corresponds to the desired modification of the workpiece along a second line on which the contact point moves on the workpiece, wherein the functions may implement a method in accordance with one of the preceding aspects.

Curve Fitting and/or Combination with Other Modifications

1. A method for the production of a workpiece having a corrected gear tooth geometry and/or a modified surface structure by a diagonal generating method by means of a modified tool, wherein a specific modification of the surface geometry of the tool is produced, wherein the specific modification in the generating pattern has a constant value at least locally in a first direction of the tool and is given by a function $F_{Ft1}$ in a second direction of the tool, which extends perpendicular to the first direction, and/or wherein the specific modification is produced in that the position of the dresser to the tool is varied during dressing in dependence on the angle of rotation of the tool and/or on the tool width position, wherein the specific modification of the tool by the diagonal generating method produces a corresponding modification on the surface of the workpiece, characterized in that the modification of the workpiece produced by the specific modification is superposed by a profile modification and/or a modification caused by a change of the machine kinematics during the machining process.

2. A method in accordance with aspect 1, wherein the shape and/or portions and/or parameters of the respective modifications are determined by a curve fitting.

3. A method for the production of a workpiece having a corrected gear tooth geometry and/or a modified surface structure by a diagonal generating method by means of a modified tool, wherein a desired modification of the surface geometry of the workpiece is predefined, and a specific modification of the surface geometry of the tool is determined on the basis of the desired modification of the surface geometry of the workpiece which produces a modification on the surface of the workpiece by the diagonal generating method, characterized in that the shape of the specific modification of the surface geometry of the tool and/or at least one and optionally more parameters of the machining process and/or of the macrogeometry of the tool are determined by curve fitting.

4. A method in accordance with aspect 3, wherein the shape of the specific modification of the surface geometry of the tool and/or the diagonal ratio and/or the axial cross angle during the diagonal generating method and/or of the conical angle and/or of the profile angle of the tool are determined, wherein a diagonal ratio constant over the tool width is optionally determined or wherein the diagonal ratio is optionally determined as a non-constant function of the feed position and/or wherein the specific modification of the tool has a constant value in the generating pattern at least locally in a first direction of the tool and is given by a function $F_{Ft1}$ in a second direction of the tool which is perpendicular to the first direction and/or wherein the specific modification is produced in that the position of the dresser to the tool during dressing is varied in dependence on the angle of rotation of the tool and/or on the width position of the tool.

5. A method for the production of a workpiece having a corrected gear tooth geometry and/or having a modified surface structure due to a modified tool, wherein at least two different modifications which can be produced by a modification of the dressing process of the tool and/or of the dresser used for dressing the tool and/or of the machining process of the workpiece are superposed for the production of the workpiece, characterized in that a desired modification of the workpiece is resolved by curve fitting at least approximately in at least two different modifications of the workpiece.

6. A method in accordance with aspect 5, wherein, from the modifications of the workpiece determined in this manner, the modification of the dressing process of the tool and/or of the dresser used for dressing the tool and/or of the machining process of the workpiece are determined which are required for their production.

7. A method in accordance with one of the preceding aspects, wherein at least two of the following modifications are superposed:
- a first modification of the surface of the workpiece which is produced by a specific modification of the surface geometry of the tool which is in turn produced in that the position of the dresser to the tool is varied during the dressing in dependence on the angle of rotation of the tool and/or on the tool width position and/or which has a constant value in the generating pattern at least locally in a first direction of the workpiece and is given by a function $F_{Ft2}$ in a second direction of the workpiece,
- a second modification of the surface of the workpiece which is produced by a profile modification of the dresser, and/or
- a third modification of the surface of the workpiece which is produced by a change of the machine kinematics during the machining process of the workpiece, wherein the shape and/or the portions and/or the parameters of the respective modifications are determined by curve fitting in which a predefined, desired modification is resolved at least approximately into at least two of the following modifications:

a first modification which has a constant value at least locally in the generating pattern in a first direction of the workpiece and is given by a function $F_{Ft2}$ in a second direction of the workpiece which extends perpendicular to the first direction, a second modification which is given by a pure profile modification, and/or a third modification which has a constant value at least locally in the generating pattern in a third direction of the workpiece and is given by a function $F_{KFt}$ in a fourth direction of the workpiece which extends perpendicular to the third direction.

8. A method in accordance with one of the preceding aspects, wherein a desired modification is predefined and those parameters of the machining process and/or of the macrogeometry of the tool and/or that direction modification of the surface geometry of the tool and/or combination of modifications are determined by means of the curve fitting which approximate the desired modification as optimally as possible and/or produces it exactly, wherein the desired modification is optionally predefined as a continuous function and/or a scatter plot, wherein the scatter plot optionally spans a surface on the tooth flank and/or wherein the shape of the modification and/or of the modifications is optionally determined at a plurality of points and/or as continuous functions.

9. A method for the determination of the combination of modifications required for the production of a workpiece having a desired modification of the gear tooth geometry and/or surface structure, wherein a specific modification of the surface geometry of the tool which has a constant value at least locally in the generating pattern in a first direction of the tool and is given by a function $F_{Ft1}$ in a second direction of the tool which extends perpendicular to the first direction is superposed with a profile modification and/or with a modification caused by a change of the machine kinematics during the machining process, wherein a desired modification is predefined and that combination of modifications is determined by means of curve fitting which optimally approximates and/or exactly produces the desired modification, and/or wherein a predefined, desired modification is resolved at least approximately into at least two of the following modifications:

a first modification of the surface geometry of the workpiece which can be produced by specific modification of the tool during dressing and which has a constant value at least locally in the generating pattern in a first direction of the workpiece and is given by a function $F_{Ft2}$ in a second direction of the workpiece which extends perpendicular to the first direction, a second pure profile modification which can be produced by the shape of the dresser and/or a third modification which can be produced by a change of the machine kinematics during the machining process and which has a constant value at least locally in the generating pattern in a third direction of the workpiece and is given by a function $F_{KFt}$ in a fourth direction of the workpiece which extends perpendicular to the third direction.

10. A method for the determination of the specific modification of the surface geometry of the tool used for this purpose, which specific modification is required for the production of a workpiece having a desired modification of the gear tooth geometry and/or of the surface structure, wherein the machining process is a diagonal generating method in which the specific modification of the surface geometry of the tool produces a modification of the surface geometry of the workpiece, characterized in that the shape of the specific modification of the surface geometry of the tool and/or at least one and optionally more parameters of the machining process and/or of the macrogeometry of the tool are determined by curve fitting.

11. A method in accordance with one of the preceding aspects, wherein a distance function is used within the framework of the curve fitting which quantifies the difference between the modification on the surface of the workpiece produced by the specific modification of the tool or the modification given by the sum of the respective modifications and the desired modification, wherein the distance function optionally carries out a mean value formation over a plurality of points or the total generating pattern, and/or wherein a distance function $A(w_F, z_F)$ is used within the framework of the curve fitting which depends on the generating path wF and on the tooth width position $z_F$ and/or wherein a weighted distance function is used within the framework of the curve fitting, wherein deviations in specific regions of the workpiece may be weighted more than deviations in other regions, and/or wherein that specific modification of the surface geometry of the workpiece is determined within the framework of the curve fitting which has a constant value at least locally in the generating pattern in a first direction of the workpiece and is given by a function $F_{Ft2}$ in a second direction of workpiece which, optionally together with at least one further modification, optimally approximates and/or exactly produces the desired modification, wherein, from the specific modification of the surface geometry of the workpiece, the modification of the surface geometry of the tool required for this purpose and/or the machine kinematics required for this purpose during dressing is/are determined, and/or wherein at least one, and optionally more parameters of the machining process and/or of the macrogeometry of the tool and/or the shape and/or the portion and/or the parameters of at least one, and optionally two or three of the possible modifications is/are varied within the framework of the curve fitting in order to determine those parameters and/or that modification and/or combination of modifications which approximate/approximates the desired modification as optimally as possible and/or produce/produces it exactly, wherein the shape of the function $F_{Ft1/2}$ and/or of the function $F_{KFt}$ and/or of the profile modification and/or the first direction is/are optionally varied, wherein the form of the function $F_{Ft1/2}$ and/or the first direction of the first modification and/or the diagonal ratio and/or the axial cross angle during the diagonal generating method and/or the conical angle and/or the profile angle of the tool is/are optionally varied, wherein a diagonal ratio constant over the tool width is optionally varied or wherein the diagonal ratio is optionally varied as a non-constant function of the feed position.

12. A method for the dressing of a tool for the provision of a tool for a method in accordance with one of the aspects 1 to 7 and/or for implementing the combination determined by a method in accordance with aspect 8, wherein the specific modification of the surface geometry of the tool is produced by a change of the machine kinematics during the dressing process in dependence on the angle of rotation of the tool and/or on the tool width position, in particular in that one or more of the following corrections of the axial movement are carried out relative to the conventional dressing kinematics:

a) varying the axial spacing of the dresser from the tool in dependence on the angle of rotation of the tool or on the tool width (feed), b) varying the axial feed of the tool or of the dresser in dependence on the angle of rotation of the tool or on the tool width (shift);

c) varying the axial cross angle of the tool and of the dresser in dependence on the angle of rotation of the tool or on the tool width (pivot);

d) varying the speed of the tool in dependence on the angle of rotation of the tool or on the tool width wherein a modified dressing tool is additionally used to produce a profile modification.

13. A gear manufacturing machine for carrying out a method for the production of a workpiece in accordance with one of the aspects 1 to 11 and/or a method for the dressing of a tool in accordance with aspect 12, wherein the gear manufacturing machine advantageously has an input function and/or a calculation function via which the kinematic changes of the machine kinematics can be predefined and/or determined during the machining process and/or dressing process, and/or a control function which changes the machine kinematics during the machining process and/or the dressing process, wherein the input function may allow the input of a desired modification and the calculation function determines the modifications required for its production and/or the changes of the machine kinematics during the machining process and/or the dressing process required for the production of the modifications.

14. A computer system and/or software program for the determination of the combination of modifications required for the production of a workpiece with a desired modification, having a function for the predefinition of a desired modification and a curve fitting function, wherein the curve fitting function determines a combination of modifications which approximates the desired modification as optimally as possible and/or determines it exactly, wherein the curve fitting function determines a combination suitable for this purpose of a modification of the workpiece which can be produced by a specific modification of the surface geometry of the tool using a profile modification and/or a modification caused by a change of the machine kinematics during the machining process, and/or wherein the curve fitting function resolves a predefined, desired modification of the workpiece by a curve fitting at least approximately into two different modifications of the workpiece which can each be produced by a modification of the dressing process of the tool and/or of the dresser used for the dressing of the tool and/or of the machining process of the workpiece, and/or wherein the curve fitting function determines the shape of a specific modification of the surface geometry of the tool and/or at least one and optionally more parameters of the macrogeometry of the tool and/or at least one and optionally more parameters of a diagonal generating method by which the desired modification can be ideally approximated and/or exactly produced, and optionally having a calculation function which determines the modification of the dressing process of the tool and/or of the dresser used for dressing the tool and/or of the machining process of the workpiece from the modifications of the workpiece and/or of the tool determined in this manner, wherein further optionally the curve fitting function resolves a predefined desired modification at least approximately into at least two of the following modifications:

a first modification which has a constant value at least locally in the generating pattern in a first direction of the workpiece and is given by a function $F_{Ft}$ in a second direction of the workpiece which extends perpendicular to the first direction, a second modification which is given by a pure profile modification, and/or a third modification which has a constant value at least locally in the generating pattern in a third direction of the workpiece and is given by a function $FK_{Ft}$ in a fourth direction of the workpiece which extends perpendicular to the third direction.

15. A computer system and/or software program in accordance with aspect 14 which implements the calculation steps of a method in accordance with one of the aspects 1 to 12 and/or having an interface to or installable on a gear manufacturing machine in accordance with aspect 13 so that the changes of the machine kinematics during the machining process and/or the dressing process can be predefined and/or determined by the computer system and/or software program.

Producible Geometries

1. A method for the production of a workpiece having a corrected gear tooth geometry and/or a modified surface structure by a diagonal generating method by means of a modified tool, wherein a specific modification of the surface geometry of the tool is produced in that the position of the dresser to the tool is varied during the dressing in dependence on the angle of rotation of the tool and/or on the tool width position and/or wherein a specific modification of the surface geometry of the tool is produced which has a constant value at least locally in the generating pattern in a first direction of the tool and is given by a function $F_{Ft1}$ in a second direction of the tool which extends perpendicular to the first direction, wherein the modification of the tool by the diagonal generating method produces a corresponding modification on the surface of the workpiece, characterized in that the specific modification on the surface of the workpiece is a directed crowning without shape deviations.

2. A method in accordance with aspect 1, wherein the crowning is free of twist or wherein the crowning has a twist with a freely predefined direction on the tooth flank, wherein the direction of the twist is advantageously selected such that the lines of constant modification extend at an angle less than 60°, advantageously less than 30°, further advantageously less than 10°, further optionally in parallel with the line of action of the gear teeth, and/or wherein a predefined direction of the crowning is achieved by a corresponding selection of the first or second directions of the modification on the tool and of the diagonal ratio, and/or wherein the crowning is produced only via the modification of the tool and without any modification of the machine kinematics during the machining of the workpiece, and/or wherein the crowning is circular or parabolic or logarithmic or is composed of a plurality of circular, parabolic or logarithmic segments.

3. A method for the production of a workpiece having a corrected gear tooth geometry and/or a modified surface structure by a diagonal generating method by means of a modified tool, wherein a specific modification of the surface geometry of the tool is produced in that the position of the dresser to the tool is varied during the dressing in dependence on the angle of rotation of the tool and/or on the tool width position and/or wherein a specific modification of the surface geometry of the tool is produced which has a constant value at least locally in the generating pattern in a first direction of the tool and is given by a function $F_{Ft1}$ in a second direction of the tool which extends perpendicular to the first direction, wherein the modification of the tool by the diagonal generating method produces a corresponding modification on the surface of the workpiece, characterized in that the specific modification represents a pure tooth trace modification.

4. A method in accordance with aspect 3, wherein the tooth trace modification is freely predefined at least within certain conditions, wherein the tooth trace modification may be predefined as function $F_{Ft2}$ and/or the position of the dresser to the tool during the dressing is varied in dependence on the angle of rotation of the tool and/or on the tool width position in accordance with a function $F_{Ft1}$ and/or wherein the first or second directions of the modification of the tool and the diagonal ratio are selected such that the first direction is mapped onto transverse sectional planes of the workpiece.

5. A method for the production of a workpiece having a corrected gear tooth geometry and/or a modified surface structure by a diagonal generating method by means of a modified tool, wherein a specific modification of the surface geometry of the tool is produced in that the position of the dresser to the tool is varied during the dressing in dependence on the angle of rotation of the tool and/or on the tool width position and/or wherein a specific modification of the surface geometry of the tool is produced which has a constant value at least locally in the generating pattern in a first direction of the tool and is given by a function $F_{Ft1}$ in a second direction of the tool which extends perpendicular to the first direction, wherein the modification of the tool by the diagonal generating method produces a corresponding modification on the surface of the workpiece, characterized in that the specific modification is an end relief.

6. A method in accordance with aspect 5, wherein the lines of constant modification extend at an angle of less than 60°, advantageously less than 30°, further advantageously less than 10°, further optionally in parallel with the line of action of the gear teeth and/or wherein the end relief is a generated end relief, wherein the lines of constant modification have an angle $\alpha$ different from zero with the tooth edge.

7. A method in accordance with one of the aspects 5 or 6, wherein the extent of the end relief perpendicular to the lines of constant modification is planar, parabolic, in the form of a part circle, logarithmic, exponential or elliptical or sectionally consists of such shapes or sectionally comprises such shapes and transitional regions which may provide a tangential transition, wherein the extent of the end relief perpendicular to the lines of constant modification, in particular in a first section, can be planar and merges in a transition region into an unmodified section or a section having another modification, and/or wherein the first or second directions of the modification of the tool and the diagonal ratio are selected in dependence on the desired direction of the end relief.

8. A method in accordance with one of the aspects 5 to 7, wherein different end reliefs are provided at the upper edge and at the lower edge, and in particular end reliefs having different extents of the lines of constant modification, wherein work is carried out with different diagonal ratios for machining the two end reliefs, and/or wherein the tool has at least one modified region and one unmodified region and/or at least two regions with different modifications, in particular with modifications having a different orientation and in particular a different first direction, and/or two modified regions between which an unmodified region is disposed, wherein work may be carried out in at least two regions with different diagonal ratios.

9. A method for the production of a workpiece having a corrected gear tooth geometry and/or a modified surface structure by a diagonal generating method by means of a modified tool, wherein a specific modification of the surface geometry of the tool is produced in that the position of the dresser to the tool is varied during the dressing in dependence on the angle of rotation of the tool and/or on the tool width position and/or wherein a specific modification of the surface geometry of the tool is produced which has a constant value at least locally in the generating pattern in a first direction of the tool and is given by a function $F_{Ft1}$ in a second direction of the tool which extends perpendicular to the first direction, wherein the modification of the tool by the diagonal generating method produces a corresponding modification on the surface of the workpiece, characterized in that the lines of constant modification extend on the workpiece at an angle of less than 60°, advantageously less than 30°, further advantageously less than 10°, further optionally in parallel with the line of action of the gear teeth.

10. A method in accordance with one of the preceding aspects, wherein the desired modification of the surface geometry of the workpiece on the tooth gear flank has a constant value at least locally in the generating pattern in a first direction of the workpiece and is given by a function $F_{Ft2}$ in a second direction of the workpiece which extends perpendicular to the first direction, and the modification of the surface geometry of the tool used for producing this modification of the surface geometry of the workpiece has a constant value at least locally in the generating pattern in a first direction of the tool and further optionally is given in a second direction of the tool which extends perpendicular to the first direction by the same function $F_{Ft1}$, optionally compressed linearly by a factor, wherein the macrogeometry of the tool and/or the line of action of the dressing tool and/or the diagonal ratio and/or the compression factor are selected such that the modification of the tool along a first line on which the contact point moves on the tool on the machining of the workpiece corresponds to the desired modification of the workpiece along a second line on which the contact point moves on the workpiece, and/or wherein the specific modification of the surface geometry of the tool is produced by a change of the machine kinematics during the dressing process in dependence on the angle of rotation of the tool and/or on the tool width position, in particular in that one or more of the following corrections of the axial movements relative to the conventional dressing kinematics are carried out:
 a) varying the axial spacing of the dresser from the tool in dependence on the angle of rotation of the tool or on the tool width (feed),
 b) varying the axial feed of the tool or of the dresser in dependence on the angle of rotation of the tool or on the tool width (shift);
 c) varying the axial cross angle of the tool and of the dresser in dependence on the angle of rotation of the tool or on the tool width (pivot);
 d) varying the speed of the tool in dependence on the angle of rotation of the tool or on the tool width.

11. A gear manufacturing machine for carrying out the method in accordance with one of the aspects 1 to 10, wherein the gear manufacturing machine advantageously has an input function and/or a calculation function via which the modification and/or the orientation of the modification can be predefined and/or determined, and/or a control function which produces the specific modification within the framework of the machining of a workpiece, wherein the input function may allow the input of a desired modification and the calculation function determines the modifications required for its manufacture and/or the changes of the machine kinematics required for producing the modifications during the machining process and/or optionally during the dressing process, wherein a control function may be provided which correspondingly changes the machine kinematics during the machining process and/or optionally during the dressing process.

12. A computer system and/or software program for determining the modifications of the tool required for the manufacture of a workpiece having a desired modification and/or the required machining parameters on the carrying out of a method in accordance with one of the preceding aspects, having a function for inputting a desired modification and having a calculation function which determines the parameters of the machining process of the workpiece required for the production of the desired modifications from the desired modifications of the workpiece and/or the required modification of the tool and/or the modification of the dressing process of the tool required for the provision of the modification of the tool.

13. A computer system and/or software program in accordance with aspect 12 having an interface to or installable on a gear manufacturing machine so that the changes of the machine kinematics during the dressing process and/or the parameters of the machining process can be predefined and/or determined by the computer system and/or the software program.

14. A geared workpiece, in particular a gear wheel, having a crowning-modified tooth flank, and/or a transmission having one or more geared workpieces having a crowning-modified tooth flank, characterized in that the crowning is a directed crowning without shape deviations, wherein the crowning may be twist-free; or in that the crowning has a twist whose direction is selected such that the lines of constant modification extend at an angle of less than 60°, advantageously less than 30°, further advantageously less than 10°, further optionally in parallel with the line of action of the gear teeth and/or a helically toothed workpiece, in particular a gear wheel, having a modified tooth flank, and/or a transmission having one or more geared workpieces having a modified tooth flank, characterized in that the modification is a pure tooth trace modification.

15. A geared workpiece, in particular a gear wheel, having at least one end relief, and/or a transmission having one or more geared workpieces having at least one end relief, characterized in that the lines of constant modification extend at an angle of less than 60°, advantageously less than 30°, further advantageously less than 10°, further optionally in parallel with the line of action of the gear teeth, and/or wherein the end relief is a generated end relief, wherein the lines of constant modification have an angle α not equal to zero with the tooth edge, and/or wherein different end reliefs are provided at the upper edge and at the lower edge, and in particular end reliefs having different extents of the lines of constant modification, and/or a geared workpiece, in particular a gear wheel, having a modified tooth flank, and/or a transmission having one or more geared workpieces having a modified tooth flank, wherein the modification has a constant value at least locally in the generating pattern in a first direction, and is given by a function $F_{Ft2}$ in a second direction which extends perpendicular to the first direction, characterized in that the lines of constant modification extend at an angle of less than 60°, advantageously less than 30°, further advantageously less than 10°, further optionally in parallel with the line of action of the gear teeth.

Change of the Diagonal Ratio on the Machining of the Workpiece

Figure 18:
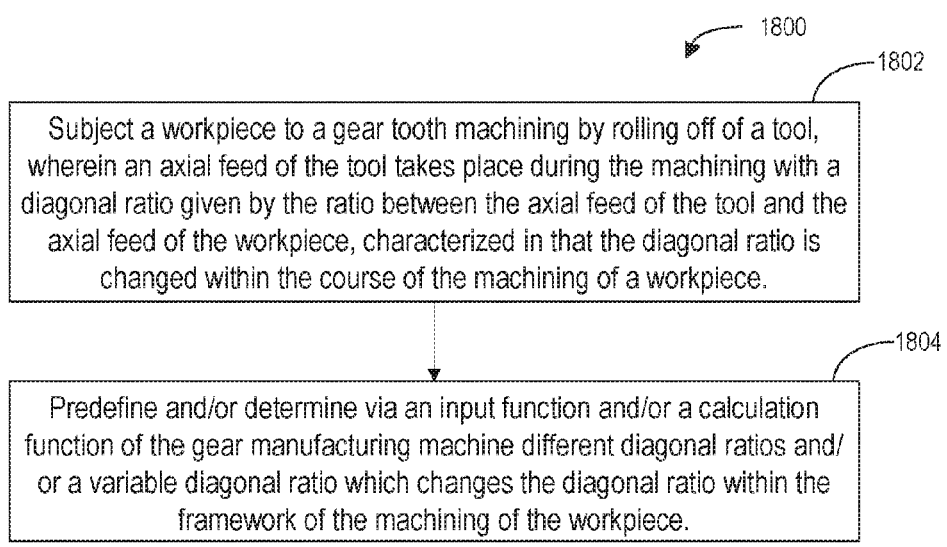
FIG. 18 shows a flow chart of another example method according to at least one example of the disclosure.

1. A method for the gear manufacturing machining of a workpiece by a diagonal-generating method, such as method 1800 shown at FIG. 18, in which the workpiece is subjected to gear tooth machining by the rolling off of a tool, wherein an axial feed of the tool takes place during the machining with a diagonal ratio given by the ratio between the axial feed of the tool and the axial feed of the workpiece, characterized in that the diagonal ratio is changed within the course of the machining of a workpiece at step 1802.

2. A method in accordance with aspect 1 for the production of a workpiece with a corrected gear tooth geometry and/or with a modified surface structure, wherein a corresponding modification is produced on the surface of the workpiece by means of a specific modification of the surface geometry of the tool and of a mapping of the surface of the tool onto the surface of the workpiece produced by the diagonal generating method and dependent on the diagonal ratio, wherein a specific modification of the surface geometry of the tool may be produced in that the position of the dresser to the tool during the dressing is varied in dependence on the angle of rotation of the tool and/or on the tool width position, and/or wherein the modification of the surface geometry of the workpiece on the tooth flank has a constant value at least locally and/or in a first region in the generating pattern in a first direction of the workpiece and is given by a function $F_{Ft2}$ in a second direction of the workpiece which extends perpendicular to the first direction, and/or the modification of the surface geometry of the tool used for the production of the modification of the surface geometry of the workpiece has a constant value at least locally and/or in a first region in the generating pattern in a first direction of the tool and is further optionally given by a function $F_{Ft1}$ in a second direction of the tool which extends perpendicular to the first direction, wherein the function on the tool may be the same function, optionally linearly compressed by a factor, as the function on the workpiece, wherein the macrogeometry of the tool and/or the line of action of the dressing tool and/or the diagonal ratio and/or the compression factor may be selected such that the modification of the tool along a first line on which the contact point moves on the tool on the machining of the workpiece corresponds to the desired modification of the workpiece along a second line on which the contact point moves on the workpiece.

3. A method in accordance with aspect 1 or aspect 2, wherein work is carried out with different diagonal ratios for the machining of different regions of the workpiece and/or on the use of different regions of the tool, and/or wherein the diagonal ratio is changed while the width of the gear teeth is traveled over within the course of the gear tooth machining.

4. A method in accordance with aspect 3, wherein work is carried out with a constant diagonal ratio within the respective regions.

5. A method in accordance with aspect 1 or aspect 2, wherein the diagonal ratio is varied during the machining of the workpiece in dependence on the axial feed of the workpiece and/or of the tool, wherein the diagonal ratio may be given as a non-constant function of the axial feed at least in a region of the axial feed, and/or wherein the extent of at least one line of constant modification may be predefined and the variation of the diagonal ratio is determined from this in dependence on the axial feed and in particular the non-constant function which is given by it, wherein the function may have at least one region in which it has a steady non-constant extent, and/or wherein the variation of the diagonal ratio optionally takes place on the sweeping over of a modified region of the workpiece.

6. A method in accordance with one of the preceding aspects, wherein a change of the diagonal ratio takes place while the tool is guided along the workpiece in the width direction, wherein the tool has a conical basic shape, wherein the modifications which can be achieved by the change of the diagonal ratio may be specifically influenced by a suitable choice of at least one and optionally more parameters of the machining process and/or of the macrogeometry of the tool, in particular of the axial cross angle and/or of the axial spacing and/or of the conical angle and/or of the profile angle of the tool.

7. A method in accordance with one of the preceding aspects, wherein the tool has at least one modified region and one unmodified region and/or at least two regions having different modifications, in particular having modifications having different orientations, and/or two modified regions between which an unmodified region is disposed, wherein work is optionally carried out in at least two regions with different diagonal ratios.

8. A method in accordance with one of the preceding aspects, wherein the tool has at least two regions which are used after one another for machining the same region of the workpiece, in particular at least one rough machining region and at least one fine machining region, wherein the machining steps with the two regions, in particular the rough-machining step and the fine machining step take place with different diagonal ratios, wherein the regions used for the machining may utilize the total tool width, and/or wherein at least one region, in particular the fine-machining region, may be modified, wherein for the case that both regions, in particular both the rough machining region and the fine machining region, are modified, the modification respectively has a different orientation, and/or the modification on the rough machining region only approximately produces the desired modification on the gear teeth.

9. A method in accordance with one of the preceding aspects, wherein the tool has at least two regions which are used after one another for machining different regions of the workpiece, wherein the machining in the one region takes place with a different diagonal ratio than in the other region, wherein the tool may have a modified and an unmodified region, wherein the diagonal ratio may be smaller in the unmodified region than in the modified region to reduce the width of the tool or wherein the diagonal ratio in the unmodified region is larger than in the modified region to reduce the load on the tool in this region.

10. A method in accordance with one of the preceding aspects, wherein the tool has two modified regions between which an unmodified region is disposed which are used after one another for machining different regions of the workpiece, wherein work is at least carried out with different diagonal ratios in the modified regions to produce different modifications, in particular modifications having different orientations, in the respective regions of the workpiece, wherein the regions may be arranged such that the extent of the contact point between the tool and the workpiece is disposed completely in the unmodified region in at least one grinding position.

11. A tool for carrying out a method in accordance with one of the preceding aspects, characterized in that the tool has at least two regions which can be used after one another for machining the same region of the workpiece, in particular at least one rough machining region and at least one fine machining region, wherein the two regions have a different width, and/or wherein the tool has at least one modified region and one unmodified region which can be used after one another for machining different regions of the workpiece, and/or wherein the tool has two modified regions between which an unmodified region is disposed which can be used after one another for machining different regions of the workpiece, wherein the two modified regions of the tool may be differently modified and in particular have modifications having a different orientation, and/or wherein the tool has a conical basic shape, wherein the conical angle of the tool is larger than 1', optionally larger than 30', is further optionally larger than 1°, and/or wherein the conical angle of the tool is less than 50°, optionally less than 20°, further optionally less than 10°.

12. A method for the dressing of a tool for the provision of a tool for a method in accordance with one of the aspects 1 to 9 and/or for the provision of a tool in accordance with aspect 10, wherein the desired modification of the tool is produced by a change of the machine kinematics during the dressing process, in particular in that the position of the dresser relative to the tool is varied in dependence on the angle of rotation of the tool and/or the tool width position, wherein the tool may have a modification having the same orientation over its total active surface and/or at least one modified region and at least one unmodified region and/or at least two regions having different modifications are produced.

13. A gear manufacturing machine for the carrying out of the method in accordance with one of the aspects 1 to 11, such as method 1800, wherein the gear manufacturing machine advantageously has an input function and/or a calculation function via which different diagonal ratios and/or a variable diagonal ratio can be predefined and/or determined and/or a control function which changes the diagonal ratio within the framework of the machining of a workpiece, such as at step 1804.

14. A gear manufacturing machine in accordance with aspect 13, wherein the control function carries out at least two machining steps which take place after one another and in which a respective other region of the tool is used for machining the same region of the workpiece, in particular at least one rough machining step and at least one fine machining step, wherein the machining steps, in particular the rough machining step and the fine machining step, take place with different diagonal ratios.

15. A gear manufacturing machine in accordance with aspect 13 or aspect 14, wherein the control function changes the diagonal ratio at least once in the course of a machining step and/or the diagonal ratio is changed while the width of the gear teeth is traveled over in the course of the gear tooth machining, wherein the control function optionally works with different diagonal ratios for machining different regions of the workpiece and further optionally works with a constant diagonal ratio within the respective regions, and/or wherein the control function varies the diagonal ratio during the machining of the workpiece in dependence on the axial feed of the workpiece and/or of the tool, wherein the diagonal ratio is given at least in one region of the axial feed as a non-constant and optionally continuous function of the axial feed.

Variable, Non-Constant Diagonal Ratio.

Generating grinding with a non-constant diagonal ratio to map straight lines on the worm onto a specifically predefined extent on the workpiece so that the modification has a constant value along this extent on the workpiece.

Selection of a suitable worm geometry, in particular of the conical angle, of the profile angle and of suitable grinding kinematics, in particular the axial cross angle, to influence the displacement of the extents on one or both sides.

Curve fitting to determine $F_{Z_{V1}}$, $F_{Ft1}$, $f_{PFt}$, $F_{KFt}$ and the macrogeometry of the worm, in particular the conical angle and the profile angle, as well as the axial cross angle, during the machining to approximate the modification as well as possible.

Software for calculating possible extents and their displacement/development for different $X_{F1}$, in particular for conical gear teeth, since this is then non-trivial. This development is only a displacement for cylindrical gear teeth. If grinding takes place with a conical worm, the direction in which displacement is carried out has to be calculated.

Software for calculating possible extents during the two-flank grinding. In this case, the extent on the one flank influences the extent on the other flank.

Gear teeth with a modification in accordance with equation (83), optionally with additively superposed modifications from grinding kinematics and/or a pure profile modification.

Tool with a Conical Basic Shape

Figure 17:
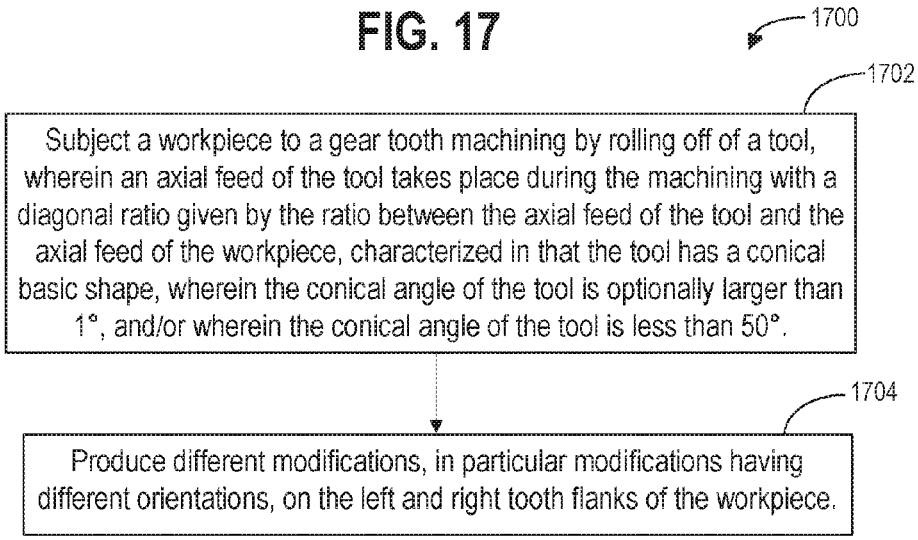
FIG. 17 shows a flow chart of an example method according to at least one example of the disclosure.

1. A method for the gear manufacturing machining of a workpiece by a diagonal-generating method, such as shown at method 1700 at FIG. 17, in which, at step 1702, the workpiece is subjected to gear tooth machining by the rolling off of a tool, wherein an axial feed of the tool takes place during the machining with a diagonal ratio given by the ratio between the axial feed of the tool and the axial feed of the workpiece, characterized in that the tool has a conical basic shape.

2. A method in accordance with aspect 1 for the production of a workpiece having a corrected gear tooth geometry and/or a modified surface structure, wherein a corresponding modification is produced on the surface of the workpiece by means of a specific modification of the surface geometry of the tool and of a mapping, produced by the diagonal generating method, of the surface of the tool onto the surface of the workpiece, wherein a specific modification of the surface geometry of the tool may be produced in that the position of the dresser to the tool during the dressing is varied in addition to the delivery required by the conical angle in dependence on the angle of rotation of the tool and/or on the tool width position, and/or wherein the modification of the surface geometry of the workpiece on the tooth flank has a constant value at least locally in the generating pattern in a first direction of the workpiece and is given by a function $F_{Ft2}$ in a second direction of the workpiece which extends perpendicular to the first direction, and/or the modification of the surface geometry of the tool used for the production of the modification of the surface geometry of the workpiece has a constant value at least locally in the generating pattern in a first direction of the tool and is further optionally given by a function $F_{Ft1}$ in a second direction of the tool which extends perpendicular to the first direction, wherein the function on the tool may be the same function, optionally linearly compressed by a factor, as the function on the workpiece.

3. A method in accordance with aspect 1 or aspect 2, wherein different modifications, in particular modifications having different orientations, are produced on the left and right tooth flanks of the workpiece, such as shown at step 1704.

4. A method in accordance with one of the preceding aspects, wherein the gear teeth of the workpiece on the left and right tooth flanks are asymmetrical.

5. A method in accordance with one of the preceding aspects, wherein the machining of the workpiece takes place on two flanks.

6. A method in accordance with one of the preceding aspects, wherein the workpiece has a cylindrical or a conical basic shape.

7. A method in accordance with one of the preceding aspects, wherein the conical angle of the tool is larger than 1°, optionally larger than 30°, is further optionally larger than 1°, such as at step 1702, and/or wherein the conical angle of the tool is less than 50°, such as at step 1702, optionally less than 20°, further optionally less than 10°.

8. A method in accordance with one of the preceding aspects, wherein a desired orientation of the modifications is achieved on the left and right tooth flanks by the suitable choice of at least one, and optionally more parameters of the machining process and/or of the macrogeometry of the tool, in particular of the diagonal ratio and/or the axial cross angle during grinding and/or the conical angle and/or the profile angle of the tool.

9. A method in accordance with one of the preceding aspects, wherein the axial feed of the tool is superposed with a feed motion of the tool to the workpiece, wherein the superposed movement may take place in the conical direction.

10. A method in accordance with one of the preceding aspects, wherein the macrogeometry of the tool, in particular the conical angle and/or the profile angle of the tool, and/or the line of action of the dressing tool and/or the diagonal ratio and/or the compression factor are selected such that the modification of the tool along a first line on which the contact point moves on the tool on the machining of the workpiece corresponds to the desired modification of the workpiece along a second line on which the contact point moves on the workpiece.

11. A tool for gear manufacturing machining of a workpiece by a diagonal-generating method, in particular by a grinding worm, characterized in that the tool has a conical basic shape.

12. A tool in accordance with aspect 11, wherein it is a worm and/or wherein the conical angle of the tool is larger than 1', optionally larger than 30', is further optionally larger than 1°, and/or wherein the conical angle of the tool is less than 50°, optionally less than 20°, further optionally less than 10°.

13. A tool in accordance with aspect 11 or aspect 12, wherein it has a specific modification of the surface geometry so that a corresponding modification can be produced on the surface of the workpiece via the mapping of the surface of the tool onto the surface of the workpiece produced by the diagonal generating method, wherein the modification of the surface geometry of the tool may have a constant value at least locally in the generating pattern in a first direction and is further optionally given by a function $F_{Ft1}$ in a second direction of the tool which extends perpendicular to the first direction, wherein the modification may be different on the right and left flanks and may have different orientations and/or is given by different functions $F_{Ft1}$.

14. A gear manufacturing machine for the carrying out of the method in accordance with one of the aspects 1 to 10, wherein the gear manufacturing machine advantageously has an input function via which the conical angle and/or the profile angle of the tool and/or of the workpiece can be input and/or predefined, and/or advantageously has a control function which controls the NC axes of the gear manufacturing machine such that a tool having a conical basic shape rolls off on the tool during diagonal generating processing during the machining, wherein the axial feed of the tool may be superposed with a feed motion of the tool toward the workpiece, wherein the superposed movement may take place in the conical direction, and/or wherein the gear manufacturing machine has a control function which controls the NC axes of the gear manufacturing machine such that the dresser follows the conical basic shape during the dressing of a tool having a conical basic shape, and/or wherein the gear manufacturing machine comprises an input function which allows the input of a desired modification of the workpiece and a calculation function which determines the changes of the machine kinematics during the dressing process required for producing the modifications and/or the conical angle and/or the profile angle of the tool, and/or wherein the gear manufacturing machine comprises an input function by which a desired modification of the tool and/or the conical angle and/or the profile angle and/or the changes of the machine kinematics required for producing these modifications can be input during the dressing process, wherein a control function may be provided which correspondingly changes the machine kinematics during the machining process and/or the dressing process.

15. A gear manufacturing machine in accordance with aspect 14, wherein the gear manufacturing machine is equipped with a tool in accordance with one of the aspects 11 to 13.

Diverse Aspects.

Machining gear teeth using a tool having a modification in accordance with equation $f_{Ft1}(w_F,z_F)=F_{Ft1}(w_F \tan \rho_{F1}+z_F)$ in the diagonal generating method for producing a modification on the gear teeth in accordance with equation $f_{Ft2}(w_F,z_F)=F_{Ft2}(w_F \tan \rho_{F2}+z_F)$. The machining can take place using methods which utilize a geared tool and the kinematics of a continuous generating gear train, for example using one of the following:

generating grinding
hobbing
skiving hobbing
shaving
internal and external honing.

The method can be used on one flank and on two flanks.

The tool and the workpiece can be both conical and cylindrical.

The direction $\rho_{F2}$ and the shape $F_{F2}(X_{F2})$ can be freely predefined on both flanks.

Special application cases: Free flank shape, end relief, generated end relief, tooth trace crowning, crowning along a desired direction.

During generating grinding, dressable and non-dressable tools can be used. The dressing can take place on one flank or on two flanks, in each case using a profile roller dresser with line contact over the total profile or in contour dressing.

With contour dressing or with non-dressable tools, the direction of constant modification given by $\rho_{F1}$ can be selected freely in dependence on the production method of the tool.

Division of the tool into rough machining regions and fine machining regions, wherein the rough machining regions can be both modified and non-modified.

Production of the modification on the gear teeth during rough machining only approximately in order, for example, to optimize the load on or the division of the tool.

Production of the modification on the gear teeth only approximately to optimize the division of the tool. Setting of the diagonal ratio independently of the modifications.

Superposition of the modification on the gear teeth in accordance with equation $f_{Ft2}(w_F,z_F)=F_{Ft2}(w_F \tan \rho_{F2}+z_F)$ with a pure profile modification and/or modification of corrected machining kinematics, in particular in accordance with $f_{GFt2}(w_F,z_F)=F_{Ft2}(w_F \tan \rho_{F2}+z_F)+f_{PFt}(w_F)+F_{KFt}(w_F \tan \rho_{KF}+z_F)$.

Curve fitting for the determination of $F_{Ft1}$ and $\rho_{F1}$.

Curve fitting for the determination of $F_{Ft1/2}$ and $\rho_{F1/2}$ and/or $f_{PFt}$ and/or $F_{KFt}$.

Curve fitting for the determination of $F_{Ft1/2}$ and $\rho_{F1/2}$ and/or $f_{PFt}$ and/or $F_{KFt}$ while considering technological aspects.

Division of the tooth flank into modified and non-modified regions, wherein the modifications on the modified regions can be described by different $\rho_{F2}$. Setting different diagonal ratios during the machining.

Selection of the macrogeometry of the tool, in particular the number of starts and/or the basic helix angle and/or the base circle radii and/or the outer diameter (in the case of a conical tool to a defined z position) and/or of the conical angle such that the diagonal ratio calculated in accordance with the method described here adopts a given value or lies in a given range and/or the working region calculated in accordance with the method described here adopts a given value or lies in a given range.

Machining of involute gear teeth using a conical tool, in particular a conical involute tool, also independently of whether the tool or the gear teeth modified thereby is/are modified.

The invention claimed is:

1. A method for gear manufacturing machining of a workpiece by a diagonal-generating method using a tool, comprising:
    subjecting the workpiece to a gear tooth machining using the tool,
    feeding the tool relative to the workpiece with a first axial feed in a direction of a rotational axis of the tool and with a second axial feed in a direction of a rotational axis of the workpiece during the gear tooth machining, wherein the first axial feed and the second axial feed are controlled on a basis of a diagonal ratio, where the diagonal ratio is defined as a ratio between the first axial feed and the second axial feed, and
    changing the diagonal ratio within a course of the gear tooth machining of the workpiece.

2. The method in accordance with claim 1, where the workpiece is a workpiece with a corrected gear tooth geometry and/or with a modified surface structure, and wherein a corresponding modification is produced on a surface of the workpiece by means of a modification of a surface geometry of the tool and of a mapping of a surface of the tool onto the surface of the workpiece produced by the diagonal-generating method and dependent on the diagonal ratio, wherein the modification of the surface geometry of the tool is produced by dressing of the tool with a dresser, wherein a position of the dresser relative to the tool during the dressing is varied in dependence on an angle of rotation of the tool and/or on a tool width position, and/or wherein a modification of a surface geometry of the workpiece on a tooth flank has a constant value at least locally in a first region in a generating pattern in a first direction of the workpiece and is given by a function $F_{Ft2}$ in a second direction of the workpiece which extends perpendicular to the first direction, and/or wherein the modification of the surface geometry of the tool used for production of the modification of the surface geometry of the workpiece has a constant value at least locally in the first region in the generating pattern in a first direction of the tool and is given by a function $F_{Ft1}$ in a second direction of the tool which extends perpendicular to the first direction, wherein the function on the tool is the same function as the function on the workpiece, wherein macrogeometry of the tool and/or a line of action of the dresser and/or the diagonal ratio and/or a compression factor are selected such that a modification of the tool along a first line on which a contact point moves on the tool on the machining of the workpiece corresponds to a desired modification of the workpiece along a second line on which the contact point moves on the workpiece.

3. The method in accordance with claim 1, wherein different diagonal ratios are used for the machining of different regions of the workpiece and/or on the use of different regions of the tool, and/or wherein the diagonal ratio is changed while a width of gear teeth is traveled over within a course of the gear tooth machining.

4. The method in accordance with claim 3, wherein a constant diagonal ratio is used within the respective regions.

5. The method in accordance with claim 4, wherein the diagonal ratio is varied during the machining of the workpiece in dependence on the first axial feed and/or the second axial feed, wherein the diagonal ratio is given as a non-constant function of at least one of the first and second axial feeds at least in a region of the at least one of the first and second axial feeds, and/or wherein an extent of at least one line of constant modification is predefined and a variation of the diagonal ratio is determined from this in dependence on the at least one of the first and second axial feeds and a non-constant function which is given by it, wherein the function has at least one region in which it has a steady non-constant extent, and/or wherein the variation of the diagonal ratio takes place on a sweeping over of a modified region of the workpiece.

6. The method in accordance with claim 4, wherein a change of the diagonal ratio takes place while the tool is guided along the workpiece in a width direction, wherein the tool has a conical basic shape, wherein modifications which are achieved by the change of the diagonal ratio are influenced by one or more parameters of the machining process and/or of macrogeometry of the tool.

7. The method in accordance with claim 1, wherein the tool has at least one modified region and one unmodified region and/or at least two regions having different modifications, the modifications having different orientations, and/or two modified regions between which an unmodified region is disposed, wherein work is carried out in at least two regions with different diagonal ratios.

8. The method in accordance with claim 1, wherein the tool has at least two regions which are used after one another for machining a same region of the workpiece, wherein the two regions comprise at least one rough machining region and at least one fine machining region, wherein a rough-machining step and/or a fine machining step take place with different diagonal ratios, wherein the regions used for the machining utilize a total tool width, and/or wherein at least one region is modified, wherein a modification on the rough machining region has a different orientation from a modification on the fine machining region, and/or the modification on the rough machining region only approximately produces a desired modification on gear teeth.

9. The method in accordance with claim 1, wherein the tool has at least two regions which are used after one another for machining different regions of the workpiece, wherein the machining in one region takes place with a different diagonal ratio than in another region, wherein the tool has a modified region and an unmodified region, wherein the diagonal ratio is smaller in the unmodified region than in the modified region to reduce a width of the tool or wherein the diagonal ratio in the unmodified region is larger than in the modified region to reduce a load on the tool in this region.

10. The method in accordance with claim 1, wherein the tool has two modified regions between which an unmodified region is disposed, the two modified regions used after one another for machining different regions of the workpiece, wherein the gear manufacturing machining is carried out with different diagonal ratios in the modified regions to produce different modifications having different orientations in respective regions of the workpiece, wherein the regions are arranged such that a contact point between the tool and the workpiece is disposed completely in the unmodified region.

11. A tool for gear manufacturing machining of a workpiece by a diagonal-generating method, wherein the tool has at least two regions which are used after one another for machining a same region of the workpiece, the two regions comprising at least one rough machining region and at least one fine machining region, wherein the two regions have different widths, and/or wherein the tool has at least one modified region and one unmodified region which are used after one another for machining different regions of the workpiece, and/or wherein the tool has two modified regions between which an unmodified region is disposed which are used after one another for machining different regions of the workpiece, wherein the two modified regions of the tool are differently modified and have modifications having a different orientation, and/or wherein the tool has a conical basic shape, wherein a conical angle of the tool is larger than 1°, and/or wherein the conical angle of the tool is less than 50°.

12. The tool in accordance with claim 11, further comprising a method for dressing of the tool, wherein a modification of the tool is produced by a change of machine kinematics during a dressing process, wherein a position of a dresser relative to the tool is varied in dependence on an angle of rotation of the tool and/or a tool width position, wherein the tool has a modification having a same orientation over its total active surface and/or at least one modified region and at least one unmodified region and/or at least two regions having different modifications.

13. A gear manufacturing machine for machining of a workpiece by a diagonal-generating method, in which the workpiece is subjected to gear tooth machining by a generating method, wherein the gear manufacturing machine has an input function and/or a calculation function via which different diagonal ratios and/or a variable diagonal ratio are predefined and/or determined and/or a control function which changes a diagonal ratio within a framework of the machining of a workpiece.

14. The gear manufacturing machine in accordance with claim 13, wherein the control function carries out at least two machining steps which take place after one another and in which a respective other region of the tool is used for machining a same region of the workpiece, the two machining steps comprising at least one rough machining step and at least one fine machining step, wherein the rough machining step and the fine machining step take place with different diagonal ratios.

15. The gear manufacturing machine in accordance with claim 13, wherein the control function changes the diagonal ratio at least once in the course of a machining step and/or the diagonal ratio is changed while a width of gear teeth is traveled over in the course of the gear tooth machining, wherein the control function works with different diagonal ratios for machining different regions of the workpiece and further works with a constant diagonal ratio within the respective regions, and/or wherein the control function varies the diagonal ratio during the machining of the workpiece in dependence on an axial feed of the workpiece and/or of the tool, wherein the diagonal ratio is given at least in one region of the axial feed as a non-constant and/or continuous function of the axial feed.

16. The method in accordance with claim 6, wherein the one or more parameters of the machining process and/or of the macrogeometry of the tool comprises one or more of an axial cross angle and/or an axial spacing and/or a conical angle and/or a profile angle of the tool.

17. The method in accordance with claim 2, wherein the tool has at least two regions which are used after one another for machining a same region of the workpiece, wherein the two regions comprise at least one rough machining region and at least one fine machining region, wherein a rough-machining step and/or a fine machining step take place with different diagonal ratios, wherein the regions used for the machining utilize a total tool width, and/or wherein at least one region is modified, wherein a modification on the rough machining region has a different orientation from a modification on the fine machining region, and/or the modification on the rough machining region only approximately produces a desired modification on gear teeth.

18. The method in accordance with claim 2, wherein work is carried out with different diagonal ratios for the machining of different regions of the workpiece and/or on the use of different regions of the tool, and/or wherein the diagonal ratio is changed while a width of gear teeth is traveled over within the course of the gear tooth machining.

19. The method in accordance with claim 2, wherein the tool has at least one modified region and one unmodified region and/or at least two regions having different modifications, the modifications having different orientations, and/or two modified regions between which an unmodified region is disposed, wherein work is carried out in at least two regions with different diagonal ratios.

20. The tool for gear manufacturing machining of a workpiece in accordance with claim 11, wherein a controller is provided with instructions stored in memory communicating with actuators of the tool such that a change of a diagonal ratio takes place while the tool is guided along the workpiece in a width direction, wherein modifications achieved by the change of the diagonal ratio are influenced by one or more parameters of the machining process and/or of macrogeometry of the tool.

* * * * *